(12) United States Patent
Hirose et al.

(10) Patent No.: US 12,124,215 B2
(45) Date of Patent: Oct. 22, 2024

(54) IMAGE OUTPUT DEVICE

(71) Applicant: HAMAMATSU PHOTONICS K.K., Hamamatsu (JP)

(72) Inventors: Kazuyoshi Hirose, Hamamatsu (JP); Yoshitaka Kurosaka, Hamamatsu (JP); Yuu Takiguchi, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 501 days.

(21) Appl. No.: 17/347,633

(22) Filed: Jun. 15, 2021

(65) Prior Publication Data

US 2021/0397128 A1     Dec. 23, 2021

(30) Foreign Application Priority Data

Jun. 17, 2020   (JP) ................................ 2020-104562

(51) Int. Cl.
*G03H 1/04*     (2006.01)
*G03H 1/00*     (2006.01)
(Continued)

(52) U.S. Cl.
CPC .......... *G03H 1/041* (2013.01); *G03H 1/0005* (2013.01); *G03H 1/268* (2013.01);
(Continued)

(58) Field of Classification Search
CPC ..... G02B 30/56; G02F 1/1352; G02F 1/1354; G02F 1/292; G03H 1/0005; G03H 1/02;
(Continued)

(56) References Cited

U.S. PATENT DOCUMENTS 6,573,953 B1 *   6/2003   Igasaki ................... G02F 1/135
                                                                     349/114
2014/0204185 A1   7/2014   Liu et al.
(Continued)

FOREIGN PATENT DOCUMENTS

JP    H4-123019 A    4/1992
JP    H6-265930 A    9/1994
(Continued)

OTHER PUBLICATIONS

Yoshida(Machine translation of JP 2013210590 A) (Year: 2013).*
(Continued)

*Primary Examiner* — Christopher S Kelley
*Assistant Examiner* — Ana Picon-Feliciano
(74) *Attorney, Agent, or Firm* — Faegre Drinker Biddle & Reath LLP

(57) ABSTRACT

An image output device of the disclosure facilitates enlargement of a stereoscopic image and includes a spatial light modulator, an image irradiation unit, and an address light irradiation unit. The spatial light modulator includes a main surface, a back surface, and pixels, reflects light emitted to the main surface, and modulates a phase of the light for each pixel. The image irradiation unit irradiates the main surface with light including an optical image. The address light irradiation unit irradiates the back surface with address light including a diffraction grating pattern. Each pixel of the spatial light modulator changes a phase modulation amount according to the intensity of the address light from a back surface. The address light irradiation unit dynamically change a diffraction grating pattern's direction on the back surface. The image irradiation unit irradiates the main surface with the optical image corresponding to the diffraction grating pattern's direction.

18 Claims, 54 Drawing Sheets

(51) Int. Cl.
*G03H 1/26* (2006.01)
*H04N 5/74* (2006.01)
*H04N 9/31* (2006.01)
*H04N 13/393* (2018.01)

(52) U.S. Cl.
CPC ... *G03H 2001/0088* (2013.01); *H04N 5/7416* (2013.01); *H04N 9/31* (2013.01); *H04N 13/393* (2018.05)

(58) Field of Classification Search
CPC ...... G03H 1/041; G03H 1/2294; G03H 1/268; G03H 2001/0088; G03H 2225/25; H04N 13/393; H04N 5/7416; H04N 9/31
USPC .................................................... 348/40, 131
See application file for complete search history.

(56) References Cited

U.S. PATENT DOCUMENTS

| | | | |
|---|---|---|---|
| 2015/0236474 A1* | 8/2015 | Kono | H01S 5/0085 |
| | | | 372/33 |
| 2020/0225487 A1* | 7/2020 | Huang | G02B 3/0056 |

FOREIGN PATENT DOCUMENTS

| | | |
|---|---|---|
| JP | 2000-171824 A | 6/2000 |
| JP | 2005-520184 A | 7/2005 |
| JP | 2013210590 A * | 10/2013 |
| JP | 2019-200251 A | 11/2019 |
| JP | 2019-201065 A | 11/2019 |
| WO | WO 03/054797 A2 | 7/2003 |

OTHER PUBLICATIONS

Horimai, Hideyoshi et al., "Full-Color 3D Display System with 360 Degree Horizontal Viewing Angle," The International Symposium of 3D and Contents, 2010, pp. 7-10.

Hara, Tsutomu, "The Latest Advance in Liquid Crystal Spatial Light Modulators," Optics, vol. 36, No. 3, 2007, pp. 122-128.

Isomae, Yoshitomo et al., "Alignment control of liquid crystals in a 1.0-μm-pitch spatial light modulator by lattice-shaped dielectric wall structure," J. Soc. Inf. Display 27, 2019, pp. 251-258.

Kurosaka, Yoshitaka et al., "Effects of non-lasing band in two-dimensional photonic-crystal lasers clarified using omnidirectional band structure," Optics Express, 2012, vol. 20, No. 19, pp. 21773-21783.

Kurosaka, Yoshitaka et al., "Phase-modulating lasers toward on-chip integration," Scientific Reports 6, 2016, p. 30138.

* cited by examiner

Fig. 23

| | m=1: DIFFERENCE OF ONE WAVELENGTH BETWEEN ADJACENT UNITS |||||||||
|---|---|---|---|---|---|---|---|---|---|
| | DIFFRACTION ANGLE $\theta_B$ |||||||||
| DESIGN $\theta$ | L (nm) | n=-4 | n=-3 | n=-2 | n=-1 | n=0 | n=1 | n=2 | n=3 | n=4 | n=5 |
| 5 | 2035 | | -60.6 | -37.6 | -20.4 | -5.0 | 10.0 | 25.8 | 44.2 | 73.5 | |
| 10 | 1021 | | | | -44.0 | -10.0 | 20.3 | 60.3 | | | |
| 15 | 685 | | | | | -15.0 | 31.2 | | | | |
| 20 | 518 | | | | | -20.0 | 43.2 | | | | |
| 25 | 420 | | | | | -25.0 | 57.7 | | | | |
| 30 | 355 | | | | | -30.0 | 90.0 | | | | |
| 35 | 309 | | | | | -35.0 | NO SOLUTION | | | | |
| 40 | 276 | | | | | -40.0 | | | | | |
| 45 | 251 | | | | | -45.0 | | | | | |
| 50 | 231 | | | NO SOLUTION | NO SOLUTION | -50.0 | | NO SOLUTION | NO SOLUTION | NO SOLUTION | NO SOLUTION |
| 55 | 216 | | | | | -55.0 | | | | | |
| 60 | 205 | NO SOLUTION | NO SOLUTION | | | -60.0 | | | | | |
| 65 | 196 | | | | | -65.0 | | | | | |
| 70 | 189 | | | | | -70.0 | | | | | |
| 75 | 184 | | | | | -75.0 | | | | | |
| 80 | 180 | | | | | -80.0 | | | | | |

Fig.26

| DESIGN θ | L (nm) | m=1: DIFFERENCE OF ONE WAVELENGTH BETWEEN ADJACENT UNITS | | | | | | | | | |
|---|---|---|---|---|---|---|---|---|---|---|---|
| | | DIFFRACTION ANGLE θ_B | | | | | | | | | |
| | | n=-4 | n=-3 | n=-2 | n=-1 | n=0 | n=1 | n=2 | n=3 | n=4 | n=5 |
| 5 | 1786 | | -60.6 | -37.6 | -20.4 | -5.0 | 10.0 | 25.8 | 44.2 | 73.5 | |
| 10 | 896 | | | | -44.0 | -10.0 | 20.3 | 60.3 | | | |
| 15 | 601 | | | | | -15.0 | 31.2 | | | | |
| 20 | 455 | | | | | -20.0 | 43.2 | | | | |
| 25 | 368 | | | | | -25.0 | 57.7 | | | | |
| 30 | 311 | | | | | -30.0 | 90.0 | | | | |
| 35 | 271 | | | | | -35.0 | NO SOLUTION | | | | |
| 40 | 242 | | | | | -40.0 | NO SOLUTION | | | | |
| 45 | 220 | | | | NO SOLUTION | -45.0 | NO SOLUTION | | | | |
| 50 | 203 | | | NO SOLUTION | NO SOLUTION | -50.0 | NO SOLUTION | NO SOLUTION | | | |
| 55 | 190 | | NO SOLUTION | NO SOLUTION | NO SOLUTION | -55.0 | NO SOLUTION | NO SOLUTION | NO SOLUTION | | |
| 60 | 180 | | NO SOLUTION | NO SOLUTION | NO SOLUTION | -60.0 | NO SOLUTION | NO SOLUTION | NO SOLUTION | | |
| 65 | 172 | NO SOLUTION | NO SOLUTION | NO SOLUTION | NO SOLUTION | -65.0 | NO SOLUTION | NO SOLUTION | NO SOLUTION | NO SOLUTION | |
| 70 | 166 | NO SOLUTION | NO SOLUTION | NO SOLUTION | NO SOLUTION | -70.0 | NO SOLUTION | NO SOLUTION | NO SOLUTION | NO SOLUTION | |
| 75 | 161 | NO SOLUTION | NO SOLUTION | NO SOLUTION | NO SOLUTION | -75.0 | NO SOLUTION | NO SOLUTION | NO SOLUTION | NO SOLUTION | NO SOLUTION |
| 80 | 158 | NO SOLUTION | NO SOLUTION | NO SOLUTION | NO SOLUTION | -80.0 | NO SOLUTION | NO SOLUTION | NO SOLUTION | NO SOLUTION | NO SOLUTION |

Fig. 29

| DESIGN θ | L (nm) | m=1: DIFFERENCE OF ONE WAVELENGTH BETWEEN ADJACENT UNITS — DIFFRACTION ANGLE $\theta_B$ | | | | | | | | | |
|---|---|---|---|---|---|---|---|---|---|---|---|
| | | n=-4 | n=-3 | n=-2 | n=-1 | n=0 | n=1 | n=2 | n=3 | n=4 | n=5 |
| 5 | 2409 | | -60.6 | -37.6 | -20.4 | -5.0 | 10.0 | 25.8 | 44.2 | 73.5 | |
| 10 | 1209 | NO SOLUTION | | | -44.0 | -10.0 | 20.3 | 60.3 | | | NO SOLUTION |
| 15 | 811 | | | | | -15.0 | 31.2 | | | | |
| 20 | 614 | | | | | -20.0 | 43.2 | | | | |
| 25 | 497 | | | | NO SOLUTION | -25.0 | 57.7 | NO SOLUTION | | | |
| 30 | 420 | | | | | -30.0 | 90.0 | | | | |
| 35 | 366 | | | | | -35.0 | | | | | |
| 40 | 327 | | | | | -40.0 | | | | | |
| 45 | 297 | | | | | -45.0 | NO SOLUTION | | | | |
| 50 | 274 | | | | | -50.0 | | | | | |
| 55 | 256 | | | | | -55.0 | | | | | |
| 60 | 242 | | | | | -60.0 | | | | | |
| 65 | 232 | | | | | -65.0 | | | | | |
| 70 | 223 | | | | | -70.0 | | | | | |
| 75 | 217 | | | | | -75.0 | | | | | |
| 80 | 213 | | | | | -80.0 | | | | | |

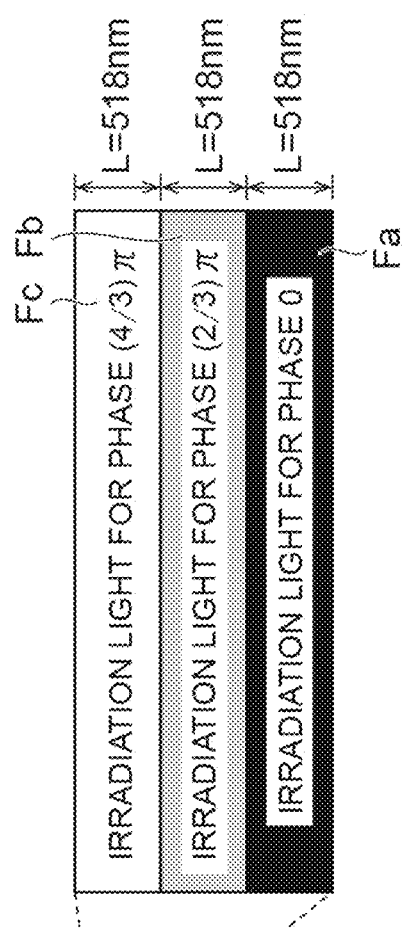
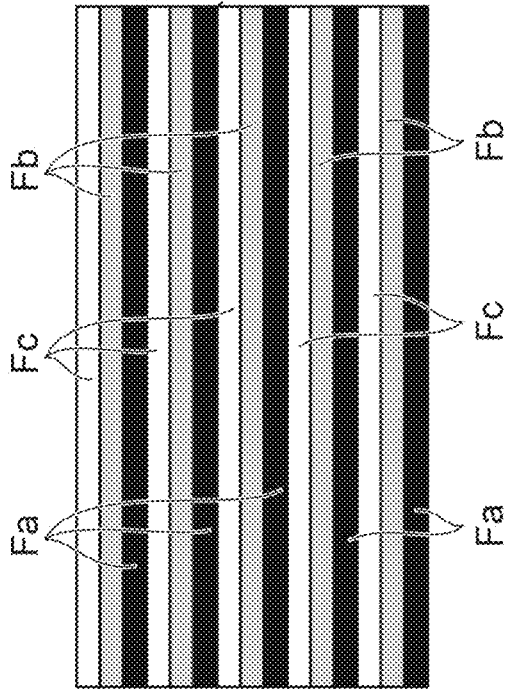

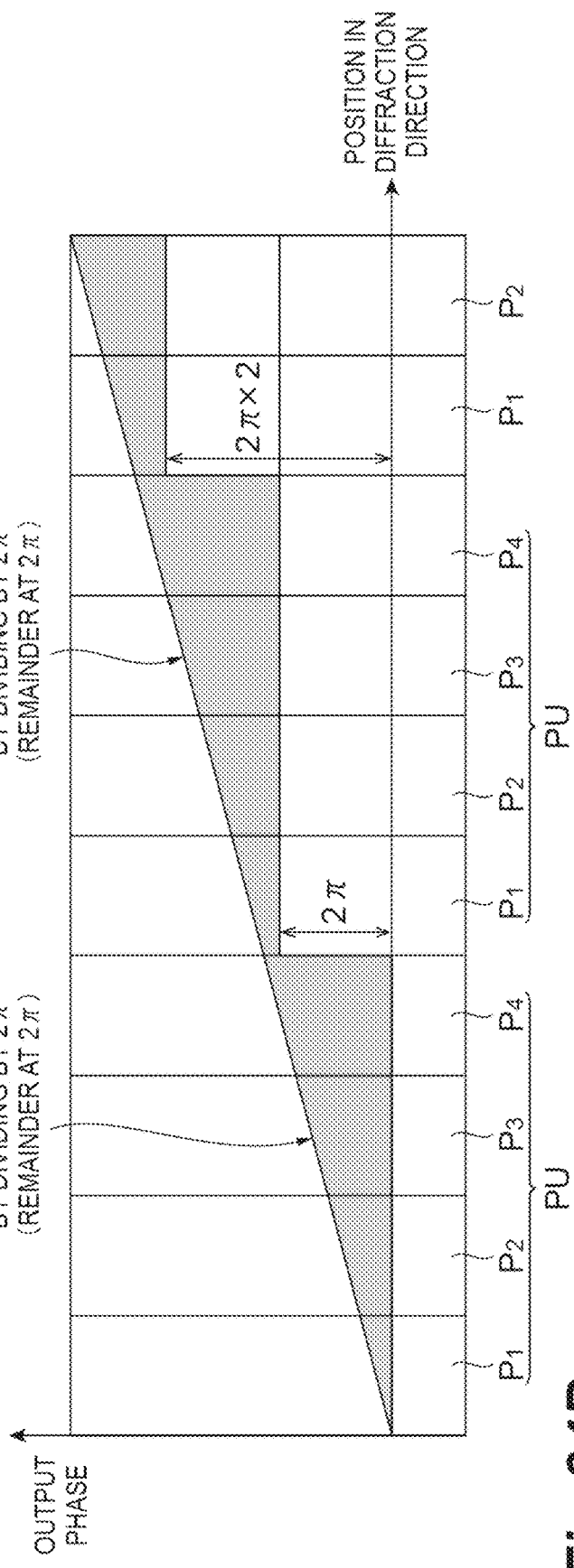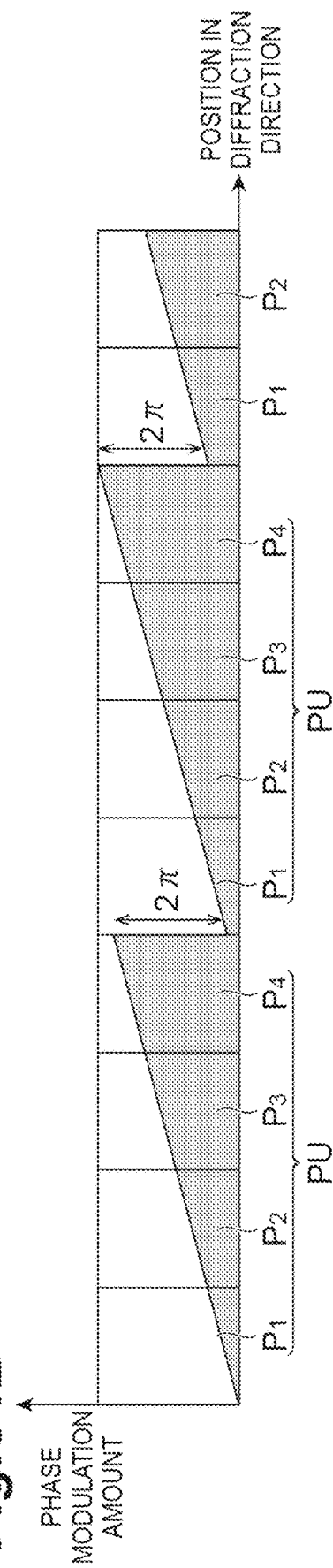

*Fig.48A*

| A2 | A1 |
|---|---|
| A3 | A4 |

ORIGINAL IMAGE

*Fig.48B*

| A4<br>ROTATION OF A2 | A3<br>ROTATION OF A1 |
|---|---|
| A1<br>ROTATION OF A3 | A2<br>ROTATION OF A4 |

OBTAINED BEAM PATTERNS

Fig.49

IMAGE OUTPUT DEVICE

TECHNICAL FIELD

The present disclosure relates to an image output device. This application claims priority from Japanese Patent Application No. 2020-104562 filed on Jun. 17, 2020, the contents of which this application is based on and are incorporated herein by reference in their entirety.

BACKGROUND

Non-Patent Document 1 below discloses a device that stereoscopically outputs an image. The device includes a holographic screen that rotates at high speed (3600 rpm) and a high speed projector. The high-speed projector is a digital light processing (DLP) projector using a digital micromirror device (DMD). The holographic screen is irradiated with a two-dimensional optical image from the high-speed projector and the holographic screen rotates at a high speed, whereby the two-dimensional optical image is deflected in the entire circumferential direction of 360°. The high-speed projector changes the two-dimensional optical image in response to a deflection direction by the holographic screen. As a result, the image can be shown stereoscopically to an observer.

Non-Patent Document 2 below discloses a technique related to a light address type liquid crystal spatial light modulator (parallel aligned nematic liquid crystal spatial light modulator (PAL-SLM)). The spatial light modulator includes an address layer and a liquid crystal layer. The address layer includes hydrogenated amorphous silicon that is a photoconductor. The liquid crystal layer includes nematic liquid crystal. A writing side and a reading side are optically separated by a dielectric mirror including a multilayer film of $SiO_2$ and $TiO_2$. An alternating-current voltage of several volts is applied between a pair of transparent electrodes (ITO)) sandwiching the address layer, and an image (two-dimensional information) is written in the address layer. In a region not hit by writing light, the impedance of the hydrogenated amorphous silicon is larger than the impedance of the liquid crystal layer, so that a voltage is hardly given to the liquid crystal layer. Meanwhile, in a portion irradiated with the writing light, the impedance of the hydrogenated amorphous silicon decreases and the voltage given to the liquid crystal layer increases, so that the phase of the reading light in the liquid crystal changes. In this way, the phase of the reading light can be two-dimensionally modulated according to the writing light information. Note that the partition structure of a liquid crystal layer is disclosed in, for example, Non-Patent Document 3 below.

- Non-Patent Document 1: Hideyoshi Horimai et al., "Full-Color 3D Display System with 360 Degree Horizontal Viewing Angle", The International Symposium of 3D and Contents 2010, pp. 7-10 (2010)
- Non-Patent Document 2: Tsutomu Hara, "The Latest Advance in Liquid Crystal Spatial Light Modulators", Optics, Vol. 36, No. 3, pp. 122-128, 2007
- Non-Patent Document 3: Yoshitomo Isomae et al., "Alignment control of liquid crystals in a 1.0-mm-pitch spatial light modulator by lattice-shaped dielectric wall structure", J. Soc. Inf. Display 27, pp. 251-258 (2019)
- Non-Patent Document 4: Y. Kurosaka et al., "Effects of non-lasing band in two-dimensional photonic-crystal lasers clarified using omnidirectional band structure," Opt. Express 20, 21773-21783 (2012)
- Non-Patent Document 5: Y. Kurosaka et al., "Phase-modulating lasers toward on-chip integration", Scientific Reports 6, 30138 (2016)

SUMMARY

As a result of examining the above conventional techniques, the inventors have found the following problems. That is, Non-Patent Document 1 discloses an example of a device that stereoscopically shows an image by outputting a two-dimensional optical image corresponding to each direction in the entire circumferential direction of 360°. However, in the device disclosed in Non-Patent Document 1, it is necessary to mechanically rotate the holographic screen at a high speed, and thus it is difficult to increase the size of the holographic screen. Therefore, there is a problem that it is difficult to enlarge the stereoscopic image.

The present disclosure has been made to solve the above problems, and an object of the present disclosure is to provide an image output device having a structure for facilitating enlargement of a stereoscopic image.

An image output device according to one embodiment includes a spatial light modulator, an image irradiation unit, and an address light irradiation unit. The spatial light modulator includes a main surface, a back surface opposing the main surface, and a plurality of pixels arranged two-dimensionally along the main surface in a space between the main surface and the back surface. The spatial light modulator reflects light emitted to the main surface and modulates the phase of the light in each of the plurality of pixels. The image irradiation unit emits the two-dimensional optical image toward the main surface. The address light irradiation unit emits address light including a diffraction grating pattern toward the back surface. In addition, each of the plurality of pixels of the spatial light modulator is configured to change a phase modulation amount according to the intensity of the address light emitted from a side of the back surface. The address light irradiation unit is configured to dynamically change a direction of the diffraction grating pattern on the back surface. The image irradiation unit irradiates the main surface with the two-dimensional optical image corresponding to the direction of the diffraction grating pattern.

BRIEF DESCRIPTION OF THE DRAWINGS

FIG. 23 is a table illustrating a result of obtaining the pitch L that satisfies Formula (2) when a designed diffraction angle θ is given in a case where the wavelength λ=532 nm and further substituting the pitch L into Formula (5) to obtain a diffraction angle $θ_B$.

FIG. 26 is a table illustrating a result of obtaining the pitch L that satisfies Formula (2) when the designed diffraction angle θ is given in a case where the wavelength λ=467 nm and further substituting the pitch L into Formula (5) to obtain the diffraction angle $θ_B$.

FIG. 29 is a table illustrating a result of obtaining the pitch L that satisfies Formula (2) when the designed diffraction angle θ is given in a case where the wavelength λ=630 nm and further substituting the pitch L into Formula (5) to obtain the diffraction angle $θ_B$.

FIG. 30A is a diagram illustrating an example of a suitable diffraction grating based on an examination result, and FIG. 30B is a partially enlarged view of FIG. 30A.

FIGS. 34A and 34B are diagrams conceptually illustrating the method of determining a phase modulation amount in each region constituting the diffraction grating.

FIGS. 48A and 48B are diagrams for describing points to be noted in the case of performing a calculation using a general discrete Fourier transform (or fast Fourier transform) when determining the arrangement of each modified refractive index region.

FIG. 49 is a diagram conceptually illustrating one example of a rotation angle distribution $\varphi_1$(x, y).

DETAILED DESCRIPTION

Description of Embodiment of Present Disclosure

Figure 1:
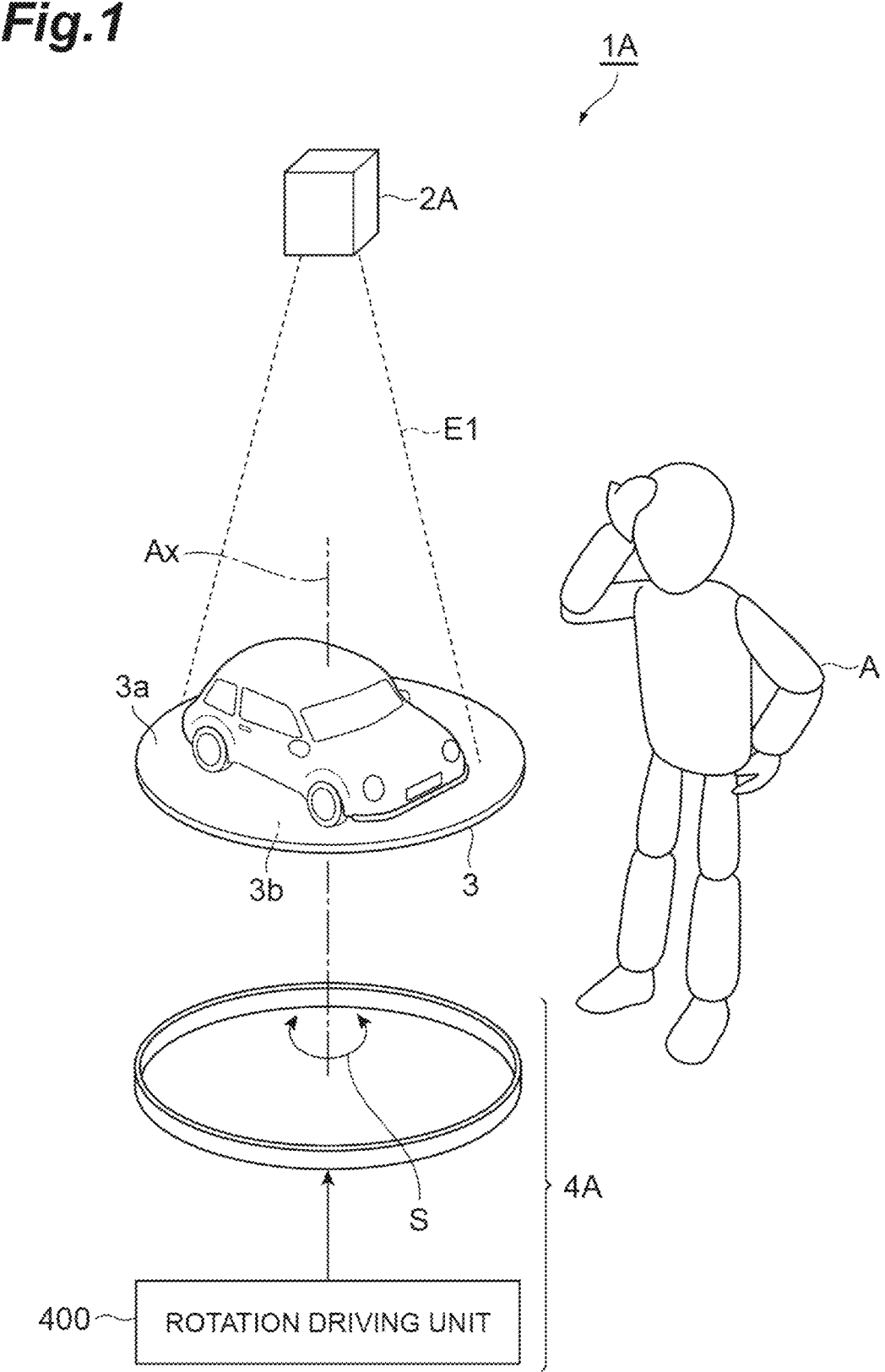
FIG. 1 is a perspective view schematically illustrating an overall configuration of an image output device according to the present embodiment.

First, the contents of an embodiment of the present disclosure will be listed and described individually.

(1) An image output device of the present disclosure includes, as one aspect, a spatial light modulator, an image irradiation unit, and an address light irradiation unit. The spatial light modulator includes a main surface, a back surface opposing the main surface, and a plurality of pixels arranged two-dimensionally along the main surface in a space between the main surface and the back surface. The spatial light modulator reflects light emitted to the main surface and modulates the phase of the light in each of the plurality of pixels. The image irradiation unit emits the two-dimensional optical image toward the main surface. The address light irradiation unit emits address light including a diffraction grating pattern toward the back surface. In addition, each of the plurality of pixels of the spatial light modulator is configured to change a phase modulation amount according to the intensity of the address light emitted from a side of the back surface. The address light irradiation unit is configured to dynamically change a direction of the diffraction grating pattern on the back surface. The image irradiation unit irradiates the main surface with the two-dimensional optical image corresponding to the direction of the diffraction grating pattern.

In the image output device, the address light irradiation unit irradiates the back surface of the spatial light modulator with the address light including the diffraction grating pattern. Since each pixel of the spatial light modulator has a configuration to change the phase modulation amount according to the intensity of the address light emitted to the side of the back surface of each pixel, the spatial light modulator gives a phase pattern corresponding to the diffraction grating pattern to the light incident on the main surface. Therefore, the two-dimensional optical image irradiated from the image irradiation unit to the main surface is deflected in a direction corresponding to the direction of the diffraction grating pattern. Furthermore, since the address light irradiation unit dynamically changes the direction of the diffraction grating pattern on the back surface, the deflection direction of the two-dimensional optical image also dynamically changes. Then, since the image irradiation unit can irradiate the main surface with a two-dimensional optical image corresponding to a desired direction of the diffraction grating pattern, it is possible to present a stereoscopic image to an observer. In addition, according to the image output device, since the stereoscopic image is output by dynamically changing the address light including the diffraction grating pattern, it is possible to output the stereoscopic image while keeping stationary the spatial light modulator that is a light deflecting element. Therefore, it is possible to easily increase the size of the spatial light modulator and enlarge the stereoscopic image as compared with the device that mechanically rotates a holographic screen at a high speed and disclosed in Non-Patent Document 1.

(2) As one aspect of the present disclosure, the address light irradiation unit may rotate the diffraction grating pattern on the above back surface. In this case, it is possible to present the stereoscopic image in the entire circumferential direction of 360°.

(3) As one aspect of the present disclosure, the spatial light modulator may include a light reflecting layer, a liquid crystal layer, a light transmissive first electrode layer, an impedance changing layer, and a light transmissive second electrode layer. The light reflecting layer is provided between the main surface and the back surface. The liquid crystal layer is provided between the light reflecting layer and the main surface. The light transmissive first electrode layer is provided between the liquid crystal layer and the main surface. The impedance changing layer is provided between the light reflecting layer and the back surface. The impedance changing layer expresses an impedance distribution according to an intensity distribution of the address light. The light transmissive second electrode layer is provided between the impedance changing layer and the back surface. In addition, the liquid crystal layer has a plurality of partition walls that divide liquid crystal into sections each corresponding to any one of the plurality of pixels. In this case, when the back surface of the spatial light modulator is irradiated with the address light, the impedance distribution of the impedance changing layer becomes a distribution corresponding to the intensity distribution of the address light. In a case where a voltage is applied between the first electrode layer and the second electrode layer, a strong electric field is applied to the liquid crystal layer in a pixel in which the impedance of the impedance changing layer is small. In addition, in a pixel in which the impedance of the impedance changing layer is large, a weak electric field is applied to the liquid crystal layer, or no electric field is applied thereto. Therefore, according to the image output device, it is possible to achieve a configuration in which in each pixel of the spatial light modulator, the phase modulation amount is changed according to the intensity of the address light emitted to the side of the back surface of each pixel. Furthermore, since the liquid crystal layer has the partition walls that divide the liquid crystal into sections each corresponding to any one pixel, the interaction of the liquid crystal between the pixels can be reduced, and the phase pattern corresponding to the diffraction grating pattern can be made clearer.

(4) As one aspect of the present disclosure, the plurality of partition walls may be two-dimensionally arranged along both a first direction on the main surface and a second direction orthogonal to the first direction on the main surface, and a pitch between adjacent partition walls arranged along the second direction may be larger than a pitch between adjacent partition walls arranged along the first direction. In this case, since a direction of the liquid crystal is easily aligned, the light transmission/non-transmission transmission characteristics of the liquid crystal with respect to a specific polarization direction can be effectively exhibited.

(5) As one aspect of the present disclosure, the pitch between adjacent partition walls arranged along the second direction may be twice or more the pitch between adjacent partition walls arranged along the first direction. According to findings of the inventors, in this case, since the direction of the liquid crystal is particularly likely to be aligned, the light transmission/non-transmission characteristics of the liquid crystal with respect to a specific polarization direction can be more effectively exhibited.

(6) As one aspect of the present disclosure, the plurality of partition walls may be two-dimensionally arranged along both the first direction on the main surface and the second direction orthogonal to the first direction on the main surface, and both a pitch between adjacent partition walls arranged along the first direction and a pitch between partition walls arranged along the second direction may be 5 µm or less. In this way, by constituting the partition walls at such small intervals, the pixel size of the spatial light modulator can be decreased, and as a result, a period $\Lambda$ of the diffraction grating can be shortened. Therefore, since a diffraction angle $\theta$ of the two-dimensional optical image by the spatial light modulator can be increased and an output direction of the stereoscopic image can be brought close to a plane including the main surface of the spatial light modulator, a three-dimensional image can be observed in a wide angular range, and a practical stereoscopic image can be provided to the observer existing around the spatial light modulator.

(7) As one aspect of the present disclosure, the impedance changing layer may include at least one of hydrogenated amorphous silicon, a GaN-based compound, an InP-based compound, and a GaAs-based compound. When receiving light, the impedance of these materials changes. Therefore, in this case, it is possible to suitably achieve the impedance changing layer that expresses an impedance distribution according to an intensity distribution of the address light.

(8) As one aspect of the present disclosure, in the above image output device, the spatial light modulator may include a laminate structure body, a first metal film, a second metal film, an impedance changing layer, and a light transmissive electrode layer. The laminate structure body includes a first surface, a second surface opposing the first surface, a transparent conductive layer provided between the first surface and the second surface, and a dielectric layer provided between the first surface and the second surface. The two-dimensional optical image is inputted to the first surface of the laminate structure body. The first metal film is provided on the first surface of the laminate structure body. The second metal film is provided on the second surface of the laminate structure body. The second metal film reflects the two-dimensional optical image inputted to the laminate structure body toward the first surface. The impedance changing layer is provided on the opposite side of the laminate structure body with respect to the second metal film. The impedance changing layer expresses an impedance distribution according to an intensity distribution of the address light. The light transmissive electrode layer is provided on the opposite side of the second metal film with respect to the impedance changing layer. In addition, both the first metal film and the second metal film may include a plurality of partial metal films corresponding to a plurality of pixels and separated from each other. In the configuration, part of the laminate structure body is exposed from between the plurality of partial metal films constituting the first metal film when viewed from a layered direction.

When the back surface of the spatial light modulator is irradiated with the address light, the impedance distribution of the impedance changing layer becomes a distribution corresponding to the intensity distribution of the address light. In a case where a voltage is applied between the first metal film and the electrode layer, a strong electric field is applied between the first metal film and the second metal film in the pixel in which the impedance of the impedance changing layer is small. In addition, in the pixel in which the impedance of the impedance changing layer is large, a weak electric field is applied between the first metal film and the second metal film or no electric field is applied therebetween in the pixel. In addition, in the image output device, the laminate structure body includes a pair of portions. The pair of portions is provided at a pair of positions sandwiching the first metal film as viewed from the layered direction, and is exposed from the first metal film. The wave of light inputted to one of the pair of portions is guided between the first metal film and the second metal film, and is outputted from the other of the pair of portions to the outside. In a case where the width of the first metal film and the thickness of the laminate structure body are sufficiently smaller than the wavelength of light, when an electric field is applied between the first metal film and the second metal film, induced currents in mutually opposite directions called gap surface plasmon modes are generated in each of the first metal film and the second metal film, and strong magnetic resonance (plasmon resonance) is generated in the laminate structure body. By using the magnetic resonance, it is possible to modulate the phase of the light passing between the first metal film and the second metal film. Here, when an electric field is applied between the first metal film and the second metal film, electron density in the vicinity of an interface between the transparent conductive layer included in the laminate structure body and the dielectric layer increases. As a result, a portion in the vicinity of the interface of the transparent conductive layer is effectively metallized, and the effective refractive index of the laminate structure body greatly changes. Since the amount of modulation in the above phase modulation depends on the effective refractive index of the laminate structure body, the effective refractive index can be controlled by changing the electric field between the first metal film and the second metal film, and as a result, the phase of output light can be controlled. Therefore, according to the image output device, it is possible to achieve a configuration in which in each pixel of the spatial light modulator, the phase modulation amount is changed according to the intensity of the address light emitted to the side of the back surface of each pixel.

(9) As one aspect of the present disclosure, the address light irradiation unit may include a light emitting unit and a driving unit. The light emitting unit outputs address light including a diffraction grating pattern. The driving unit dynamically changes an attitude angle of the light emitting unit around an optical axis. In this case, the address light irradiation unit that dynamically changes the direction of the diffraction grating pattern on the back surface can be suitably achieved.

(10) As one aspect of the present disclosure, the address light irradiation unit may include a plurality of light emitting units and an optical system. The plurality of light emitting units is arranged along a circumference and outputs address light including a diffraction grating pattern. The optical system optically couples the plurality of light emitting units and the back surface. In addition, address light from some light emitting units (one or two or more light emitting units) selected from the plurality of light emitting units and corresponding to the direction of the diffraction grating pattern is inputted to the back surface. In this case, a mechanical driving unit can be eliminated, leading to improvement of reliability. In addition, since the optical system includes a meta-lens, a large-area and thin optical system can be achieved, and the back surface of the spatial light modulator can be irradiated with address light having a relatively large spread. Note that as one aspect of the present disclosure, the optical system may include a meta-lens.

(11) As one aspect of the present disclosure, the address light irradiation unit may include a light emitting unit provided along a circumference. The light emitting unit outputs address light including a diffraction grating pattern with a periodic direction as a radial direction of the circumference. In addition, the light emitting unit may be a plurality of element electrodes arranged along the circumferential direction of the circumference. Among the plurality of element electrodes, the element electrode corresponding to the direction of the diffraction grating pattern selectively emits the address light. In this case, the address light irradiation unit that dynamically changes the direction of the diffraction grating pattern on the back surface can be suitably achieved.

(12) As one aspect of the present disclosure, the light emitting unit may include a plurality of light emitting regions arranged on the basis of a diffraction grating pattern. Alternatively, as one aspect of the present disclosure, the light emitting unit may include a surface emitting laser element having an active layer and a phase modulation layer. The phase modulation layer may include a base layer and a plurality of modified refractive index regions having a refractive index different from a refractive index of the base layer. The plurality of modified refractive index regions is two-dimensionally distributed on a plane perpendicular to a thickness direction of the phase modulation layer. In addition, in a virtual square lattice set on a surface of the phase modulation layer, a center of gravity of each of the plurality of modified refractive index regions may be set to a first state or a second state. Note that the first state is defined by a state in which the center of gravity of each of the plurality of modified refractive index regions is arranged away from a corresponding lattice point among lattice points of the virtual square lattice and a rotation angle around the corresponding lattice point is individually set for each of the plurality of modified refractive index regions. The second state is defined by a state in which the center of gravity of each of the plurality of modified refractive index regions is arranged on a straight line that passes through a corresponding lattice point among the lattice points of the virtual square lattice and is inclined with respect to the virtual square lattice and a distance between the center of gravity of each of the plurality of modified refractive index regions and the corresponding lattice point is individually set. The light emitting unit that outputs the address light including the diffraction grating pattern can be suitably achieved by any one of the first and second states.

(13) As one aspect of the present disclosure, the light emitting unit may include a photonic crystal surface emitting laser element and a periodic structure. The photonic crystal surface emitting laser element includes an active layer and a photonic crystal layer. The periodic structure is provided on a light emitting surface of the photonic crystal surface emitting laser element. In the periodic structure, an opening and a light shielding portion are periodically provided according to the diffraction grating pattern. In this case, the light emitting unit that outputs the address light including the diffraction grating pattern can be suitably achieved.

(14) As one aspect of the present disclosure, the address light irradiation unit may include a laser light source, a branching unit, and an interference optical system. The branching unit branches a laser beam outputted from the laser light source. The interference optical system generates an interference fringe by causing one laser beam and the other laser beam branched by the branching unit to interfere with each other. In addition, the interference optical system includes a position changing unit that dynamically changes a relative positional relationship at the time of interference between one laser beam and the other laser beam. The interference fringe may be used as the diffraction grating pattern. In this way, the interference fringe can be used as the diffraction grating pattern. In addition, by dynamically changing the relative positional relationship at the time of interference between one laser beam and the other laser beam, a direction of the interference fringe, that is, the direction of the diffraction grating pattern can be dynamically changed. Therefore, in this case, the address light irradiation unit can be suitably achieved.

(15) As one aspect of the present disclosure, the diffraction grating pattern may have a configuration in which a light intensity changes periodically in a certain direction, and the light intensity may become strong or weak stepwise and monotonically within each period. Note that the number of regions having different light intensities within each period is three or more. In this case, the deflection of the two-dimensional optical image in a direction opposite to a desired deflection direction can be reduced, and the stereoscopic image can be output more clearly.

(16) As one aspect of the present disclosure, the image output device may further include a filter arranged between the image irradiation unit and the spatial light modulator. The filter reduces the intensities of at least some wavelength components among other wavelength components included in the two-dimensional optical image and excluding visible light. As a result, the degree of influence of the light of the two-dimensional optical image from the image irradiation unit on the phase modulation amount of the spatial light modulator can be reduced.

As described above, each aspect listed in the [Description of Embodiment of Present Disclosure] is applicable to each of all remaining aspects or to all combinations of these remaining aspects.

Details of Embodiment of Present Invention

Hereinafter, a specific structure of the image output device according to the present disclosure will be described in detail with reference to the accompanying drawings. Note that the present invention is not limited to these examples and is indicated by the scope of claims, and is intended to include all modifications within the meanings and scopes equivalent to the scope of claims. In addition, in the description of the drawings, the same elements will be denoted by the same reference sign, and redundant description will be omitted.

In the following description, "having a light transmissive property" means transmitting 50% or more of light having a wavelength to be transmitted.

Present Embodiment

Figure 2:
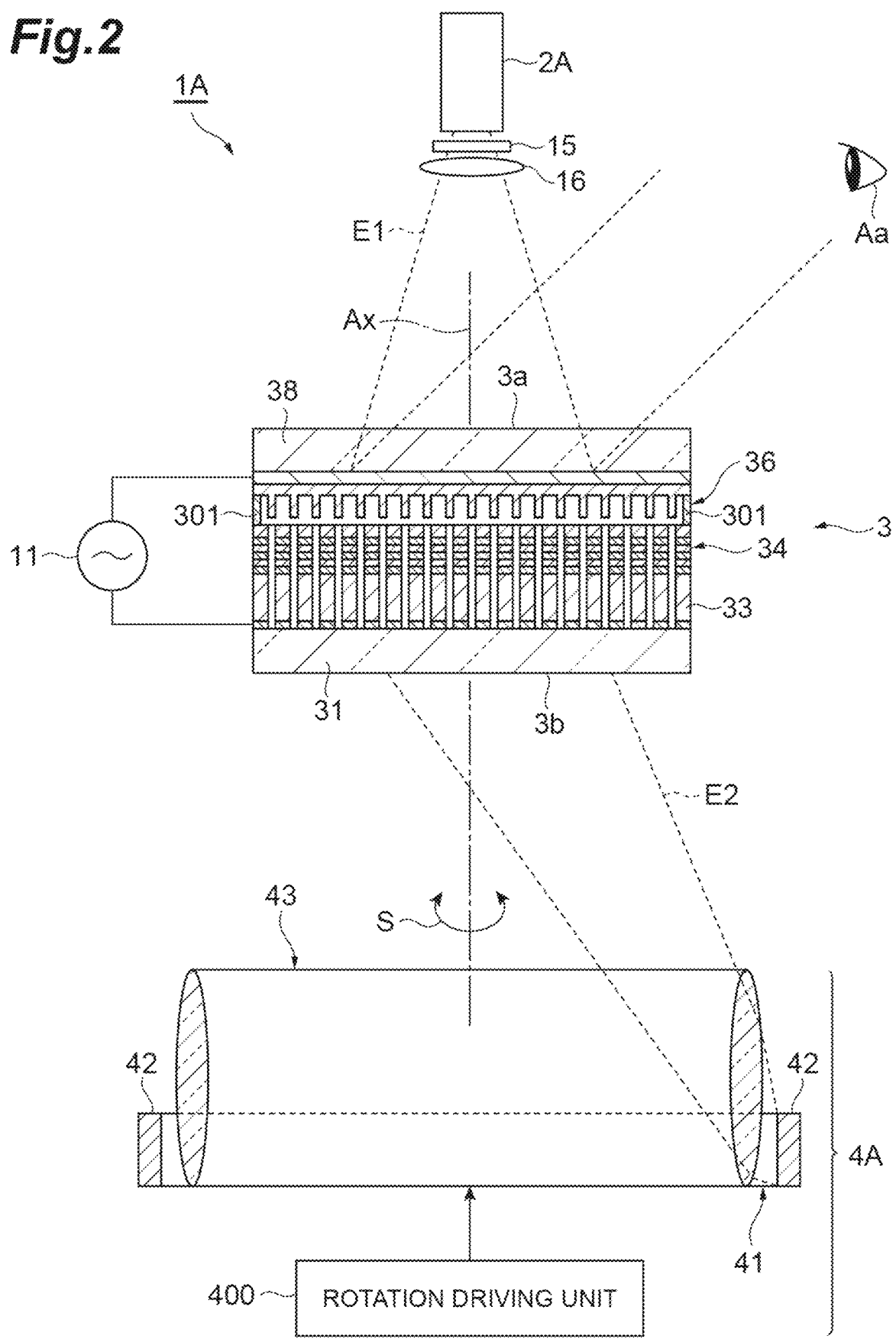
FIG. 2 is a cross-sectional view of the image output device.

FIG. 1 is a perspective view schematically illustrating an overall configuration of an image output device 1A according to the present embodiment. FIG. 2 is a cross-sectional view of the image output device 1A. The image output device 1A is a device that simulatively shows a stereoscopic (three-dimensional) image to an observer A present on a side of the image output device 1A. As illustrated in FIGS. 1 and 2, the image output device 1A includes a high-speed projector 2A, a spatial light modulator 3, and an address light irradiation unit 4A. The spatial light modulator 3 is a plate-like device having a main surface (upper surface) 3a and a back surface (lower surface) 3b located on the opposite side of the main surface 3a. The main surface 3a and the back surface 3b are flat and parallel to each other, and in one example, normal directions thereof are along a vertical direction. The high-speed projector 2A is arranged above the spatial light modulator 3 while opposing the main surface 3a. The address light irradiation unit 4A is arranged below the spatial light modulator 3 while opposing the back surface 3b, and includes a rotation driving unit 400 that rotates a diffraction grating pattern with respect to a central axis AX indicating the center of the spatial light modulator 3 in a direction indicated by an arrow S.

The high-speed projector 2A is an example of an image irradiation unit in the present embodiment, and irradiates the main surface 3a of the spatial light modulator 3 with light E1 including a two-dimensional optical image. An incident direction of the light E1 with respect to the main surface 3a coincides with the normal direction of the main surface 3a. The high-speed projector 2A may output the light E1 having a single wavelength or may output the light E1 including a plurality of wavelength components. A single or the plurality of wavelength components of the light E1 is included in a visible light region. In one example, the plurality of wavelength components is a green component, a blue component, and a red component. The high-speed projector 2A can be suitably configured by, for example, a digital light processing (DLP) projector using a digital micromirror device (DMD). The frame rate of the high-speed projector 2A is, for example, 1 k or more frames per second or more and 100 k or less frames per second. The frame rate is preferably set to a suitable value according to the rotation speed of the diffraction grating pattern outputted from the address light irradiation unit 4A to be described later.

As illustrated in FIG. 2, a filter 15 and a lens 16 are provided side by side on a light path between the high-speed projector 2A and the spatial light modulator 3. The filter 15 is a wavelength filter that reduces (or removes) the intensities of at least some wavelength components among other wavelength components included in the light E1 and excluding visible light. In one example, the filter 15 is a band-pass filter that reduces (or removes) the intensities of all other wavelength components included in the light E1 and excluding visible light. Note that the filter 15 may have a reducing (or removing) effect on other wavelength ranges including a wavelength component included in the light E1 and excluding any wavelength range. In this case, other wavelength ranges may include a visible range. The lens 16 is an imaging lens that forms an image of the light E1 on the retina of an eye Aa of the observer A. Note that although the filter 15 is arranged between the high-speed projector 2A and the lens 16 in an example illustrated in FIG. 2, the lens 16 may be arranged between the high-speed projector 2A and the filter 15.

Figure 3:
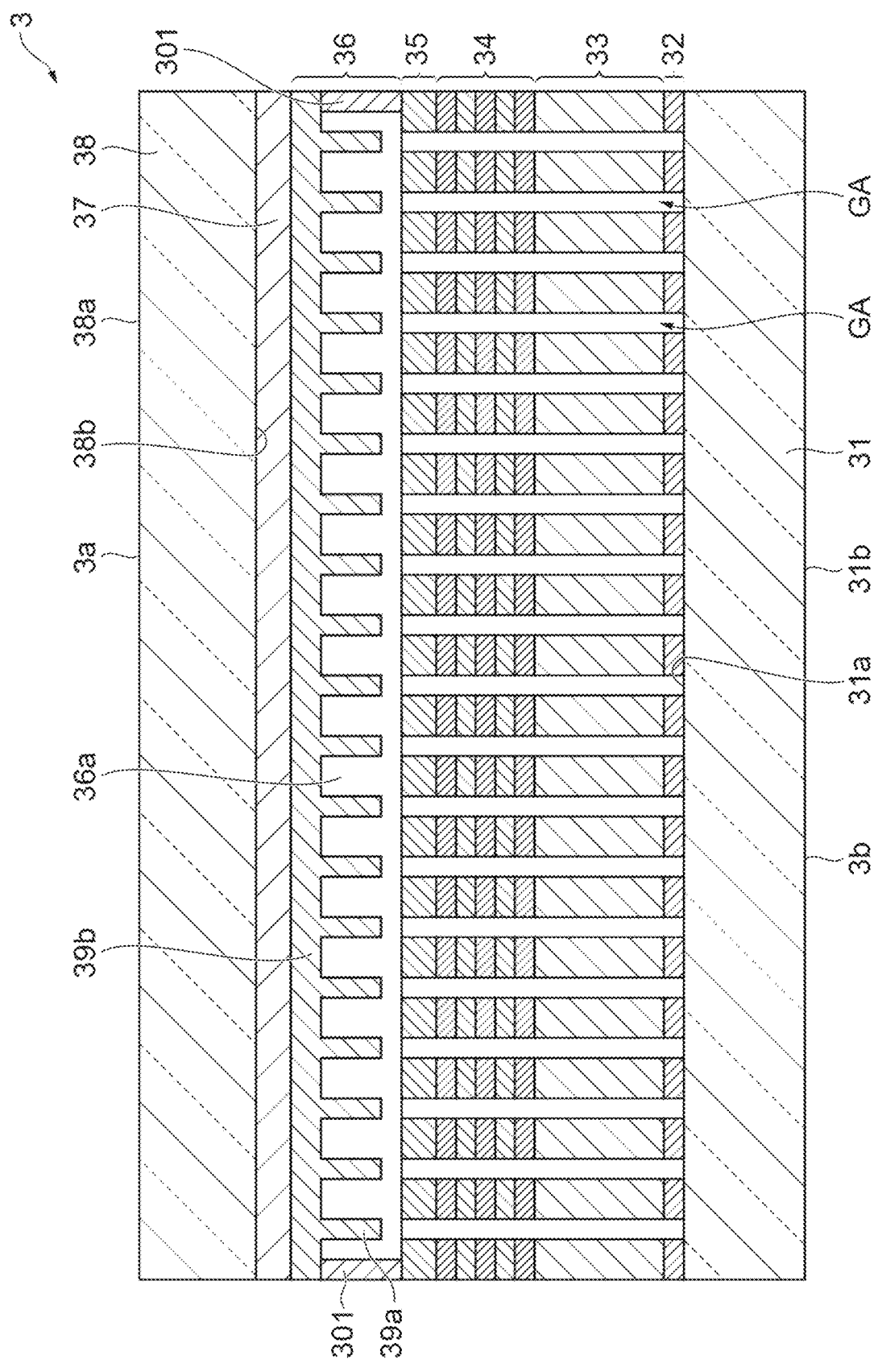
FIG. 3 is a cross-sectional view of a spatial light modulator and illustrates a cross section intersecting a main surface and a back surface.

The spatial light modulator 3 reflects the light E1 including the two-dimensional optical image with which the main surface 3a is irradiated, and modulates the phase of the light E1 for each of a plurality of pixels arranged two-dimensionally. Each pixel of the spatial light modulator 3 has a configuration to change a phase modulation amount according to the intensity of each pixel of address light E2 emitted from a side of the back surface 3b. FIG. 3 is a cross-sectional view of the spatial light modulator 3, and illustrates a cross section intersecting the main surface 3a and the back surface 3b. As illustrated in FIG. 3, the spatial light modulator 3 includes a transparent substrate 31, a transparent electrode layer 32, an impedance changing layer 33, a dielectric mirror 34, a liquid crystal alignment film 35, a liquid crystal layer 36, a transparent electrode layer 37, and a transparent substrate 38.

The transparent substrate 31 is a plate-like member having a light transmissive property. The term "light transmissive property" as used herein refers to a property of transmitting the address light E2 (see FIG. 2) to be described later. In one example, the transparent substrate 31 is a glass substrate. The transparent substrate 31 includes a main surface 31a and a back surface 31b that are parallel to each other and face in opposite directions to each other. The main surface 31a and the back surface 31b are flat and smooth surfaces. The back surface 31b coincides with the back surface 3b of the spatial light modulator 3. The thickness of the transparent substrate 31 is, for example, 20 µm or more and 1 mm or less.

The transparent electrode layer 32 is an example of the second electrode layer in the present embodiment, and is located between the impedance changing layer 33 and the back surface 3b. In an example illustrated in FIG. 3, the transparent electrode layer 32 is in contact with the main surface 31a of the transparent substrate 31. The transparent electrode layer 32 has a light transmissive property similarly to the transparent substrate 31. That is, the transparent electrode layer 32 transmits the address light E2 (see FIG. 2) to be described later. A constituent material of the transparent electrode layer 32 includes, for example, at least one of indium tin oxide (ITO) and zinc oxide-based conductive materials (aluminum-doped zinc oxide (AZO) and gallium-doped zinc oxide (GZO)). The thickness of the transparent electrode layer 32 is, for example, 1 nm or more and 1 µm or less. The transparent electrode layer 32 is divided for each pixel, and the transparent electrode layer 32 of each pixel is separated from each other with a gap (slit) GA interposed therebetween.

The impedance changing layer 33 is a semiconductor layer located between the dielectric mirror 34 and the back surface 3b. In the example illustrated in FIG. 3, the impedance changing layer 33 is located between the dielectric mirror 34 and the transparent electrode layer 32. The impedance changing layer 33 expresses an impedance distribution according to an intensity distribution of the address light E2 (see FIG. 2). Specifically, when receiving light, the impedance of a material constituting the impedance changing layer 33 changes monotonously according to the light intensity of the light. Examples of such a material include hydrogenated amorphous silicon, a GaN-based compound, an InP-based compound, and a GaAs-based compound. Therefore, the impedance changing layer 33 of the present embodiment can include at least one of hydrogenated amorphous silicon, a GaN-based compound (for example, i-type GaN), an InP-based compound (for example, i-type InP), and a GaAs-based compound (for example, i-type GaAs). Note that a constituent material of the impedance changing layer 33 is not limited thereto, and may be, for example, a semiconductor material having photoconductivity. The wavelength of the address light E2 is, for example, 400 nm or more and 2 µm or less. If the address light E2 is infrared light, even if the address light E2 leaks out to the main surface 3a, the address light E2 is not visible to the observer A and does not become noise light, which is preferable. The thickness of the impedance changing layer 33 is, for example, 10 nm or more and 20 µm or less. The impedance changing layer 33 is divided for each pixel, and the impedance changing layer 33 of each pixel is separated from each other with a gap GA interposed therebetween.

The dielectric mirror 34 is an example of a light reflecting layer in the present embodiment, and reflects the light E1 emitted to the main surface 3a. The dielectric mirror 34 is located between the main surface 3a and the back surface 3b, and as a specific example, is located between the impedance changing layer 33 and the liquid crystal layer 36. In the example illustrated in FIG. 3, the dielectric mirror 34 is in contact with the impedance changing layer 33. The dielectric mirror 34 has a structure in which a high refractive index dielectric layer and a low refractive index dielectric layer having a relatively low refractive index with respect to the high refractive index dielectric layer are alternately layered. The high refractive index dielectric layer includes, for example, at least one of $Ta_2O_5$, $TiO_2$, $Nb_2O_5$, SiN, $Al_2O_3$, and $HfO_2$. In addition, the low refractive index dielectric layer includes, for example, at least one of $SiO_2$ and $MgF_2$. The dielectric mirror 34 is divided for each pixel, and the dielectric mirrors 34 of the respective pixels are separated from each other with the gap GA interposed therebetween.

The liquid crystal alignment film 35 is of a parallel alignment type, is provided on the dielectric mirror 34, and in one example, is in contact with the dielectric mirror 34. The liquid crystal alignment film 35 can include, for example, a polycarbonate film and an alignment film (for example, AL-1254 manufactured by JSR Corporation) provided on the polycarbonate film. The liquid crystal alignment film 35 is divided for each pixel, and the liquid crystal alignment film 35 of each pixel is separated from each other with the gap GA interposed therebetween.

Figure 4A:
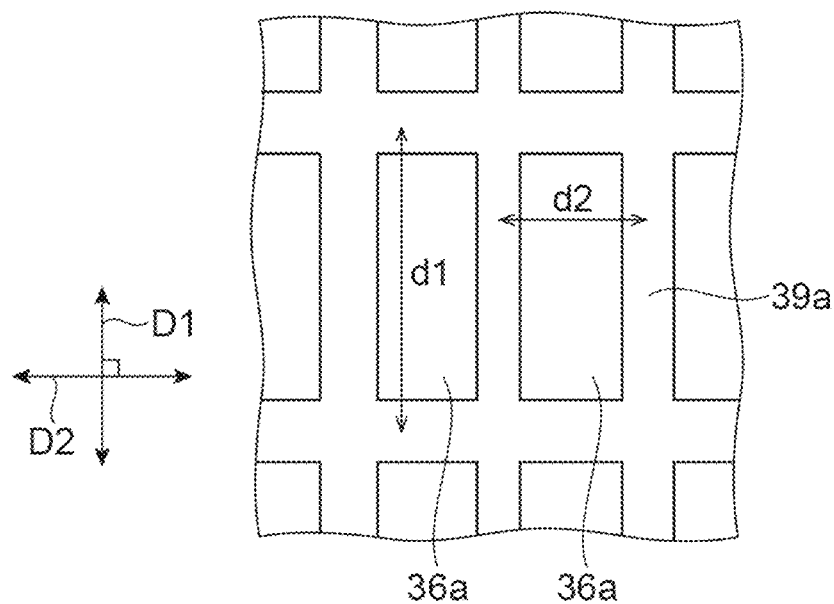
FIG. 4A is a partially enlarged plan view of a partition wall.
Figure 4B:
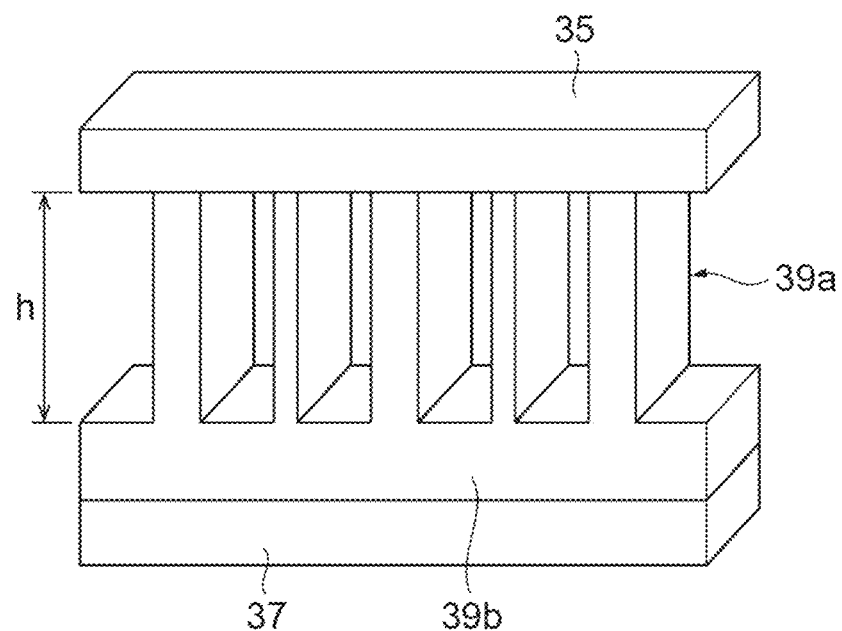
FIG. 4B is a partially enlarged perspective view of the partition wall and illustrates a structure in the vicinity of the partition wall upside down.

The liquid crystal layer 36 is located between the dielectric mirror 34 and the main surface 3a, and as a specific example, is located between the dielectric mirror 34 and the transparent electrode layer 37. In one example, the liquid crystal layer 36 includes nematic liquid crystal 36a. In addition, the liquid crystal layer 36 has a partition wall 39a that divides the nematic liquid crystal 36a into sections each corresponding to each pixel. The partition wall 39a is comprised of resin, for example. Alternatively, the partition wall 39a may include, for example, a semiconductor material such as Si or an inorganic material such as $SiO_2$ and SiN. FIG. 4A is a partially enlarged plan view of the partition wall 39a. FIG. 4B is a partially enlarged perspective view of the partition wall 39a, and illustrates a structure in the vicinity of the partition wall 39a upside down. As illustrated in FIGS. 4A and 4B, the partition wall 39a of the present embodiment has a planar shape like a lattice shape, and divides liquid crystal into rectangular sections as viewed from the thickness direction of the liquid crystal layer 36. Note that the present invention is not limited to this example, and the partition wall 39a may divide the liquid crystal into square sections. In addition, the partition wall 39a is formed integrally with a layer 39b provided on the liquid crystal layer 36. The partition wall 39a and the liquid crystal alignment film 35 are joined to each other via a spacer 301 surrounding the liquid crystal layer 36. The spacer 301 is a resin adhesive including dispersion beads. The diameter of the dispersion bead is larger than a height h of the partition wall 39a, and the diameter is, for example, about several µm. As a result, a gap through which the liquid crystal can pass is formed between the liquid crystal alignment film 35 and the partition wall 39a. The height h of the partition wall 39a is, for example, 1 µm. The width w of the partition wall 39a is, for example, 0.17 µm or more and 0.2 µm or less.

As illustrated in FIG. 4A, the partition wall 39a includes a portion extending in a first direction D1 along the main surface 3a and a portion extending in a second direction D2 that is along the main surface 3a and intersects (for example, is orthogonal to) the first direction D1. A pitch (center interval) d1 between the portions extending in the second direction D2 is larger than a pitch d2 between the portions extending in the first direction D1. Therefore, the planar shape of one space (pixel) divided by the partition wall 39a is a rectangle having the first direction D1 as a long-side direction. The pitch d1 may be twice or more the pitch d2, and in one embodiment, the pitch d1 is twice the pitch d2. In addition, both the pitches d1 and d2 may be 5 µm or less, and in one embodiment, the pitch d1 is 1 µm and the pitch d2 is 0.5 µm.

FIG. 3 is referred again. The transparent electrode layer 37 is an example of the first electrode layer in the present embodiment, and is located between the liquid crystal layer 36 and the main surface 3a. In the example illustrated in FIG. 3, the transparent electrode layer 37 is in contact with a surface of the layer 39b integrated with the partition wall 39a, which is located on the opposite side of the partition wall 39a. The transparent electrode layer 37 has a light transmissive property. The term "light transmissive property" as used herein refers to a property of transmitting the light E1 (see FIG. 2) including the two-dimensional optical image emitted from the high-speed projector 2A. In one example, the transparent electrode layer 37 transmits a wavelength band including a visible light region. A constituent material of the transparent electrode layer 37 includes, for example, at least one of ITO and zinc oxide-based conductive materials (AZO and GZO). The thickness of the transparent electrode layer 37 is, for example, 1 nm or more and 1 μm or less. Unlike the transparent electrode layer 32, the transparent electrode layer 37 is not divided for each pixel, and is integrally provided over a plurality of pixels.

The transparent substrate 38 is a plate-like member having a light transmissive property similarly to the transparent electrode layer 37. That is, the transparent substrate 38 transmits the light E1 (see FIG. 2) including the two-dimensional optical image emitted from the high-speed projector 2A. In one example, the transparent substrate 38 is a glass substrate. The transparent substrate 38 includes a main surface 38a and a back surface 38b that are parallel to each other and face in opposite directions to each other. The main surface 38a and the back surface 38b are flat and smooth surfaces. The main surface 38a coincides with the main surface 3a of the spatial light modulator 3. The back surface 38b faces the transparent electrode layer 37 and is in contact with, for example, the transparent electrode layer 37. The thickness of the transparent substrate 38 is, for example, 20 μm or more and 1 mm or less.

The operation of the spatial light modulator 3 is as follows. First, an alternating-current voltage is applied in a state in which an alternating-current voltage source 11 (see FIG. 2) is connected between the transparent electrode layer 32 and the transparent electrode layer 37. The effective voltage of the alternating-current voltage is, for example, 3 volts, and the frequency thereof is, for example, in the range of 10 Hz to 100 Hz. When the side of the back surface 3b is irradiated with the address light E2, the address light E2 reaches the impedance changing layer 33 and imparts an impedance distribution to the impedance changing layer 33. That is, in a pixel in which the light intensity of the address light E2 is small, the impedance of the impedance changing layer 33 is kept large, and in a pixel in which the light intensity of the address light E2 is large, the impedance of the impedance changing layer 33 becomes small. Therefore, the impedance distribution of the impedance changing layer 33 becomes a distribution corresponding to the intensity distribution of the address light E2. In the pixel in which the impedance of the impedance changing layer 33 has decreased, a voltage given to the liquid crystal layer 36 becomes large, and a strong electric field is applied to the liquid crystal layer 36. In addition, in the pixel in which the impedance of the impedance changing layer 33 is kept large, the impedance of the impedance changing layer 33 is larger than the impedance of the liquid crystal layer 36, so that the voltage given to the liquid crystal layer 36 is small, and a weak electric field is applied to the liquid crystal layer 36 (or no electric field is applied). Note that the address light E2 is blocked by the dielectric mirror 34 and does not reach the liquid crystal layer 36.

The main surface 3a is irradiated with light E1 including the two-dimensional optical image from the high-speed projector 2A. After the light E1 is transmitted through the transparent substrate 38, the transparent electrode layer 37, and the liquid crystal layer 36, the light E1 is reflected by the dielectric mirror 34, transmitted through the liquid crystal layer 36, the transparent electrode layer 37, and the transparent substrate 38 again, and then emitted from the main surface 3a to the outside of the spatial light modulator 3. In the liquid crystal layer 36, liquid crystal molecules of the nematic liquid crystal 36a are inclined when an electric field is applied. The inclination of the liquid crystal molecules depends on a magnitude of the applied electric field. As the liquid crystal molecules incline, the equivalent refractive index of the nematic liquid crystal 36a with respect to the light E1 decreases, and the phase of the light E1 advances in the nematic liquid crystal 36a. Therefore, a phase distribution corresponding to a light intensity distribution of the address light E2 is given with respect to the light E1. In the spatial light modulator 3, response time required for phase modulation of π(rad) is, for example, approximately 30 milliseconds, and in this case, a pattern change of 30 frames per second can be achieved.

Figure 5A:
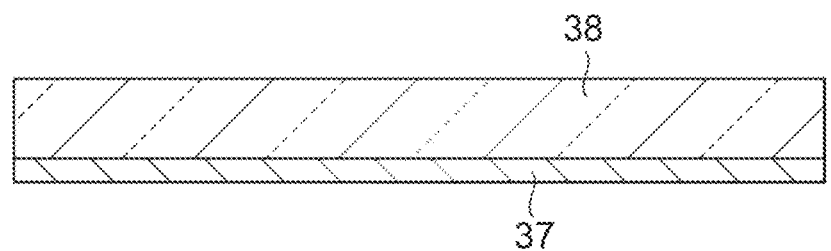
FIGS. 5A to 5D are cross-sectional views illustrating each step in a method for manufacturing the spatial light modulator.
Figure 5B:
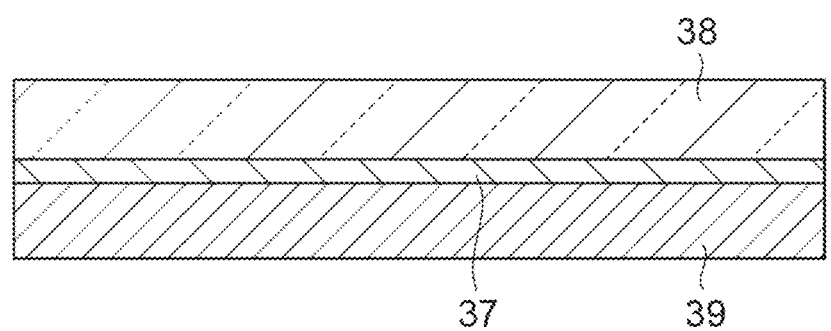
Figure 5C:
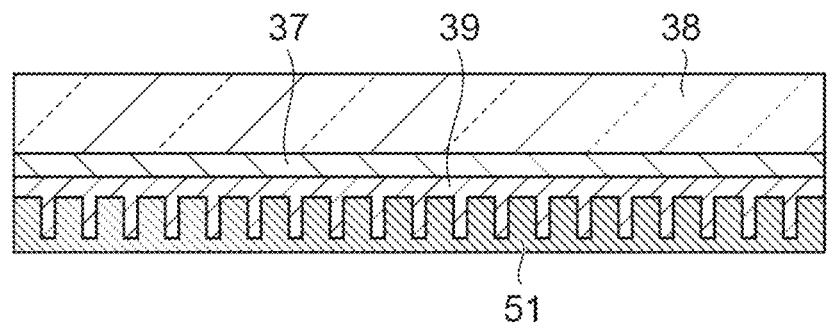
Figure 5D:
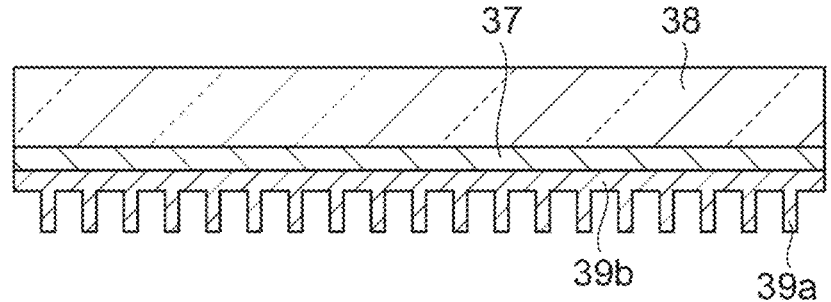

Here, an example of a method for manufacturing the spatial light modulator 3 will be described. FIGS. 5A to 5D and FIGS. 6A to 6D are cross-sectional views illustrating each step in the method for manufacturing the spatial light modulator 3. First, as illustrated in FIG. 5A, the transparent substrate 38 is prepared, and the transparent electrode layer 37 is formed on one surface of the transparent substrate 38. A method for forming the transparent electrode layer 37 is, for example, a vacuum vapor deposition method or sputtering. Next, as illustrated in FIG. 5B, an ultraviolet curable resin 39 for the partition wall 39a is applied onto the surface of the transparent electrode layer 37 opposite to the transparent substrate 38. Then, as illustrated in FIG. 5C, a mold 51 having a lattice-shaped groove corresponding to the partition wall 39a is pressed against the ultraviolet curable resin 39 (nanoimprint), and while such a state is kept, the ultraviolet curable resin 39 is irradiated with ultraviolet light to cure the ultraviolet curable resin 39. Thereafter, the mold 51 is removed. As a result, as illustrated in FIG. 5D, the partition wall 39a and the layer 39b are formed.

Figure 6A:
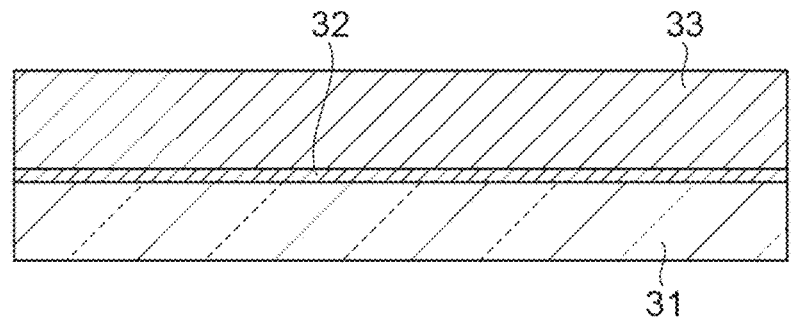
FIGS. 6A to 6D are cross-sectional views illustrating each step in the method for manufacturing the spatial light modulator.
Figure 6B:
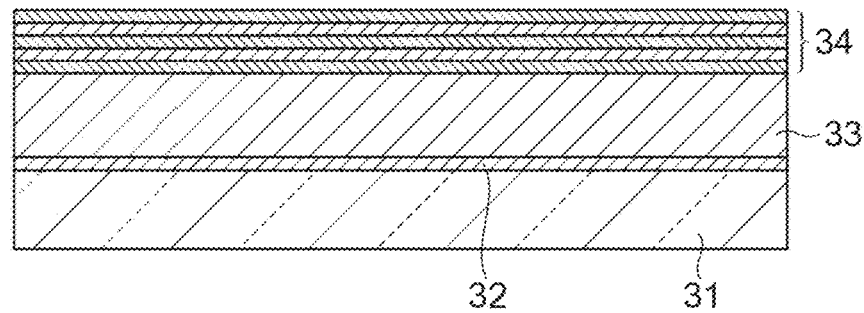
Figure 6C:
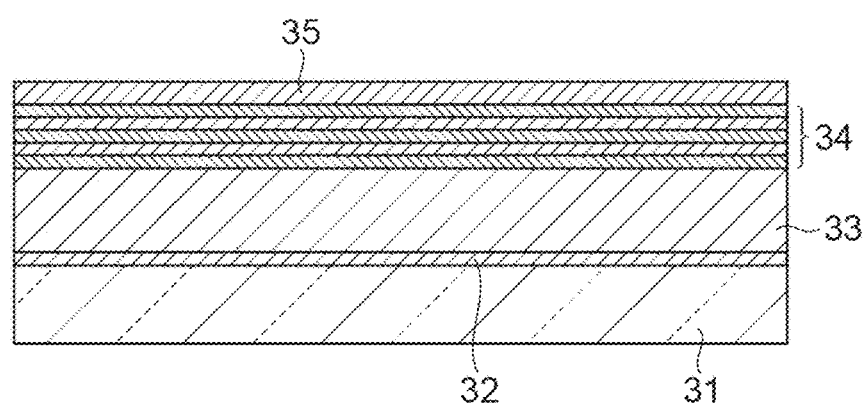
Figure 6D:
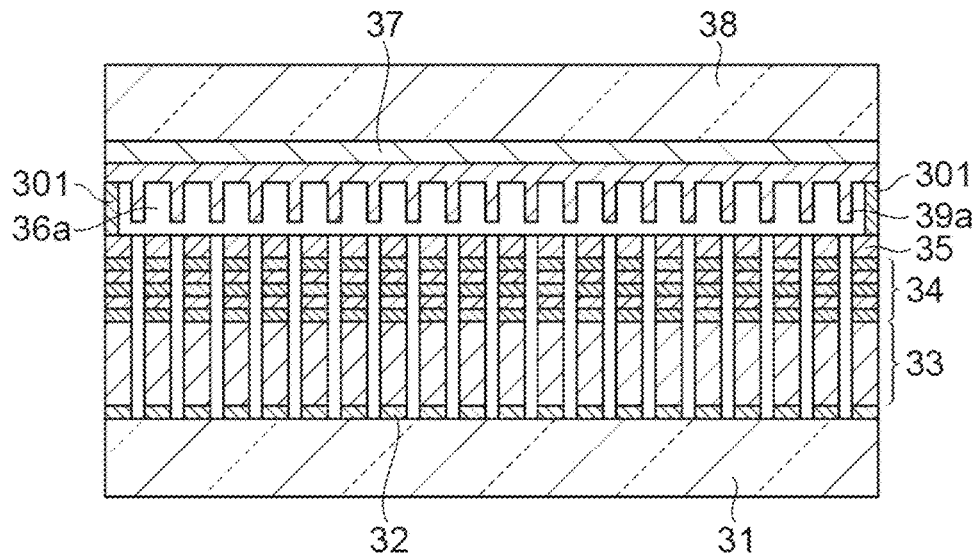

In addition, as illustrated in FIG. 6A, the transparent substrate 31 is prepared, and the transparent electrode layer 32 is formed on one surface of the transparent substrate 31. A method for forming the transparent electrode layer 32 is, for example, a vacuum vapor deposition method or sputtering. Next, an impedance changing layer 33 is formed on the transparent electrode layer 32. The impedance changing layer 33 is formed by, for example, vacuum deposition or sputtering. Thereafter, as illustrated in FIG. 6B, the dielectric mirror 34 is formed on the impedance changing layer 33. That is, the dielectric mirror 34 is formed by alternately layering the high refractive index dielectric layer and the low refractive index dielectric layer having a relatively low refractive index with respect to the high refractive index dielectric layer. A method for forming the high refractive index dielectric layer and the low refractive index dielectric layer is, for example, a vacuum vapor deposition method or sputtering. Then, as illustrated in FIG. 6C, a liquid crystal alignment film 35 is arranged on the dielectric mirror 34. Specifically, a polycarbonate film and an alignment film are layered.

Subsequently, an adhesive containing dispersion beads is applied to the periphery of a region to be filled with the liquid crystal on the liquid crystal alignment film 35, and the partition wall 39a illustrated in FIG. 5D and the liquid crystal alignment film 35 illustrated in FIG. 6C are joined to each other (FIG. 6D)). At this time, the diameter of the dispersion beads is made larger than the height of the partition wall 39a, and a gap through which the nematic liquid crystal 36a can pass is provided between the partition wall 39a and the liquid crystal alignment film 35. In addition, the adhesive is not applied to an opening for filling the liquid crystal. When the adhesive is cured, the whole is depressurized. Then, after the nematic liquid crystal 36a is injected from the opening for filling the liquid crystal, the opening is sealed by applying the adhesive. In this way, the spatial light modulator 3 is completed.

Figure 7:
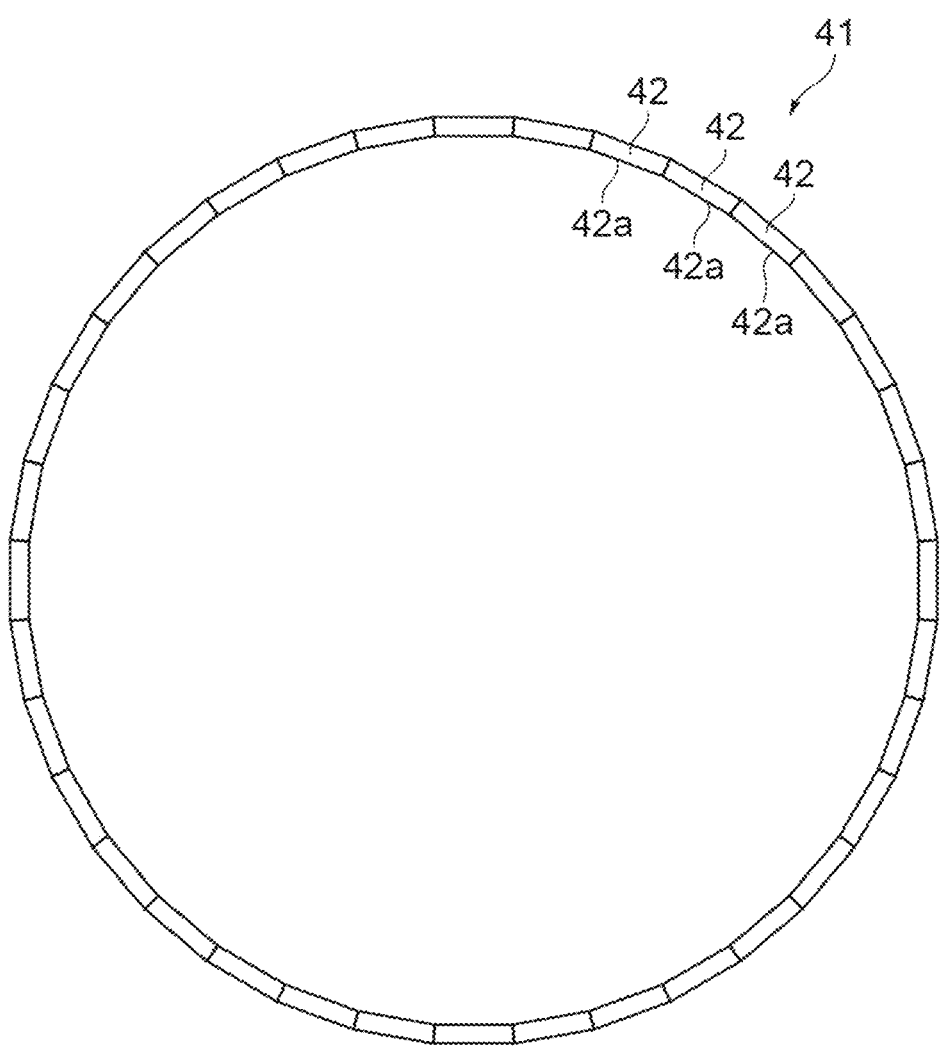
FIG. 7 is a plan view of a light emitting device as viewed from the axial direction of an annular ring.
Figure 8:
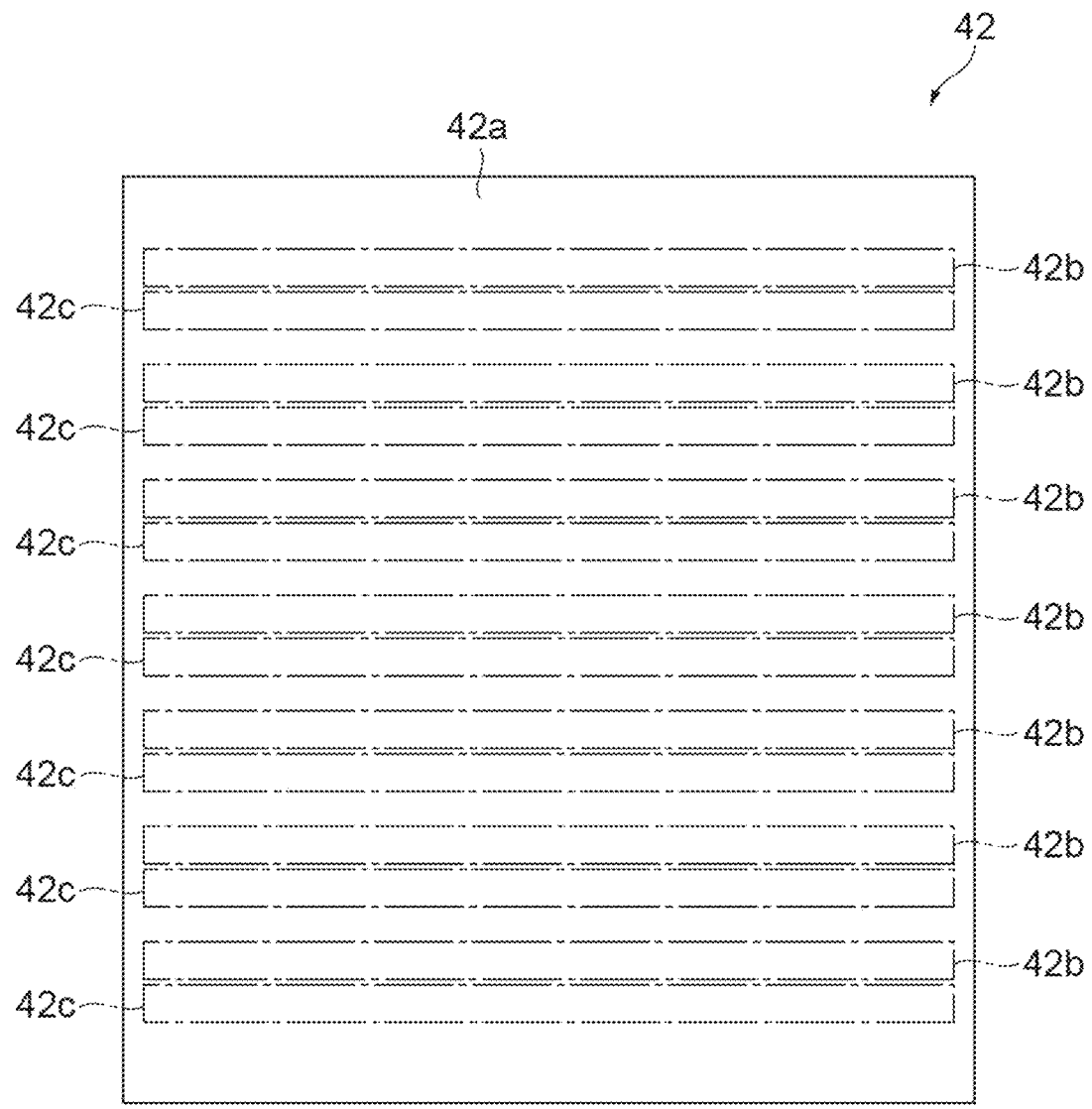
FIG. 8 is a front view illustrating a light emitting surface of one light emitting unit.

FIG. 2 is referred again. The address light irradiation unit 4A irradiates the back surface 3b of the spatial light modulator 3 with the address light E2 including the diffraction grating pattern. The address light irradiation unit 4A of the present embodiment includes a light emitting device 41 of an annular ring shape, an optical system 43 arranged inside the light emitting device 41, and the rotation driving unit 400. FIG. 7 is a plan view of the light emitting device 41 as viewed from the axial direction of an annular ring. As illustrated in FIG. 7, the light emitting device 41 includes a plurality of light emitting units 42 arranged on the basis of the diffraction grating pattern. The plurality of light emitting units 42 is arranged along the circumference with the light emitting surface 42a facing inward. FIG. 8 is a front view illustrating the light emitting surface 42a of one light emitting unit 42. As illustrated in FIG. 8, each light emitting unit 42 has, on the light emitting surface 42a, light emitting regions 42b and 42c arranged periodically and alternately in a vertical direction on the basis of the diffraction grating pattern. By having such light emitting regions 42b and 42c, each light emitting unit 42 can output the address light E2 including the diffraction grating pattern to be described later in a near-field image. The light emitting regions 42b and 42c can be suitably configured by providing a periodic structure (see, for example, FIGS. 38A and 38B to be described later) in which an opening and a light shielding portion are periodically provided according to a diffraction grating pattern on a light emitting surface of a surface emitting type semiconductor light emitting element such as a light emitting diode and a surface emitting laser. The surface emitting laser may be a vertical cavity surface emitting laser (VCSEL), a photonic crystal surface emitting laser (PCSEL) with an active layer and a photonic crystal layer, or an S-iPM laser (to be described later).

As illustrated in FIG. 2, the optical system 43 optically couples the plurality of light emitting units 42 and the back surface 3b of the spatial light modulator 3. Then, the optical system 43 deflects the address light E2 emitted from the light emitting regions 42b and 42c of each light emitting unit 42 toward the back surface 3b of the spatial light modulator 3. The optical system 43 has an annular ring shape concentric with the light emitting device 41, and the shape of the optical system 43 in a cross section including the central axis of an annular ring includes, for example, an off-axis type convex lens. Alternatively, the shape of optical system 43 in the cross section including the center axis of the annular ring may include a meta-lens. In a case where the optical system 43 includes the meta-lens, it is possible to reduce the thickness of the optical system 43 in a radial direction thereof, which is suitable for dense arrangement. As a result, in a case where adjacent lenses are in contact with each other in a convex lens having an effectively large curvature radius, the convex lens can be replaced with a meta-lens that is a flat lens, and a deflection angle can be further increased. Note that the shape of the optical system 43 is not limited thereto, and various other shapes can be adopted as long as the address light E2 can be deflected toward the back surface 3b.

Figure 9:
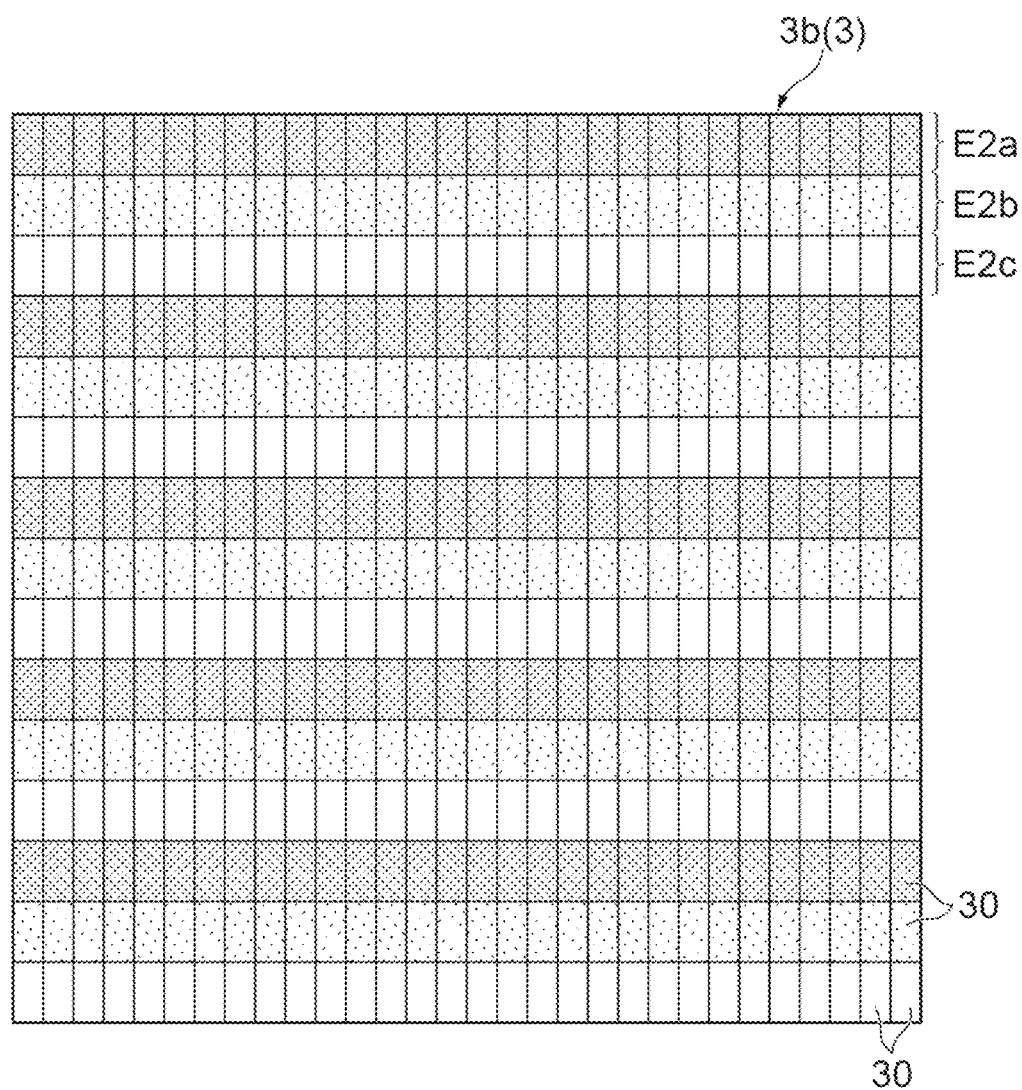
FIG. 9 is a diagram conceptually illustrating a state in which the back surface of the spatial light modulator is irradiated with address light.
Figure 10:
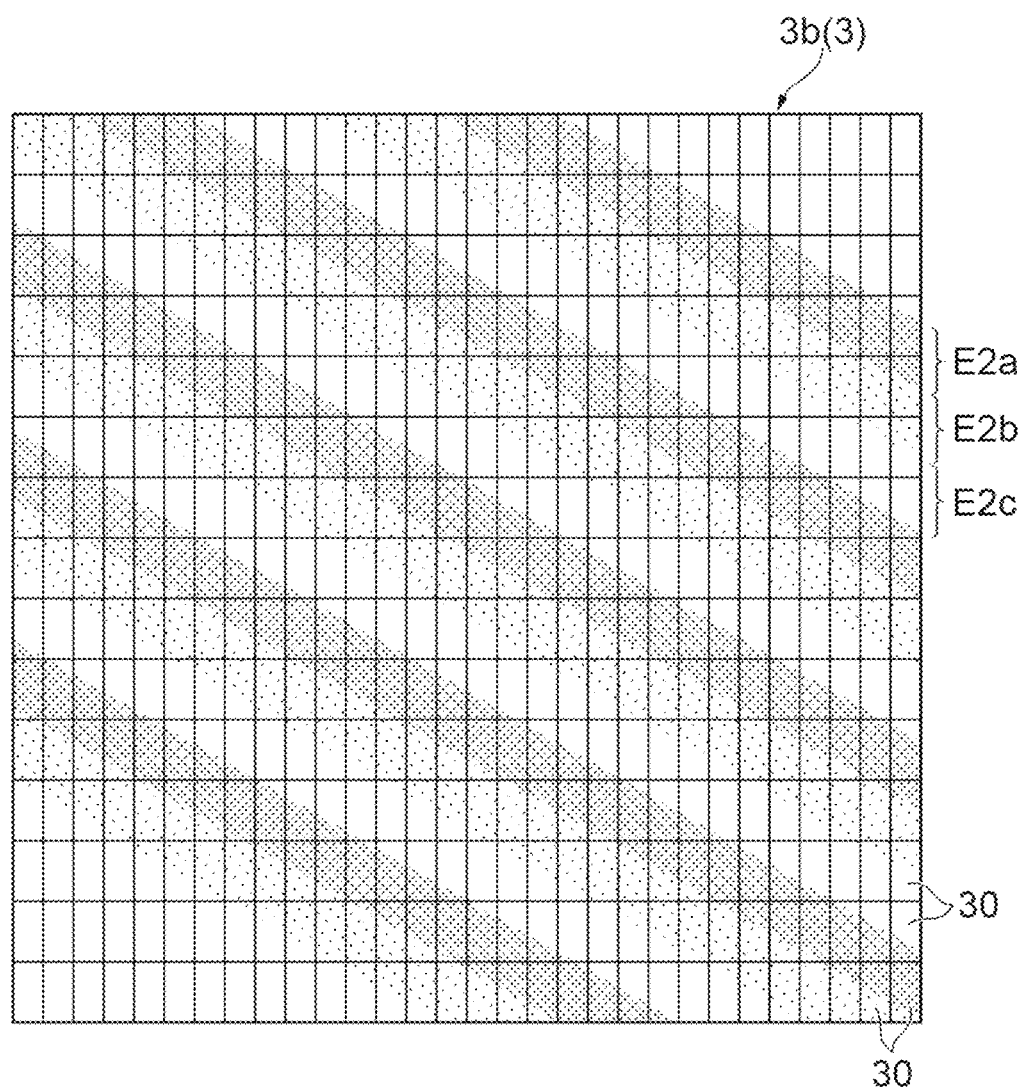
FIG. 10 is a diagram conceptually illustrating a state in which the back surface of the spatial light modulator is irradiated with the address light.
Figure 11:
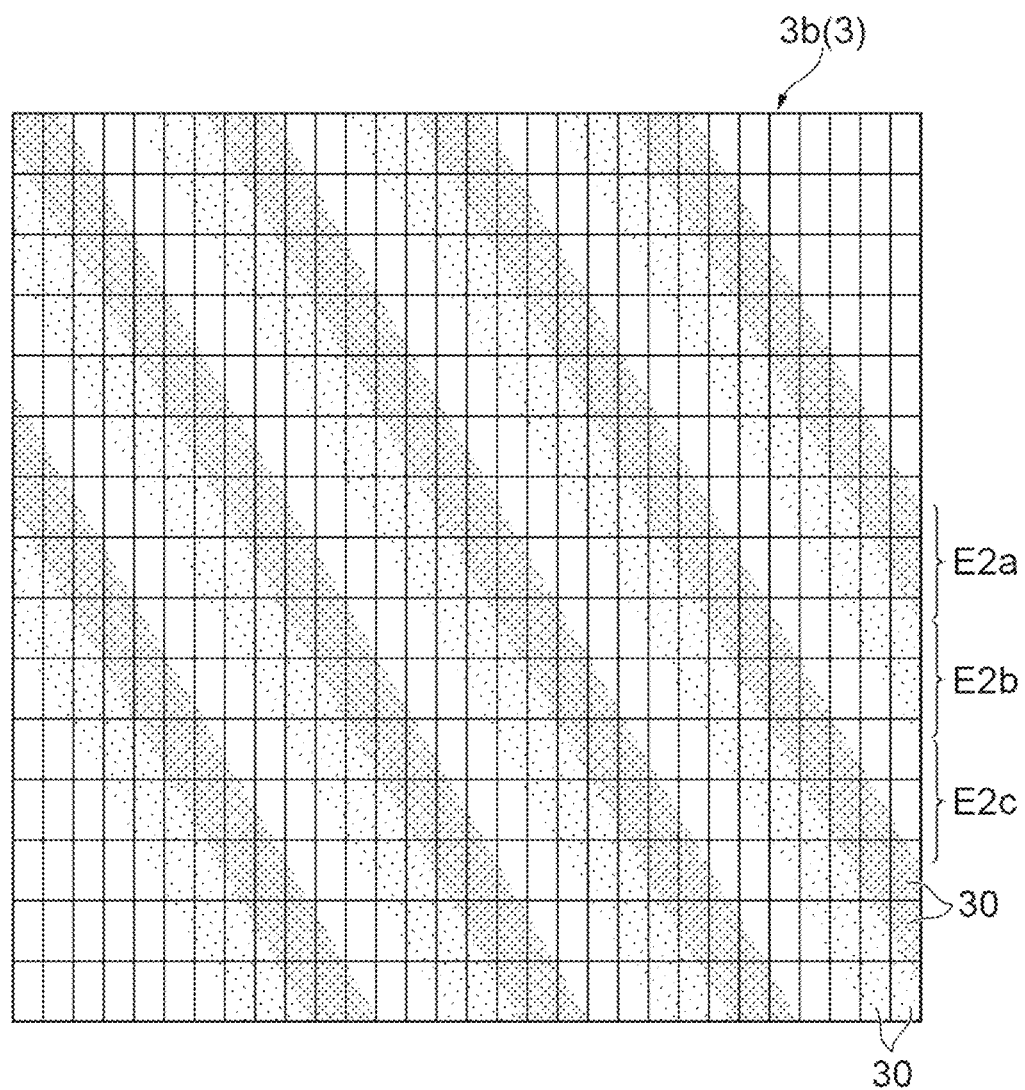
FIG. 11 is a diagram conceptually illustrating a state in which the back surface of the spatial light modulator is irradiated with the address light.
Figure 12:
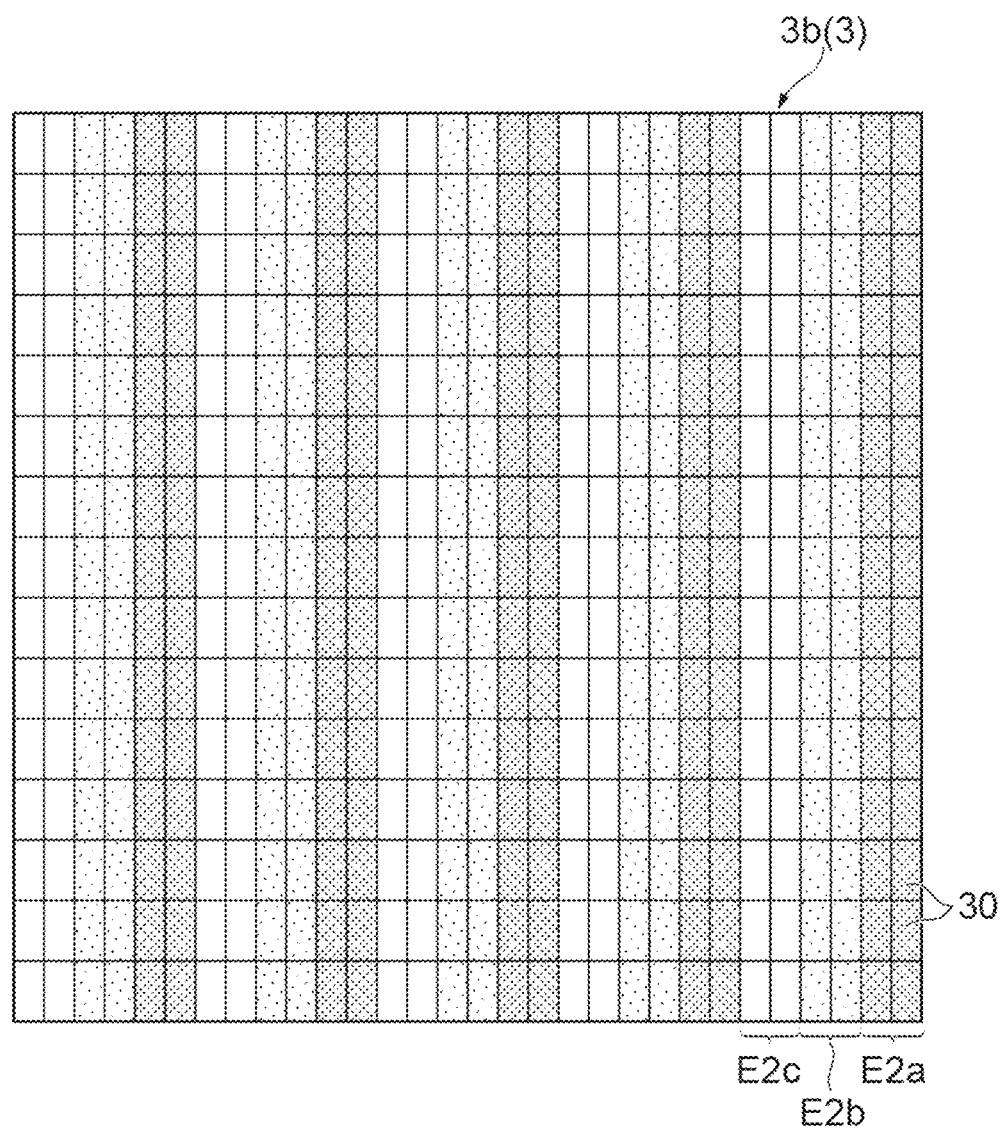
FIG. 12 is a diagram conceptually illustrating a state in which the back surface of the spatial light modulator is irradiated with the address light.

FIGS. 9 to 12 are diagrams conceptually illustrating states in which the back surface 3b of the spatial light modulator 3 is irradiated with the address light E2. In these drawings, the intensity distribution of the address light E2 is represented by color shading. As a region has a deeper color, a light intensity is smaller, and as a region has a lighter color, a light intensity is higher. The address light E2 of the present embodiment includes a region E2a having a small light intensity (or a light intensity is substantially zero), a region E2b having a slightly large light intensity, and a region E2c having a large light intensity, and these three regions E2a to E2c are repeatedly arranged in order, thereby constituting the diffraction grating pattern. In other words, the diffraction grating pattern has a configuration in which the light intensity periodically changes in a certain direction, the light intensity become strong or weak stepwise (that is, monotonously) increases or decreases within each period, and the number of regions in which the light intensities are different from each other within each period is three or more (three in the examples illustrated in FIGS. 9 to 12). As illustrated in FIG. 9, the arrangement cycle of the regions E2a to E2c coincides with or is larger than three times the pixel pitch in the long-side direction of each pixel 30. Then, as illustrated in FIGS. 9 to 12, a direction of the diffraction grating pattern (diffraction grating pattern included in the address light E2 emitted to the back surface 3b) on the back surface 3b is dynamically changed by, for example, the rotation driving unit 400 of the address light irradiation unit 4A illustrated in FIGS. 1 and 2. For example, the direction of the diffraction grating pattern on the back surface 3b is rotated around the center of the back surface 3b (in the direction indicated by the arrow S with a central axis AX of the spatial light modulator 3 as the center). Such a change in the direction of the diffraction grating pattern can be suitably achieved by outputting the address light E2 from some light emitting units 42 selected from the plurality of light emitting units 42 and corresponding to a desired direction of the diffraction grating pattern. The rotation speed of the diffraction grating pattern is, for example, 10 rpm or more and 10000 rpm or less, and in one example, is 3600 rpm.

Effects obtained by the image output device 1A of the present embodiment having the above configuration will be described. In the image output device 1A, the address light irradiation unit 4A irradiates the back surface 3b of the spatial light modulator 3 with the address light E2 including the diffraction grating pattern. Since each pixel 30 of the spatial light modulator 3 has a configuration to change the phase modulation amount according to the intensity of the address light E2 emitted to the side of the back surface 3b of each pixel 30, the spatial light modulator 3 gives a phase pattern corresponding to the diffraction grating pattern to the light E1 incident on the main surface 3a. Therefore, when the two-dimensional optical image emitted from the high-speed projector 2A to the main surface 3a is reflected by the spatial light modulator 3, the two-dimensional optical image is deflected in a direction corresponding to the direction of the diffraction grating pattern and output. Furthermore, since the address light irradiation unit 4A (rotation driving unit 400) dynamically changes the direction of the diffraction grating pattern on the back surface 3b, the deflection direction of the two-dimensional optical image also dynamically changes. When the high-speed projector 2A irradiates the main surface 3a with the two-dimensional optical image corresponding to the direction of the diffraction grating pattern, a stereoscopic image can be presented to the observer A. In addition, according to the image output device 1A, since the stereoscopic image is output by dynamically changing the address light E2 including the diffraction grating pattern, it is possible to output the stereoscopic image while keeping stationary the spatial light modulator 3 that is a light deflecting element. Therefore, it is possible to easily increase the size of the spatial light modulator 3 and enlarge the stereoscopic image as compared with the device that mechanically rotates a holographic screen at a high speed and disclosed in Non-Patent Document 1.

As in the present embodiment, the address light irradiation unit 4A may rotate the diffraction grating pattern on the back surface 3b of the spatial light modulator 3. In this case, it is possible to present the stereoscopic image in the entire circumferential direction of 360°. Note that the dynamic change in the direction of the diffraction grating pattern is not limited to the rotation of the diffraction grating pattern, and may be a rotation operation in a certain limited angular range.

As in the present embodiment, the spatial light modulator 3 may include the dielectric mirror 34, the liquid crystal layer 36, the transparent electrode layer 37, the impedance changing layer 33, and the transparent electrode layer 32. The dielectric mirror 34 is located between the main surface 3a and the back surface 3b. The liquid crystal layer 36 is located between the dielectric mirror 34 and the main surface 3a. The transparent electrode layer 37 is located between the liquid crystal layer 36 and the main surface 3a. The impedance changing layer 33 is located between the dielectric mirror 34 and the back surface 3b and expresses the impedance distribution according to the intensity distribution of the address light E2. The transparent electrode layer 32 is located between the impedance changing layer 33 and the back surface 3b. Then, the liquid crystal layer 36 may have a partition wall 39a that divides the nematic liquid crystal 36a into sections each corresponding to each pixel. When the back surface 3b of the spatial light modulator 3 is irradiated with the address light E2, the impedance distribution of the impedance changing layer 33 becomes a distribution corresponding to the intensity distribution of the address light E2. In a case where a voltage is applied between the transparent electrode layer 37 and the transparent electrode layer 32, a strong electric field is generated in the liquid crystal layer 36 in a pixel in which the impedance of the impedance changing layer 33 is small. In addition, in a pixel in which the impedance of the impedance changing layer 33 is large, a weak electric field is generated in the liquid crystal layer 36. Therefore, according to the image output device 1A, it is possible to achieve a configuration in which in each pixel of the spatial light modulator 3, the phase modulation amount is changed according to the intensity of the address light E2 emitted to the side of the back surface 3b of each pixel. Furthermore, since the liquid crystal layer 36 has the partition wall 39a that divides the nematic liquid crystal 36a into sections each corresponding to each pixel, the interaction of the nematic liquid crystal 36a between the pixels can be reduced, and the phase pattern corresponding to the diffraction grating pattern can be made clearer.

As in the present embodiment, the partition walls 39a may extend in the first direction D1 and the second direction D2 along the main surface 3a, and a pitch between the partition walls 39a adjacent along the second direction D2 may be larger than a pitch between the partition walls 39a adjacent along the first direction D1. In this case, since a direction of the nematic liquid crystal 36a is easily aligned, the light transmission/non-transmission characteristics of the nematic liquid crystal 36a with respect to a specific polarization direction can be effectively exhibited.

As in the present embodiment, the pitch between the partition walls 39a adjacent along the second direction D2 may be twice or more the pitch between the partition walls 39a adjacent along the first direction D1. According to findings of the inventor, in this case, since the direction of the nematic liquid crystal 36a is particularly likely to be aligned, the light transmission/non-transmission characteristics of the nematic liquid crystal 36a with respect to the specific polarization direction can be more effectively exhibited.

As in the present embodiment, both the pitch between the partition walls 39a adjacent along the first direction D1 and the pitch between the partition walls 39a adjacent along the second direction D2 may be 5 µm or less. In this way, by constituting the partition walls 39a at such small intervals, the pixel size of the spatial light modulator 3 can be decreased, and as a result, a period $\Lambda$ of the diffraction grating can be shortened. Therefore, as will be described later, since a diffraction angle $\theta$ of the two-dimensional optical image by the spatial light modulator 3 can be increased, and an output direction of the stereoscopic image can be brought close to a plane including the main surface 3a of the spatial light modulator 3, a practical stereoscopic image can be provided to the observer A existing around the spatial light modulator 3.

As in the present embodiment, the impedance changing layer 33 may include at least one of hydrogenated amorphous silicon, a GaN-based compound, an InP-based compound, and a GaAs-based compound. When receiving light, the impedance of these materials changes. Therefore, in this case, it is possible to suitably achieve the impedance changing layer 33 that expresses the impedance distribution according to the intensity distribution of the address light E2.

As in the present embodiment, the address light irradiation unit 4A may include the plurality of light emitting units 42 arranged along the circumference and capable of outputting the address light E2 including the diffraction grating pattern and the optical system 43 that optically couples the plurality of light emitting units 42 and the back surface 3b. Then, some light emitting units 42 selected from the plurality of light emitting units 42 and corresponding to the desired direction of the diffraction grating pattern may output the address light E2. In this case, a mechanical driving unit can be eliminated, leading to improvement of reliability. In addition, in this case, since the optical system 43 includes the meta-lens, the large-area and thin optical system 43 can be achieved, and the back surface 3b of the spatial light modulator 3 can be irradiated with the address light E2 having a relatively large spread.

As in the present embodiment, the image output device 1A may include the filter 15 that is arranged between the high-speed projector 2A and the spatial light modulator 3 and reduces the intensities of at least some wavelength components among other wavelength components included in the two-dimensional optical image and excluding visible light. As a result, an amount of light E1 incident on the impedance changing layer 33 can be reduced, and the degree of influence of the light E1 on the phase modulation amount of the spatial light modulator 3 can be reduced.

As in the present embodiment, the transparent electrode layer 32, the impedance changing layer 33, the dielectric mirror 34, and the liquid crystal alignment film 35 may be divided for each pixel, and each pixel portion may be separated from each other with the gap GA interposed therebetween. In this case, crosstalk between adjacent pixels can be reduced.

As described above, the light emitting unit 42 may have a PCSEL having an active layer and a photonic crystal layer, and a periodic structure that is provided on a light emitting surface of the PCSEL and in which an opening and a light shielding portion are periodically repeated according to a diffraction grating pattern. In this case, the light emitting unit 42 that outputs the address light including the diffraction grating pattern can be suitably achieved.

Figure 13:
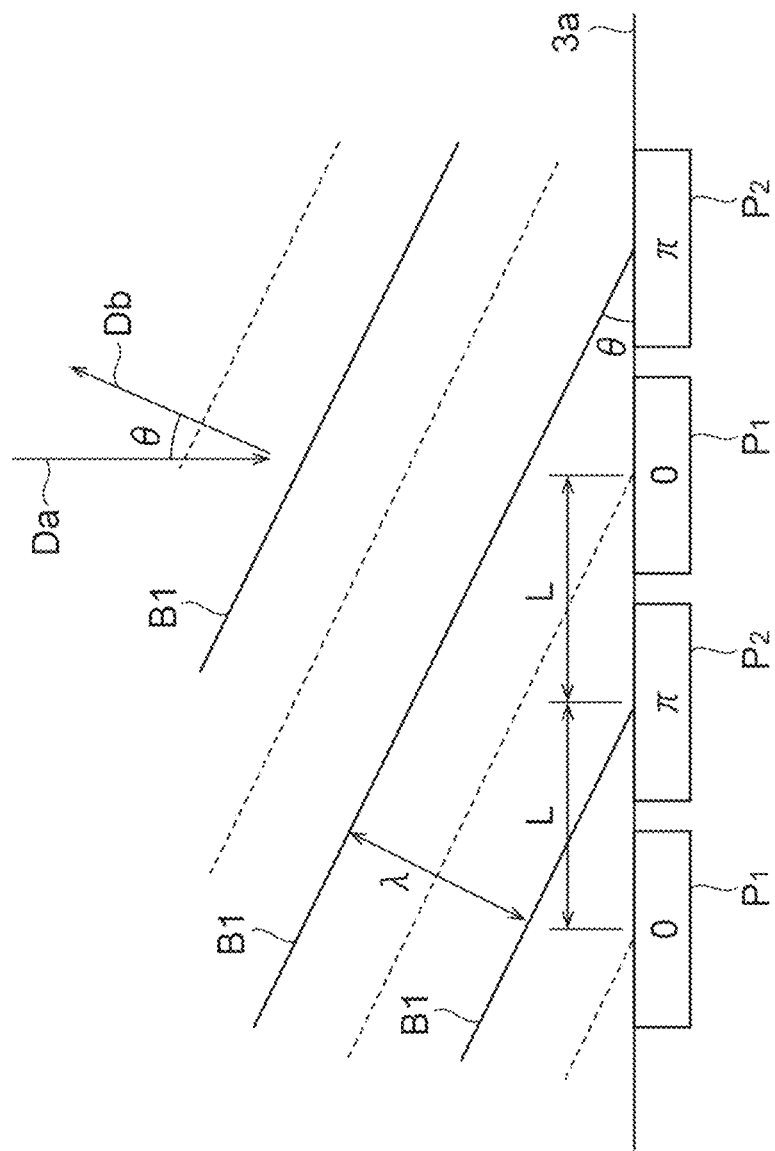
FIG. 13 is a diagram illustrating a case where a region $P_1$ in which a phase modulation amount is 0(rad) and a region $P_2$ in which the phase modulation amount is π(rad) are periodically alternately arranged in a diffraction grating.

Here, the diffraction grating achieved in the spatial light modulator 3 will be described in detail. FIG. 13 illustrates a case where a region $P_1$ in which the phase modulation amount is 0(rad) and a region $P_2$ in which the phase modulation amount is $\pi$(rad) are periodically alternately arranged. A straight line B1 in the drawing indicates a wavefront in a case where the two-dimensional optical image emitted from the normal direction of the main surface 3a is diffracted by the diffraction grating. In this example, a relationship between the diffraction angle $\theta$, the wavelength $\lambda$ of the two-dimensional optical image, and the arrangement pitch L of the regions $P_1$ and $P_2$ is expressed by the following Formula (1):

$$2L \sin \theta = \lambda \quad (1).$$

Note that the diffraction angle $\theta$ is an angle formed by a normal direction Da that is the incident direction of the two-dimensional optical image and a normal direction of a wavefront, that is, a light emission direction Db, and the angle is equal to an angle formed by the main surface 3a and the wavefront B1. For example, when it is desired to set the diffraction angle $\theta$ to 30°, L=$\lambda$ needs to be satisfied.

Figure 14:
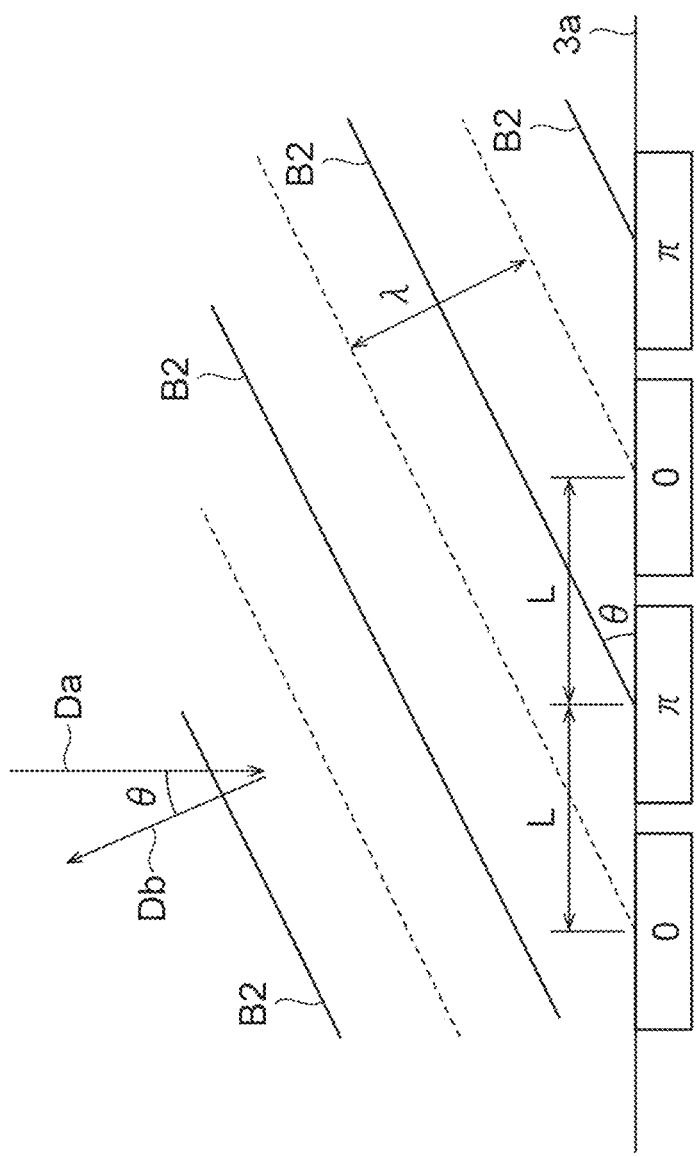
FIG. 14 is a diagram illustrating a wavefront B2 traveling in a direction opposite to a wavefront B1.

However, in this case, as illustrated in FIG. 14, a wavefront B2 traveling in a direction opposite to the wavefront B1 when viewed from the normal direction of the main surface 3a is also generated at the same time. The diffraction angle $\theta$ of the wavefront B2 is equal to the diffraction angle $\theta$ of the wavefront B1. That is, the wavefront B2 is emitted in a direction line-symmetric with the wavefront B1 with respect to the normal line of the main surface 3a. Therefore, the same two-dimensional optical image is seen by another observer at a position opposing the observer A in FIG. 1. Therefore, the two-dimensional optical image to be originally shown at each position around the spatial light modulator 3 and the two-dimensional optical image to be shown at a position shifted by 180° from the position are seen while being overlapped with each other.

Figure 15:
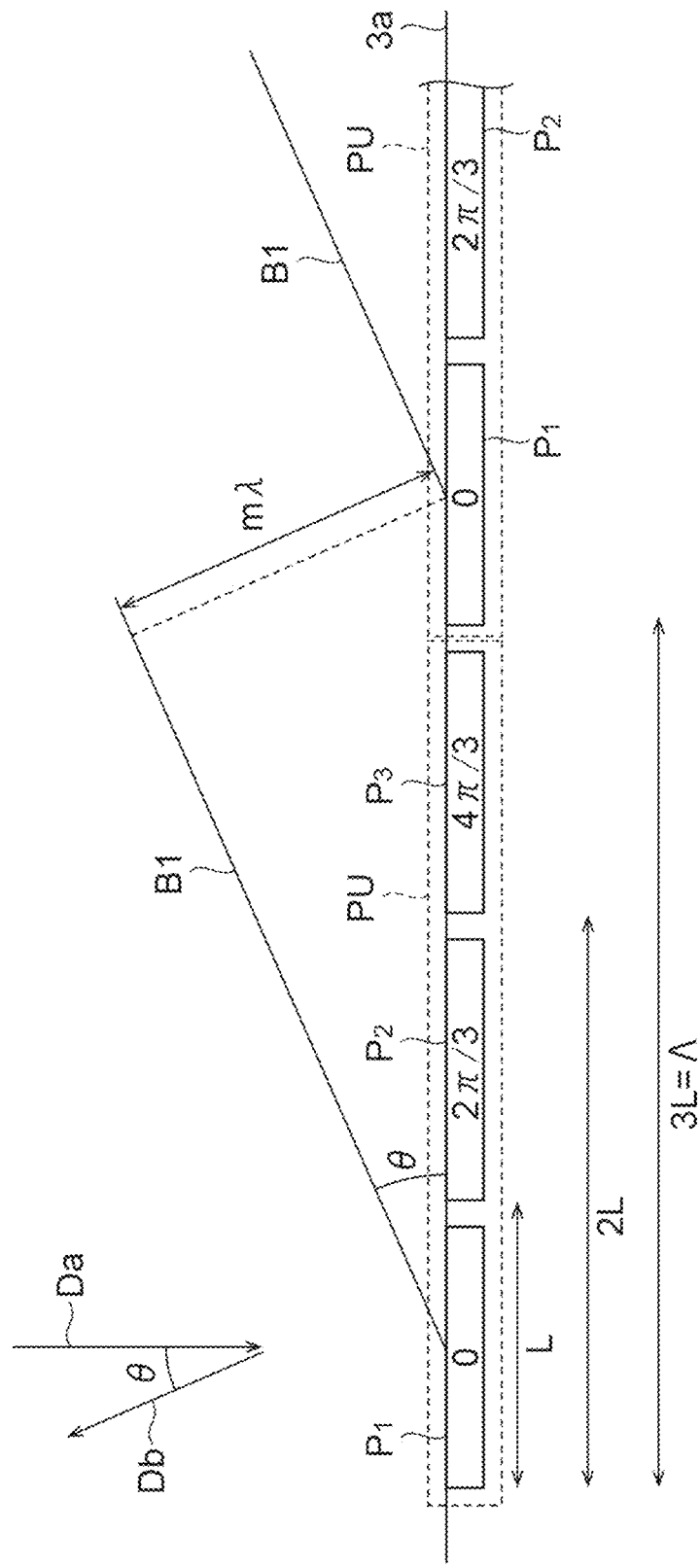
FIG. 15 is a diagram schematically illustrating a state in which one unit includes three regions $P_1$ to $P_3$, and in each of a plurality of units, the region $P_1$ in which the phase modulation amount is 0(rad), the region $P_2$ in which the phase modulation amount is 2π/3(rad), and a region $P_3$ in which the phase modulation amount is 4π/3(rad) are arranged in this order.

When such appearance is acceptable, there is no problem, but there are some cases where such appearance is not acceptable. Therefore, in the present embodiment, as illustrated in FIG. 15, one unit PU includes three regions $P_1$ to $P_3$, and in each of a plurality of units PU, the region $P_1$ in which the phase modulation amount is 0(rad), the region $P_2$ in which the phase modulation amount is $2\pi/3$(rad), and the region $P_3$ in which the phase modulation amount is $4\pi/3$(rad) are arranged in this order. The region $P_1$ in which the phase modulation amount is 0(rad) corresponds to the region E2a in FIGS. 9 to 12. The region $P_2$ in which the phase modulation amount is $2\pi/3$(rad) corresponds to the region E2b in FIGS. 9 to 12. The region $P_3$ where the phase modulation amount is $4\pi/3$(rad) corresponds to the region E2c in FIGS. 9 to 12. When the arrangement pitch of the regions $P_1$ to $P_3$ is L, the pitch of each unit PU, that is, the period $\Lambda$ of the diffraction grating is 3 L (=$\Lambda$). In addition, an interval between a certain wavefront B1 and a wavefront B1 to be generated next is m$\Lambda$, (in is an integer). That is, the following Formula (2) holds:

$$3L \sin \theta = \Lambda \sin \theta = m\lambda \quad (2).$$

Note that the pitch L is set to be equal to or longer than a length in the long-side direction (the first direction D1 in FIG. 4A) of each pixel of the spatial light modulator 3, and in a preferred example, the pitch L is equal to the length in the long-side direction of each pixel of the spatial light modulator 3.

Figure 16A:
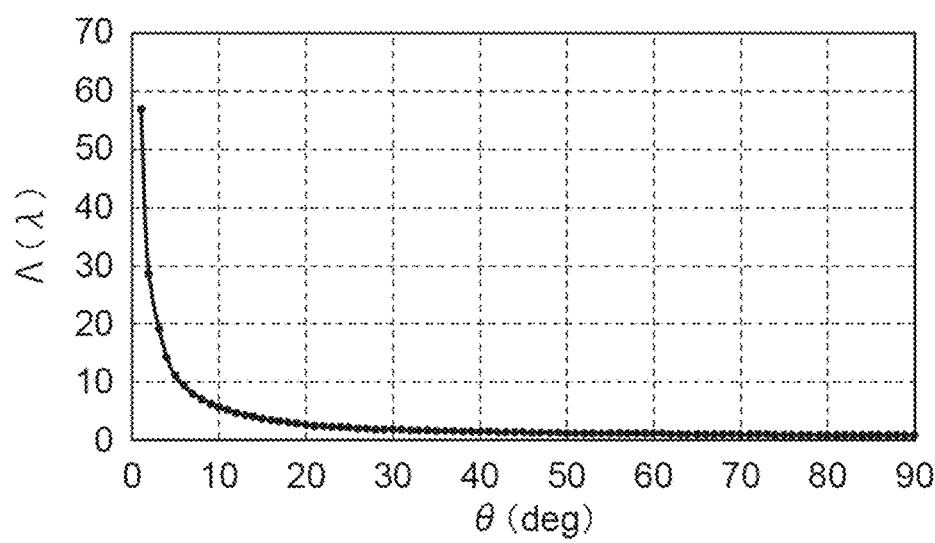
FIG. 16A is a graph illustrating a relationship between a period Λ, which is obtained when a period Λ of the diffraction grating is normalized by a wavelength λ, and a diffraction angle θ (=0° to 90°)(provided that in =1)
Figure 16B:
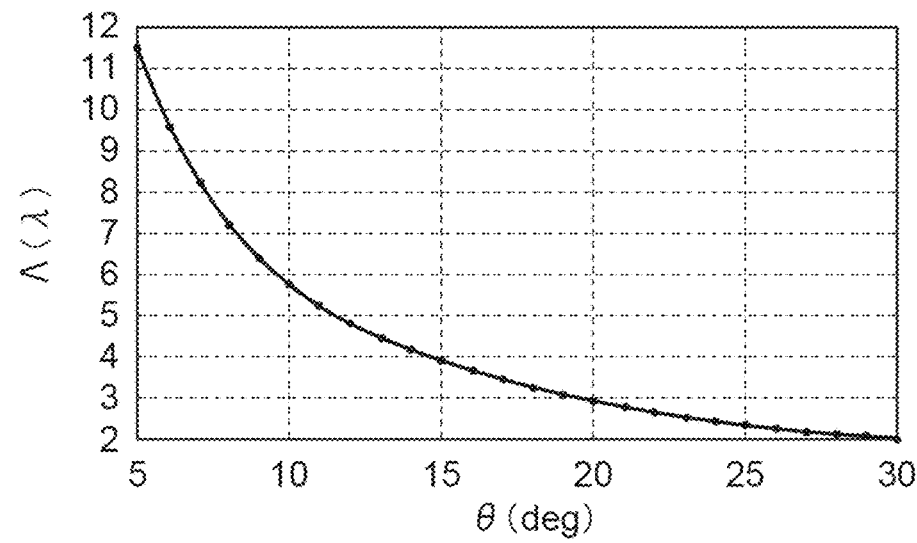
FIG. 16B illustrates a portion where the diffraction angle θ=5° to 30° in the graph of FIG. 16A in an enlarged manner.
Figure 16C:
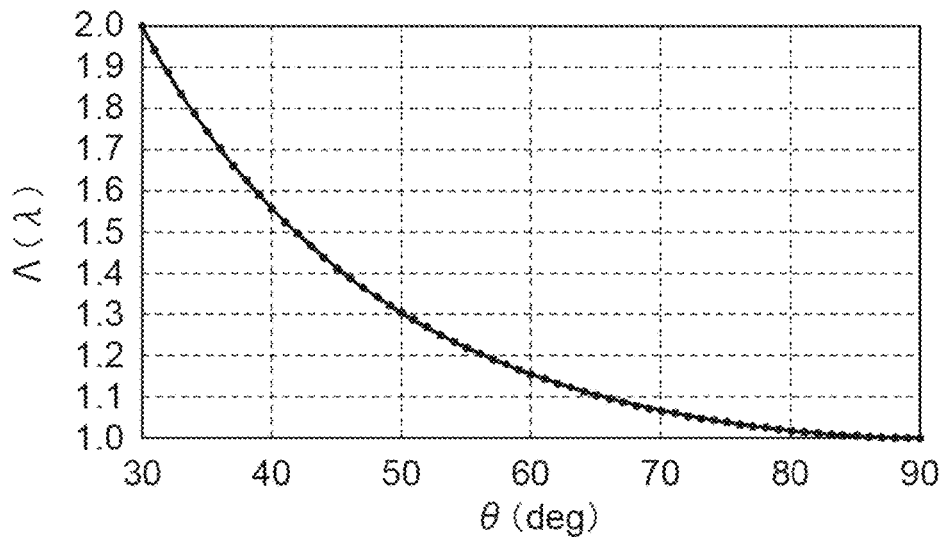
FIG. 16C illustrates a portion where the diffraction angle θ=30° to 90° in the graph of FIG. 16A in an enlarged manner.

FIG. 16A is a graph illustrating a relationship between a period $\Lambda$, which is obtained when a period $\Lambda$ of a diffraction grating is normalized by the wavelength $\lambda$, and the diffraction angle $\theta$ (=0° to 90°) (provided that in =1). FIG. 16B illustrates a portion where the diffraction angle $\theta$=5° to 30° in the graph of FIG. 16A in an enlarged manner, and FIG. 16C illustrates a portion where the diffraction angle $\theta$=30° to 90° in the graph of FIG. 16A in an enlarged manner. Referring to FIG. 16B, for example, it is understood that it is necessary to satisfy $\Lambda \le 6\lambda$ in order to achieve the diffraction angle $\theta \ge 10°$. In other words, the period $\Lambda$ of the diffraction grating is desirably six times or less the wavelength $\lambda$. As a result, the diffraction angle $\theta \ge 10°$ can be achieved. In addition, referring to FIG. 16C, for example, it is understood that it is necessary to satisfy $\Lambda \le 2\lambda$ in order to achieve the diffraction angle $\theta \ge 30°$. In other words, the period $\Lambda$ of the diffraction grating is desirably twice or less the wavelength $\lambda$. As a result, the diffraction angle $\theta \ge 30°$ can be achieved.

Figure 17A:
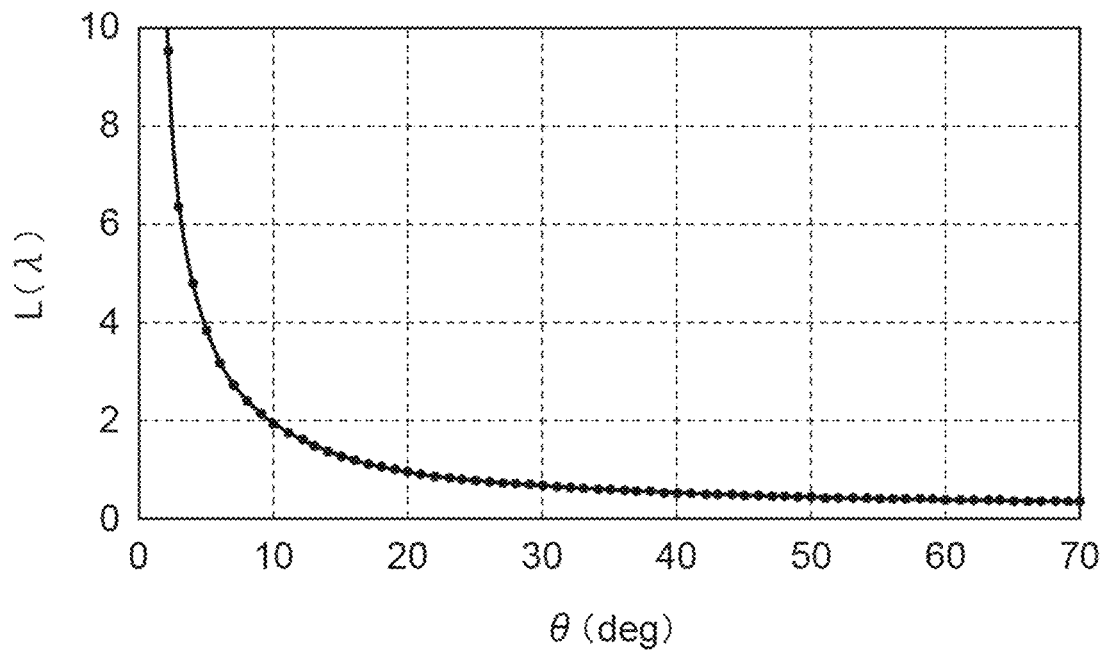
FIG. 17A is a graph illustrating a relationship between a pitch L, which is obtained when a pitch L is normalized by a wavelength λ, and a diffraction angle θ (=0° to 70°) (provided that in =1)
Figure 17B:
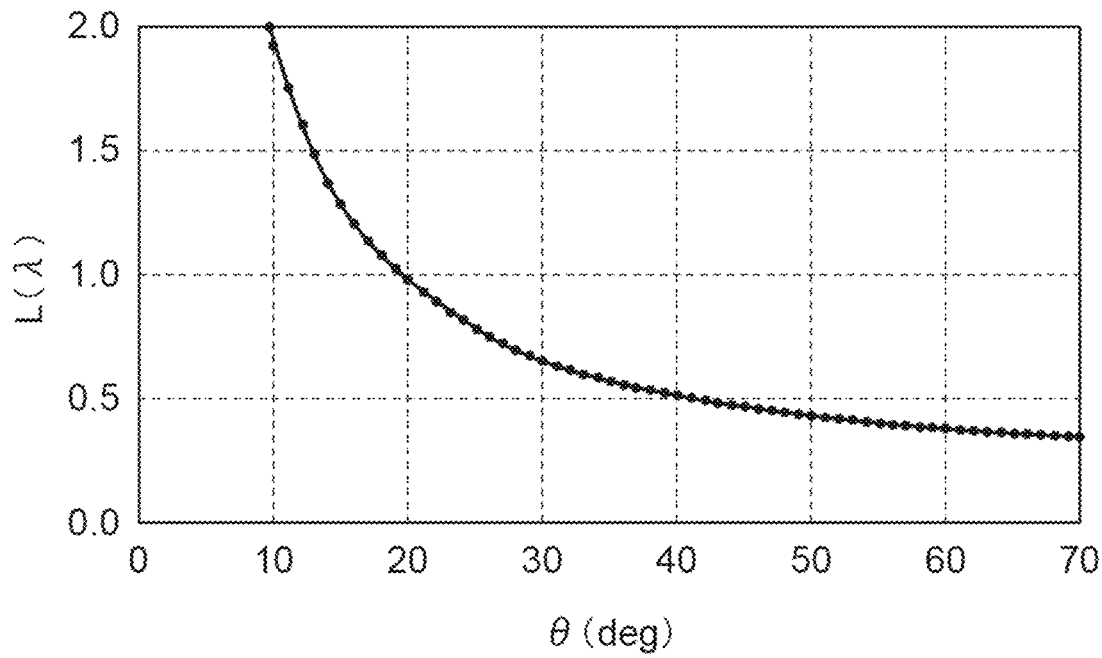
FIG. 17B illustrates a portion where the pitch L=0 to 2λ in the graph of FIG. 17A in an enlarged manner.

FIG. 17A is a graph illustrating a relationship between a pitch L, which is obtained when a pitch L is normalized by a wavelength $\lambda$, and a diffraction angle $\theta$ (=0° to 70°) (provided that in =1). FIG. 17B illustrates a portion where the pitch L=0 to 2$\lambda$ in the graph of FIG. 17A in an enlarged manner. Referring to FIG. 17A, when the pitch L is larger than 4$\lambda$, the diffraction angle $\theta$ is less than 5°. In addition, referring to FIG. 17B, $\theta$=70° is obtained when L=0.355$\lambda$, $\theta$=50° is obtained when L=0.435$\lambda$, $\theta$=30° is obtained when L=0.667$\lambda$, $\theta$=20° is obtained when L=0.975$\lambda$, and $\theta$=10° is obtained when L=1.920$\lambda$.

Figure 18A:
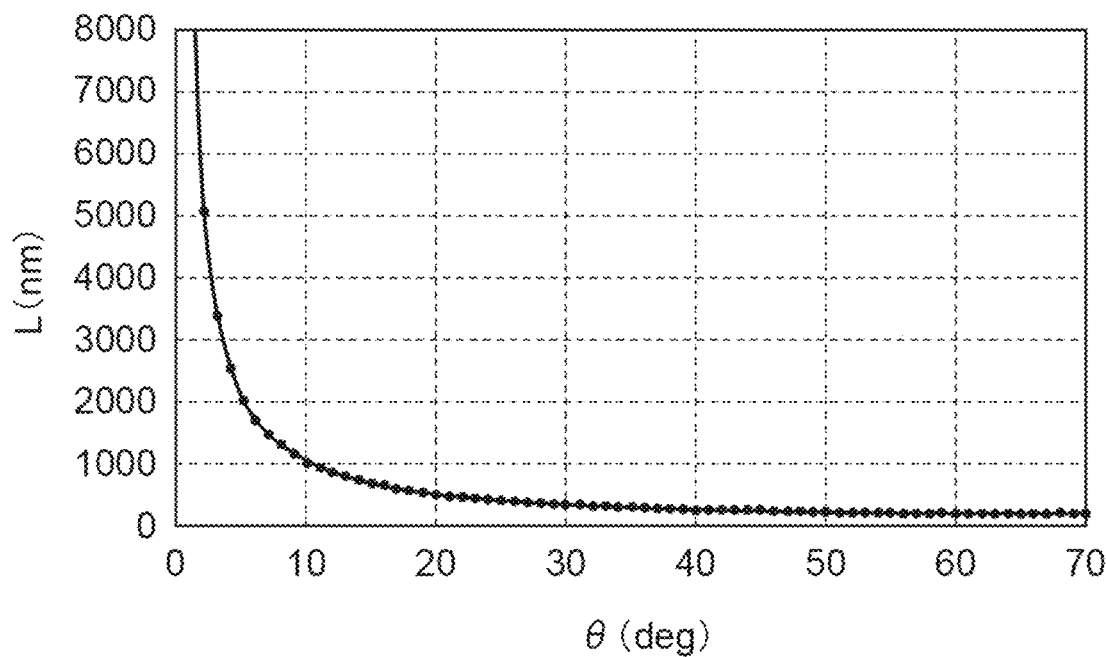
FIG. 18A is a graph illustrating a relationship between the pitch L and the diffraction angle θ (=0° to 70°) in a case where the wavelength λ=532 nm (provided that in =1)
Figure 18B:
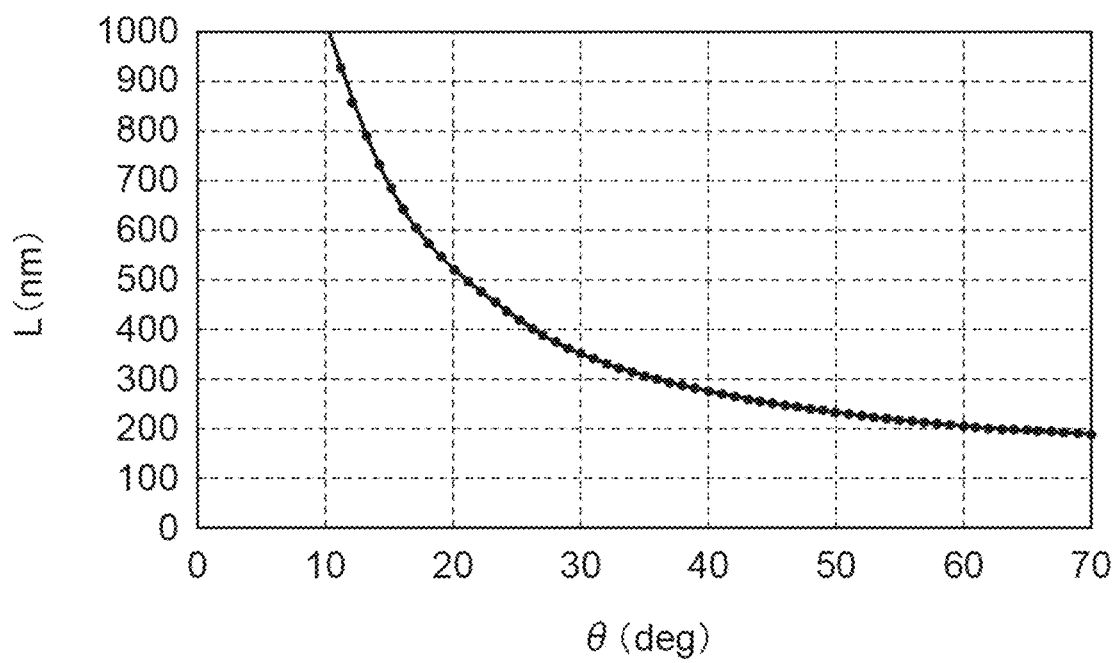
FIG. 18B illustrates a portion where pitch L=0 nm to 1000 nm in the graph of FIG. 18A in an enlarged manner.

FIG. 18A is a graph illustrating a relationship between the pitch L and the diffraction angle $\theta$ (=0° to 70°) in a case where the wavelength $\lambda$=532 nm as one example (provided that in =1). FIG. 18B illustrates a portion where the pitch L=0 nm to 1000 nm in the graph of FIG. 18A in an enlarged manner. Referring to FIG. 18A, when the pitch L is larger than 2 μm, the diffraction angle $\theta$ is less than 5°. In addition, referring to FIG. 18B, $\theta$=70° is obtained when L=188.7 nm, $\theta$=50° is obtained when L=231.5 nm, $\theta$=30° is obtained when L=354.7 nm, $\theta$=20° is obtained when L=518.5 nm, and $\theta$=10° is obtained when L=1021.2 nm.

Figure 19:
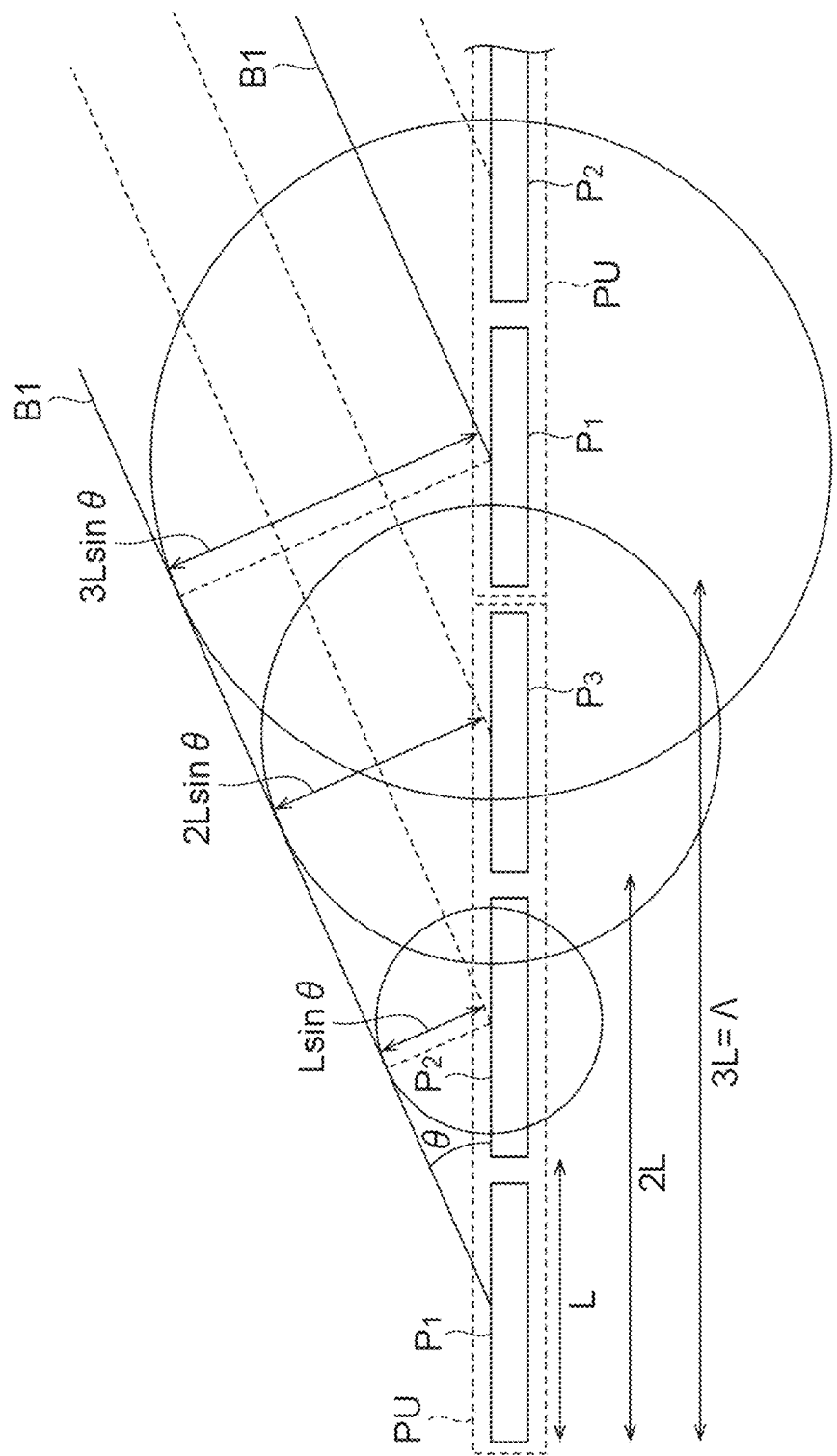
FIG. 19 is a diagram illustrating in more detail a relationship between the diffraction angle θ and the phase modulation amount of each of the regions $P_1$ to $P_3$ illustrated in FIG. 15.
Figure 20:
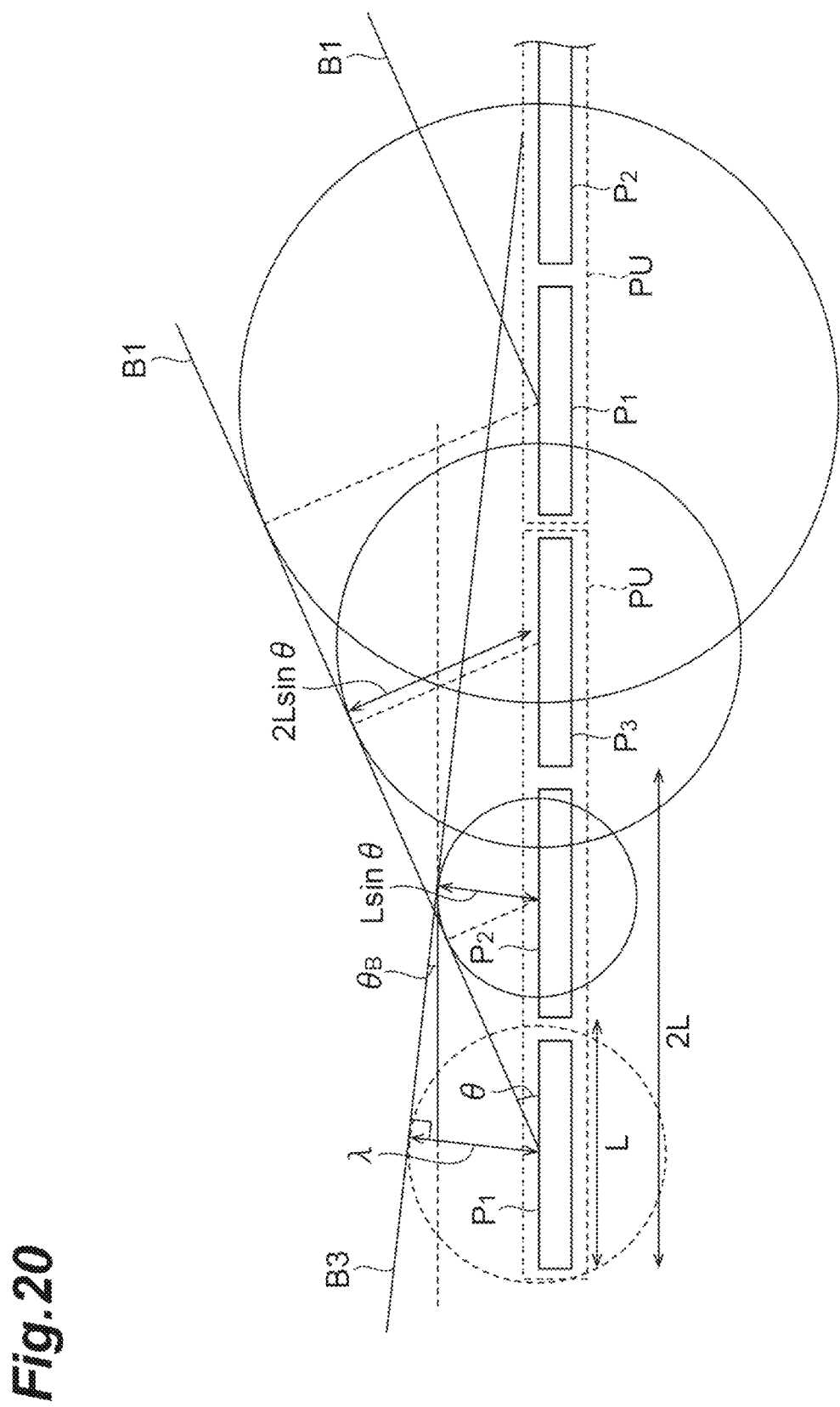
FIG. 20 is a diagram illustrating a wavefront B3 generated by a wave at a certain timing, which is generated from the region $P_2$, and a wave at the preceding timing, which is generated from the region $P_1$.

Here, the presence or absence of another diffraction angle different from the above designed diffraction angle $\theta$ will be examined. FIG. 19 is a diagram illustrating in more detail the relationship between the diffraction angle $\theta$ and the phase modulation amount of each of the regions $P_1$ to $P_3$ illustrated in FIG. 15. As illustrated in FIG. 19, when the phase modulation amount of the region $P_1$ of a certain unit PU is 0°, the phase modulation amount of the region $P_2$ is $(1/3)\Lambda \sin \theta = L \sin \theta = (1/3)$ m$\lambda$, the phase modulation amount of the region $P_3$ is $(2/3)\Lambda \sin \theta = 2 L \sin \theta = (2/3)$ m$\lambda$, and the phase modulation amount of the region $P_1$ of an adjacent unit PU is $\Lambda \sin \theta = 3 L \sin \theta = m\lambda$, an angle (that is, a diffraction angle $\theta$) formed by the wavefront B1 and the main surface 3a at the same timing (that is, in values are equal) between pixels adjacent to each other is θ. However, an angle formed between a wavefront and the main surface 3a at a non-identical timing (that is, in values are different) between the pixels adjacent to each other can be another diffraction angle θ. In the example illustrated in FIG. 20, the wavefront B3 generated by a wave at a certain timing, which is generated from the region $P_2$ and a wave at the preceding timing, which is generated from the region $P_1$ are illustrated, and the magnitude of a diffraction angle $\theta_B$ formed by the wavefront B3 and the main surface 3a is different from the above diffraction angle θ. Note that the diffraction angle $\theta_B$ satisfies the following Formula (3):

$$L \sin \theta_B = \lambda - L \sin \theta \qquad (3).$$

Generalizing this, the wavefront B3 having the diffraction angle $\theta_B$ that satisfies the following Formula (4) is obtained by mutual strengthening with a wave preceding by n (n is an integer) of the adjacent region:

$$L \sin \theta_B = n\lambda - L \sin \theta \qquad (4).$$

Figure 21A:
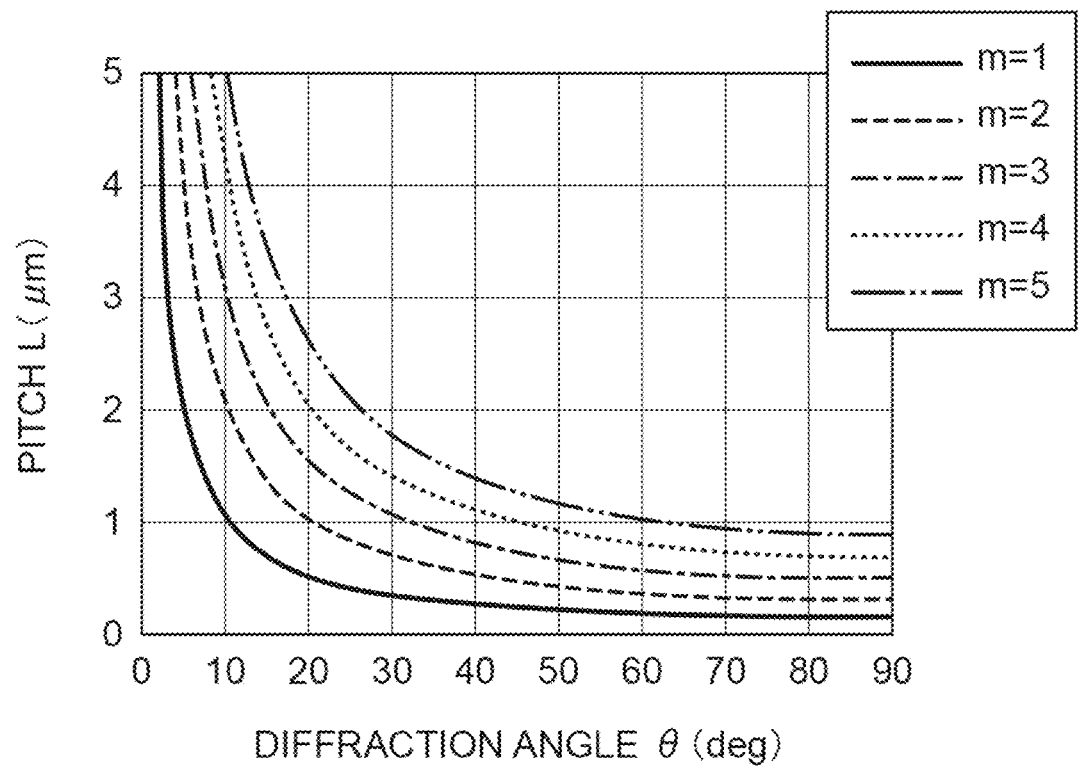
FIG. 21A is a graph illustrating a relationship between the pitch L and the diffraction angle θ that satisfy Formula (2) in a case where the wavelength λ is 532 nm as one example.
Figure 21B:
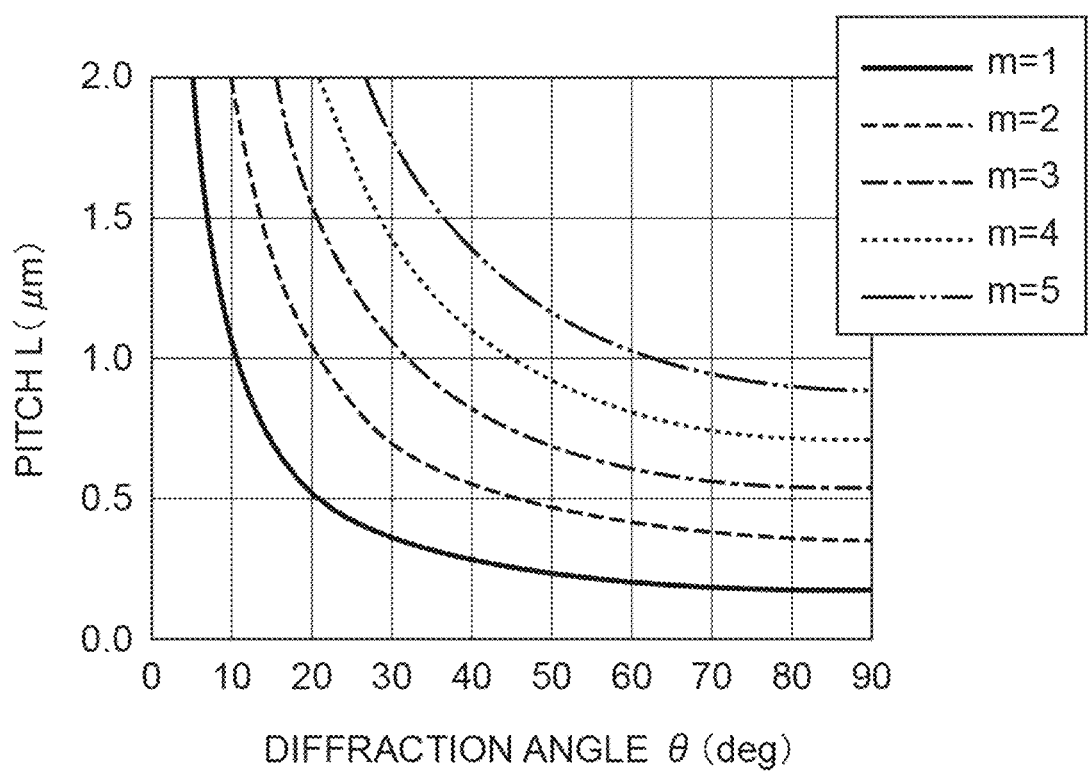
FIG. 21B is a graph illustrating a portion where the pitch L is up to 2 μm in the graph of FIG. 21A in an enlarged manner.
Figure 22:
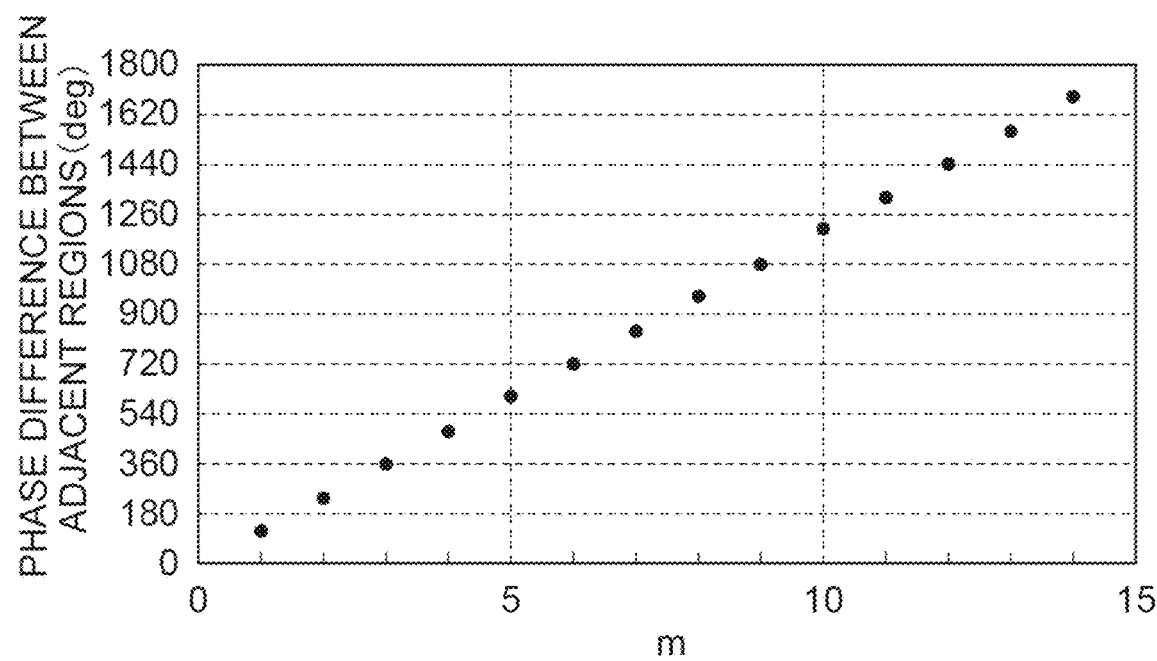
FIG. 22 is a graph in which a correlation between a phase difference between adjacent regions and an in value is plotted.

Next, a relationship between the pitch L for achieving any diffraction angle θ and a phase difference between adjacent regions will be described. FIG. 21A is a graph illustrating a relationship between the pitch L and the diffraction angle θ that satisfy the above Formula (2) in a case where the wavelength λ is 532 nm as one example. FIG. 21B is a graph illustrating a portion where the pitch L is up to 2 μm in the graph of FIG. 21A in an enlarged manner. In these drawings, five graphs corresponding to each of in =1 to 5 are illustrated. FIG. 22 is a graph in which a correlation between the phase difference between adjacent regions and the in value is plotted. On the basis of these graphs, for example, it is understood that the pitch L=276 nm needs to be satisfied in order to achieve the diffraction angle θ=40° when in =1 or the pitch L=552 nm needs to be satisfied in order to achieve the diffraction angle θ=40° when in =2.

FIG. 23 is a table illustrating a result of obtaining the pitch L satisfying the above Formula (2) when the designed diffraction angle θ is given and further substituting the pitch L into the following Formula (5) to obtain the diffraction angle $\theta_B$ in a case where the wavelength λ=532 nm:

$$\theta_B = \sin^{-1}\left\{\frac{\lambda}{L}\left(n - \frac{\delta\phi}{2\pi}\right)\right\}. \qquad (5)$$

Note that a phase difference δφ between the adjacent regions is 2π/3. The diffraction angle $\theta_B$ in the case of n=0 coincides with the diffraction angle θ.

Figure 24A:
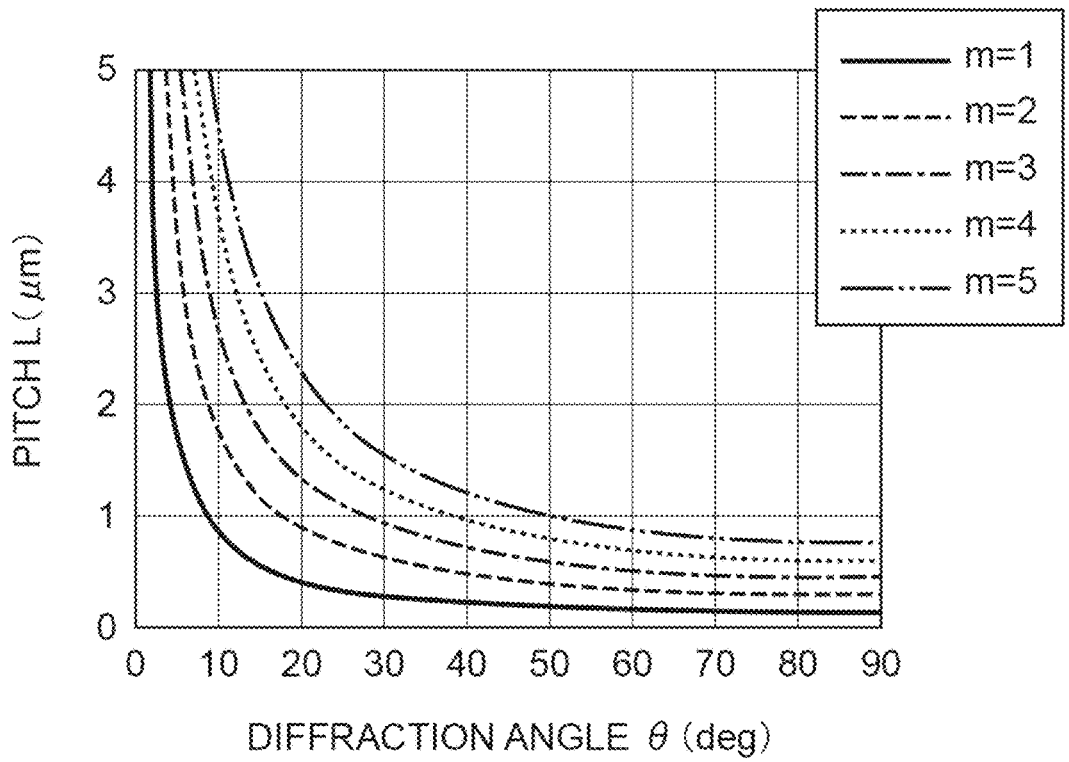
FIG. 24A is a graph illustrating a relationship between the pitch L and the diffraction angle θ that satisfy Formula (2) in a case where the wavelength λ is 467 nm.
Figure 24B:
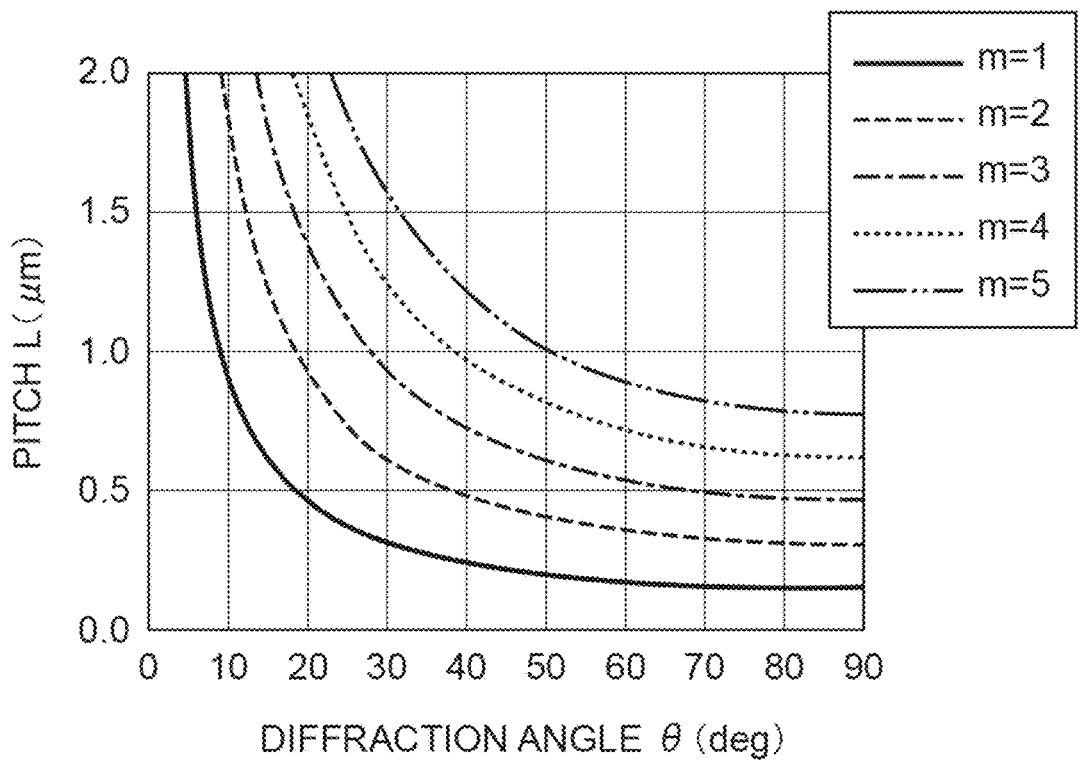
FIG. 24B is a graph illustrating a portion where the pitch L is up to 2 μm in the graph of FIG. 24A in an enlarged manner.
Figure 25:
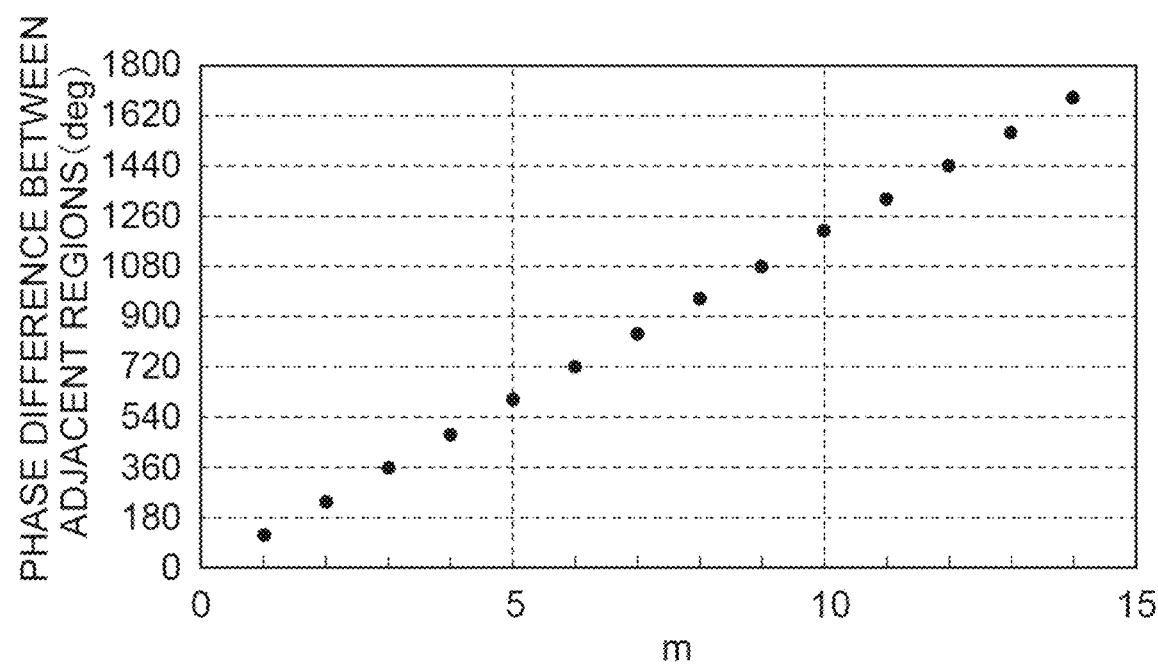
FIG. 25 is a graph in which a correlation between the phase difference between adjacent regions and the in value is plotted.

As another example, FIG. 24A is a graph illustrating a relationship between the pitch L and the diffraction angle θ that satisfy the above Formula (2) in a case where the wavelength λ is 467 nm. FIG. 24B is an enlarged graph illustrating a portion where the pitch L is up to 2 μm in the graph of FIG. 24A. In these drawings, five graphs corresponding to each of in =1 to 5 are illustrated. FIG. 25 is a graph in which a correlation between the phase difference between adjacent regions and the in value is plotted. On the basis of these graphs, for example, it is understood that the pitch L=242 nm needs to be satisfied in order to achieve the diffraction angle θ=40° when in =1 or the pitch L=484 nm needs to be satisfied in order to achieve the diffraction angle θ=40° when in =2.

FIG. 26 is a table illustrating a result of obtaining the pitch L satisfying the above Formula (2) when the design diffraction angle θ is given and further substituting the pitch L into the above Formula (5) to obtain the diffraction angle $\theta_B$ in a case where the wavelength λ=467 nm. Note that a phase difference φ between adjacent regions is 2π/3. The diffraction angle $\theta_B$ in the case of n=0 coincides with the diffraction angle θ.

Figure 27A:
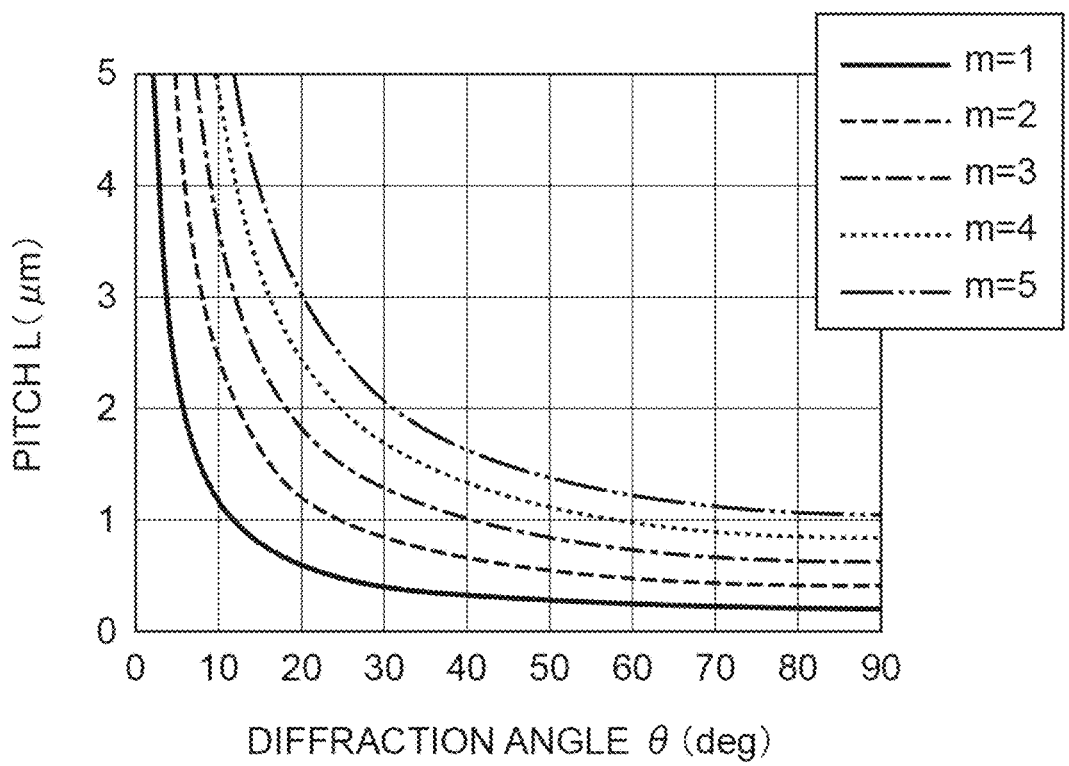
FIG. 27A is a graph illustrating a relationship between the pitch L and the diffraction angle θ that satisfy Formula (2) in a case where the wavelength λ is 630 nm.
Figure 27B:
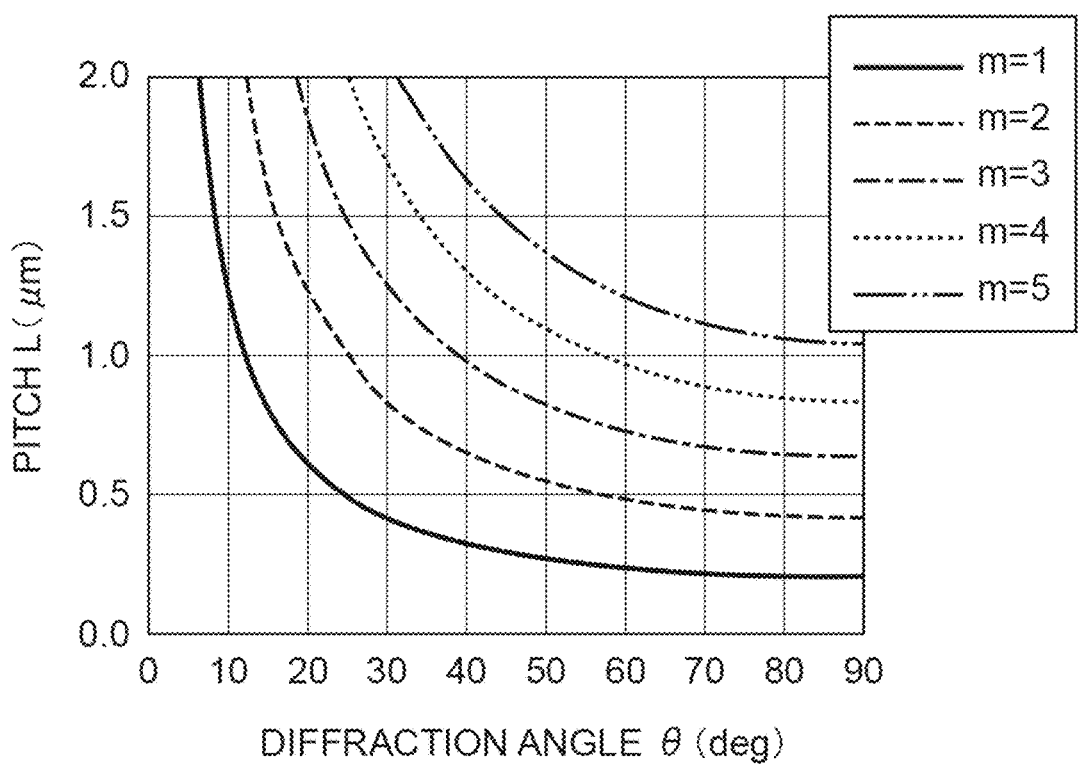
FIG. 27B is a graph illustrating a portion where the pitch L is up to 2 μm in the graph of FIG. 27A in an enlarged manner.
Figure 28:
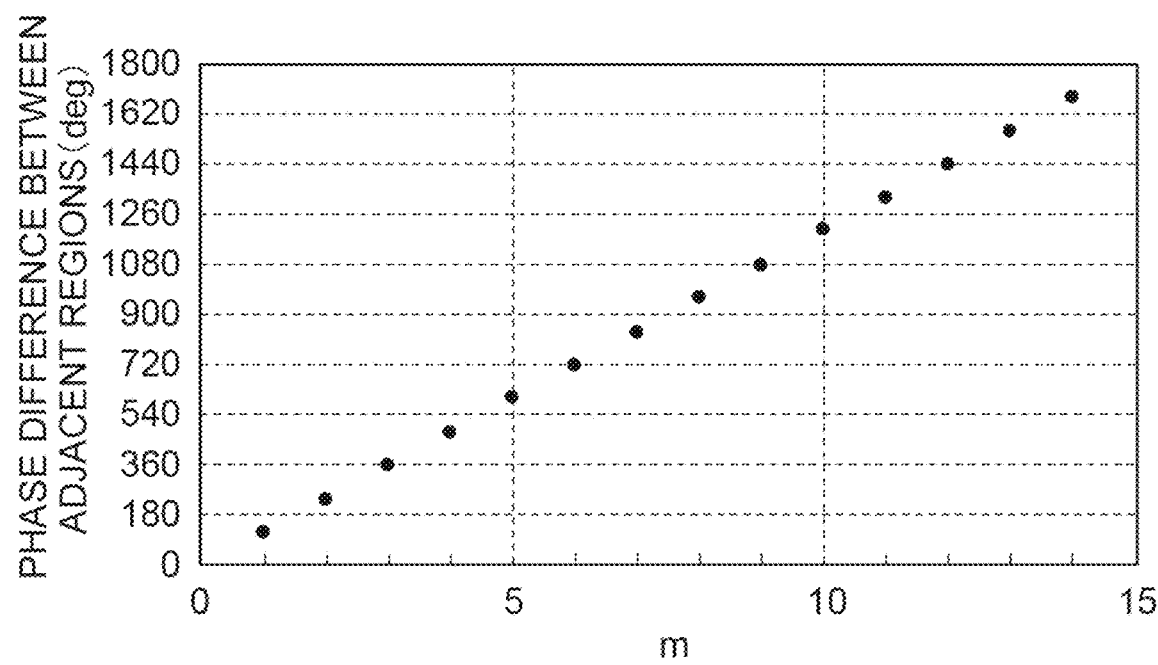
FIG. 28 is a graph in which a correlation between the phase difference between adjacent regions and the in value is plotted.

As still another example, FIG. 27A is a graph illustrating a relationship between the pitch L and the diffraction angle θ that satisfy the above Formula (2) in a case where the wavelength λ is 630 nm. FIG. 27B is an enlarged graph illustrating a portion where the pitch L is up to 2 μm in the graph of FIG. 27A. In these drawings, five graphs corresponding to each of in =1 to 5 are illustrated. FIG. 28 is a graph in which a correlation between the phase difference between adjacent regions and the in value is plotted. On the basis of these graphs, for example, it is understood that the pitch L=327 nm needs to be satisfied in order to achieve the diffraction angle θ=40° when in =1 or the pitch L=653 nm needs to be satisfied in order to achieve the diffraction angle θ=40° when in =2.

FIG. 29 is a table illustrating a result of obtaining the pitch L satisfying the above Formula (2) when the designed diffraction angle θ is given and further substituting the pitch L into the above Formula (5) to obtain the diffraction angle $\theta_B$ in a case where the wavelength λ=630 nm. Note that a phase difference φ between adjacent regions is 2π/3. The diffraction angle $\theta_B$ in the case of n=0 coincides with the diffraction angle θ.

FIG. 30A is a diagram illustrating an example of a suitable diffraction grating based on the above examination result. FIG. 30B is a partially enlarged view of FIG. 30A. Note that in FIGS. 30A and 30B, the phase modulation amount is indicated by color shading, a region having a larger phase modulation amount is indicated by a lighter color, and a region having a smaller phase modulation amount is indicated by a darker color. As illustrated in FIGS. 30A and 30B, in the diffraction grating, a region Fa in which the phase modulation amount is 0, a region Fb in which the phase modulation amount is 2π/3(rad), and a region Fc in which the phase modulation amount is 4π/3(rad) are repeatedly arranged in this order in the short-side direction of each thereof. In one example, the width (that is, the pitch L) of each of the regions Fa to Fc in an array direction of the diffraction grating is 518 nm. In this case, as illustrated in FIG. 23, the light E1 having a wavelength λ=532 nm is deflected at a diffraction angle $\theta_B$ of 43.2° and at a diffraction angle $\theta_B$ of −20.0°.

Figure 31:
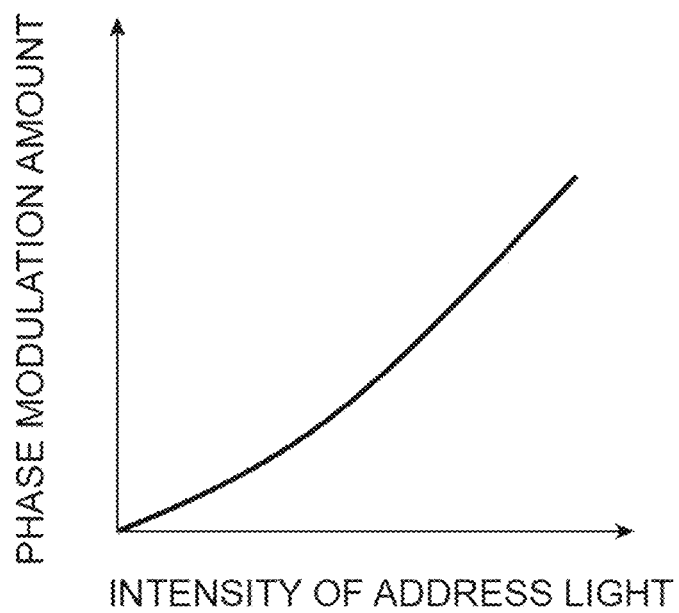
FIG. 31 is a graph conceptually illustrating a relationship between the phase modulation amount in the spatial light modulator and a light intensity of the address light.

A relationship (γ characteristic) between the phase modulation amount in the spatial light modulator 3 and the light intensity of the address light E2 is preferably obtained in advance in order to accurately achieve the diffraction grating by the phase modulation of the spatial light modulator 3. FIG. 31 is a graph conceptually illustrating a relationship between the phase modulation amount in the spatial light modulator 3 and the light intensity of the address light E2. As illustrated in FIG. 31, the relationship between the phase modulation amount of the spatial light modulator 3 and the light intensity of the address light E2 is nonlinear in many cases.

Figure 32A:
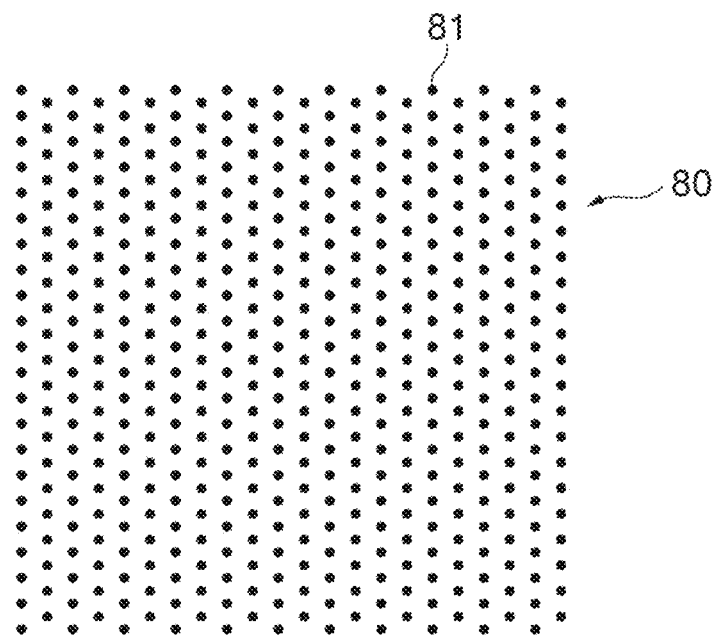
FIG. 32A is a diagram illustrating a light shielding pattern of a light shielding film (or a light shielding plate)
Figure 32B:
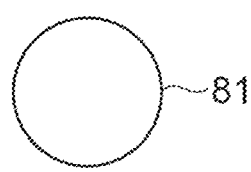
FIGS. 32B and 32C are diagrams illustrating examples of a planar shape of a light shielding region.
Figure 32C:
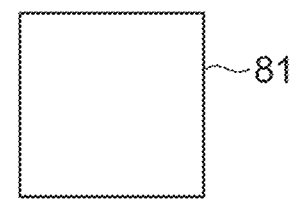
Figure 32D:
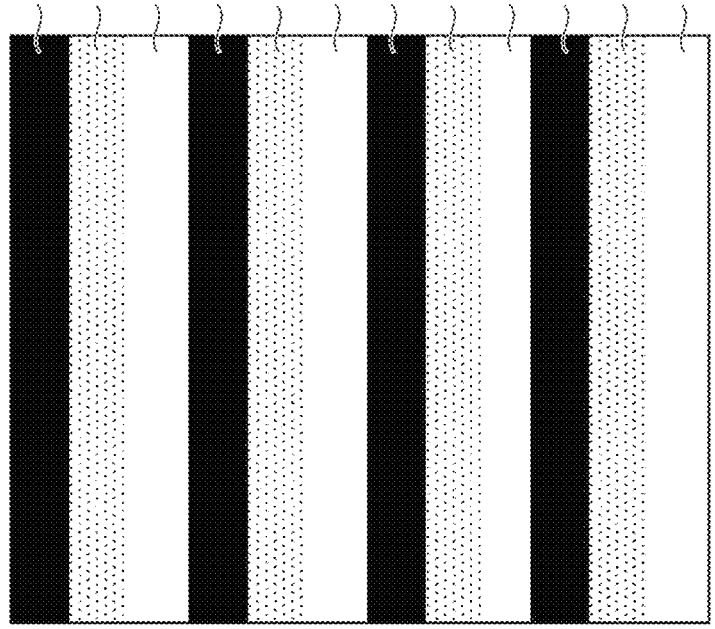
FIG. 32D is a plan view illustrating one example of the light shielding film.

The diffraction grating pattern included in the address light E2 is achieved by adjusting the intensities of light emitted from the light emitting regions 42b and 42c of the light emitting surface 42a illustrated in FIG. 8. The adjustment of the light intensities of the light emitting regions 42b and 42c may be performed by increasing or decreasing a drive current supplied to each of the light emitting regions 42b and 42c, or may be performed by covering the light emitting regions 42b and 42c using a light shielding film (or light shielding plate) including a light shielding pattern 80 as illustrated in FIG. 32A. Note that the light shielding pattern illustrated in FIG. 32A includes a plurality of light shielding regions 81 separated from each other, and the plurality of light shielding regions 81 is located on lattice points of various lattices such as a triangular lattice and a square lattice. The planar shape of the light shielding region 81 may be circular as illustrated in FIG. 32B, or may be quadrangular (for example, square or rectangular) as illustrated in FIG. 32C. Alternatively, the planar shape of the light shielding region 81 may be various other shapes. By adjusting an area ratio occupied by the plurality of light shielding regions 81 (that is, the size and interval of each light shielding region 81), the intensities of the light emitted from the light emitting regions 42b and 42c can be adjusted. Note that in order to reduce diffraction of light, a center interval (pitch) between the light shielding regions 81 adjacent to each other is preferably equal to or less than the wavelength of the address light E2. FIG. 32D is a plan view illustrating one example of the light shielding film. In this example, the above light shielding pattern 80 is applied to a region Ab of the light shielding film corresponding to the region E2b illustrated in FIGS. 9 to 12. Not limited to this example, in addition to the region Ab, the light shielding pattern 80 may be applied to at least one of a region Aa of the light shielding film corresponding to the region E2a and a region Ac of the light shielding film corresponding to the region E2c.

In the above description, there is exemplified a case where the diffraction grating includes the region Fa having a small phase modulation amount (or having a substantially zero phase modulation amount), the region Fb having a slightly large phase modulation amount, and the region Fc having a large phase modulation amount, and these three regions Fa to Fc are repeatedly arranged in order in the short-side direction, thereby constituting the diffraction grating. In this case, the diffraction grating pattern of the address light E2 has a configuration in which the light intensity periodically changes in a certain direction. The light intensity becomes strong or weak stepwise and monotonously within each period. The number of regions E2a to E2c in which the light intensities are different from each other within each period is three, and the light intensity changes in two steps. However, the diffraction grating and the address light E2 are not limited to such forms. The diffraction grating may be constituted by repeatedly arranging N (N is an integer of 3 or more) regions having a long-side direction in order in a short-side direction, and the phase modulation amount may change monotonically from one end to the other end in the arrangement direction of the N regions. In other words, the diffraction grating pattern of the address light E2 is constituted by repeatedly arranging N regions having a long-side direction in order in the short-side direction, and the light intensity may become strong or weak stepwise in each repetition period, the number of regions in which the light intensities are different from each other in each period is N, and the light intensity may change in (N−1) steps in each repetition period. Even in this case, the deflection of the two-dimensional optical image in a direction opposite to a desired deflection direction (see FIG. 14) can be reduced, and the stereoscopic image can be output more clearly.

Figure 33A:
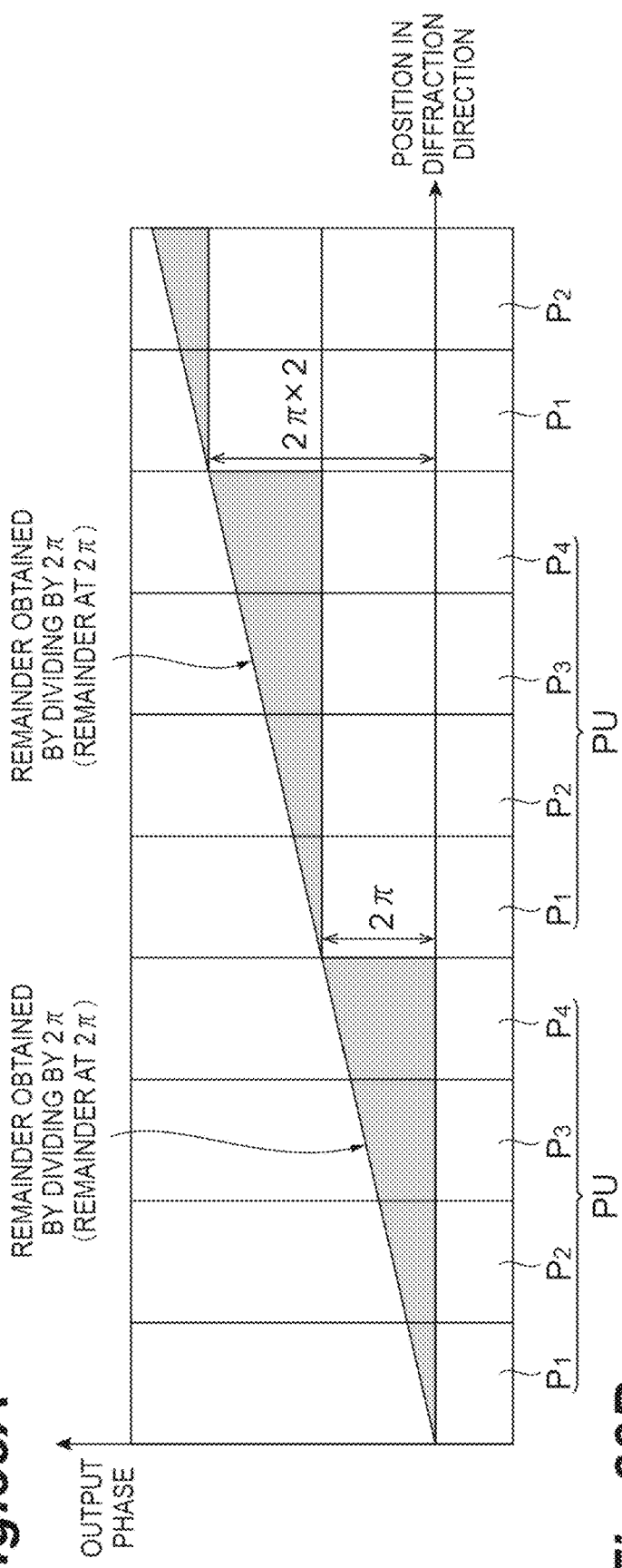
FIGS. 33A and 33B are diagrams conceptually illustrating a method of determining a phase modulation amount in each region constituting the diffraction grating.
Figure 33B:
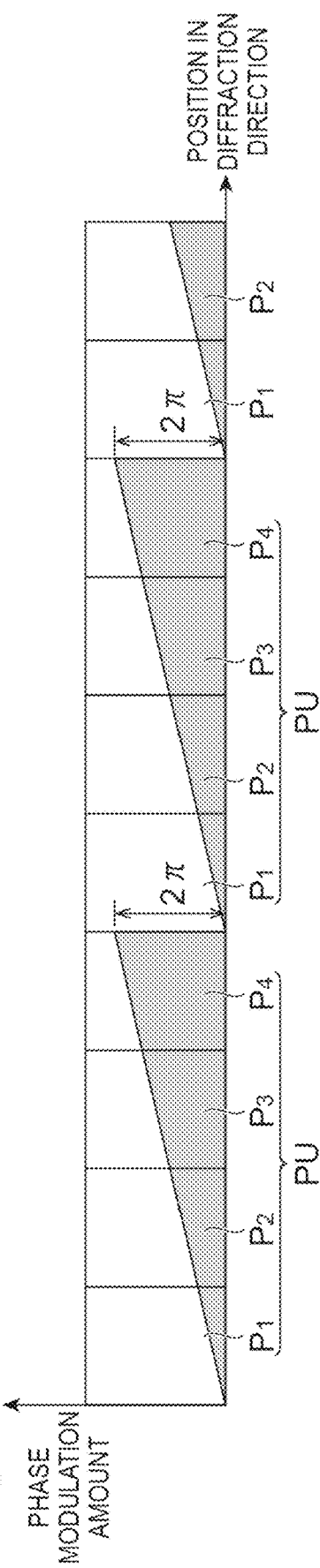

Here, FIGS. 33A, 33B, 34A, and 34B are diagrams conceptually illustrating a method of determining a phase modulation amount in each region constituting the diffraction grating. Note that in the diffraction grating of the examples illustrated in FIGS. 33A to 34B, each unit PU includes four regions $P_1$ to $P_4$ (that is, N=4). In these drawings, a horizontal axis represents the position of the diffraction grating in a periodic direction (arrangement direction of the regions $P_1$ to $P_4$), and a vertical axis represents an output phase. When the diffraction grating is achieved, the output phase needs to be increased monotonically in a diffraction direction, as illustrated in FIGS. 33A and 34A. These drawings illustrate, as one example, a case where the output phase changes linearly in the diffraction direction. In practice, the phase modulation amount of each of the regions $P_1$ to $P_4$ is a remainder when the output phase is divided by $2\pi$. In FIGS. 33A and 34A, the remainder when the output phase is divided by $2\pi$ is colored in gray. In addition, FIGS. 33B and 34B illustrate the phase modulation amounts of respective regions $P_1$ to $P_4$. In order to equalize the phase modulation amounts of the units PU, the phase difference between the output phases of the units PU adjacent to each other is preferably an integral multiple of $2\pi$, and more preferably $2\pi$. This is because in a case where the phase difference between the output phases of the units PU adjacent to each other is not an integral multiple of $2\pi$, diffracted light due to the period of the unit PU is generated including up to a high-order component, and is superimposed on the light E1 as noise light though being weak.

In addition, as described above, the diffraction angle θ of the light E1 by a spatial light modulator 3 depends on the wavelength of the light E1. Therefore, in a case where the light E1 includes a plurality of wavelength components, the diffraction angle θ differs for each wavelength component, and the optical images of the respective wavelength components to be presented to the observer A deviate from each other. Therefore, in a case where the plurality of wavelength components is included in the light E1, the diffraction angle θ needs to be kept constant by emitting each wavelength component in order not simultaneously but in an extremely short period and then changing a lattice interval according to each wavelength component.

In addition, the present embodiment has a configuration in which each pixel 30 of the spatial light modulator 3 changes the phase modulation amount according to the intensity of the address light E2, but a similar function can be achieved also by arranging an independent electrode for each pixel 30 and individually applying a voltage to each electrode. However, in order to provide a optical image at the height of the eye Aa of observer A, for example, a relatively large diffraction angle θ of 30° or more is desired. In that case, the pitch L of each region constituting the diffraction grating is as extremely small as about 1 μm to several μm, and the arrangement pitch of the pixel 30 of the spatial light modulator 3 needs to be equal to or less than this pitch L. Therefore, the arrangement pitch of the electrodes becomes extremely small, and it is difficult to achieve the arrangement pitch in consideration of an area required for a drive circuit. As in the present embodiment, since the pixel 30 has the configuration to change the phase modulation amount according to the intensity of the address light E2, wiring individually connected to each electrode is unnecessary, and the arrangement pitch of the pixel 30 can be decreased to achieve a relatively large diffraction angle θ.

First Modification

Figure 35A:
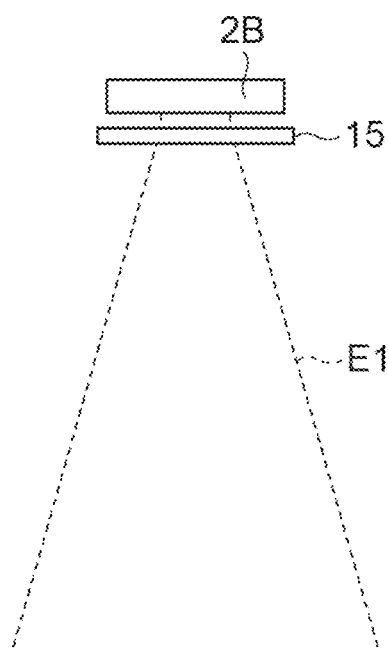
FIGS. 35A and 35B are diagrams illustrating a configuration of a first modification.
Figure 35B:
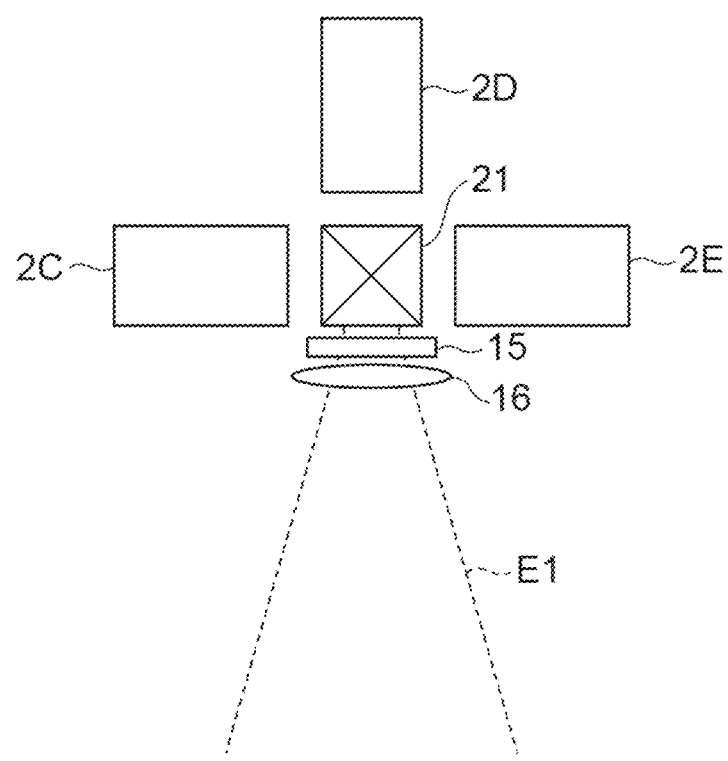

FIGS. 35A and 35B are diagrams illustrating a configuration of a first modification of the embodiment. The image output device 1A of the above embodiment may include a micro light emitting diode (LED) panel 2B illustrated in FIG. 35A instead of the high-speed projector 2A illustrated in FIG. 1. The micro LED panel 2B is an example of an image irradiation unit in the present modification, and is a self-luminous high-definition display that irradiates a main surface 3a of a spatial light modulator 3 with light E1 including a two-dimensional optical image. Also, in the present modification, the incident direction of the light E1 with respect to the main surface 3a coincides with a normal direction of the main surface 3a of the spatial light modulator 3. The output wavelength and frame rate of the micro LED panel 2B are similar to those of the high-speed projector 2A of the above embodiment.

A filter 15 is provided on a light path between the micro LED panel 2B and the spatial light modulator 3. The configuration and effects of the filter 15 are similar to those of the above embodiment. Note that in the present modification, the lens 16 (see FIG. 2) of the above embodiment may not be arranged. This is because an image of light from the micro LED panel 2B is formed on the retina of an eye Aa of an observer A even when the light is observed as it is.

In addition, the image output device 1A of the above embodiment may include a plurality of high-speed projectors 2C to 2E illustrated in FIG. 35B (three in the example illustrated in FIG. 35B) and a wavelength combining unit 21 instead of the high-speed projector 2A illustrated in FIG. 1. The high-speed projectors 2C to 2E are devices that each output a two-dimensional optical image of a single wavelength, and respective output wavelengths are different from each other. In one example, the high-speed projector 2C outputs a two-dimensional optical image in a red region, the high-speed projector 2D outputs a two-dimensional optical image in a green region, and the high-speed projector 2E outputs a two-dimensional optical image in a blue region. Each of the high-speed projectors 2C to 2E is individually optically coupled to the wavelength combining unit 21. The wavelength combining unit 21 is, for example, a cross dichroic prism, combines the two-dimensional optical images outputted from the high-speed projectors 2C to 2E, and outputs the combined two-dimensional optical images as light E1. The cross dichroic prism includes a first multilayer film that reflects light in a blue region and transmits light in a green region, and a second multilayer film that reflects light in a red region and transmits light in a green region. The cross dichroic prism is formed by combining the first and second multilayer films in an X-shape.

For example, as in the present modification, the image irradiation unit is not limited to the above embodiment, and can have various configurations. The image output device 1A includes various image irradiation units that irradiate the main surface 3a of the spatial light modulator 3 with the light E1 including the two-dimensional optical image, whereby the effects of the above embodiment can be achieved. In addition, by combining light from the plurality of high-speed projectors as in the example illustrated in FIG. 35B, it is possible to effectively increase a speed by a multiple of the number of the high-speed projectors.

Second Modification

Figure 36A:
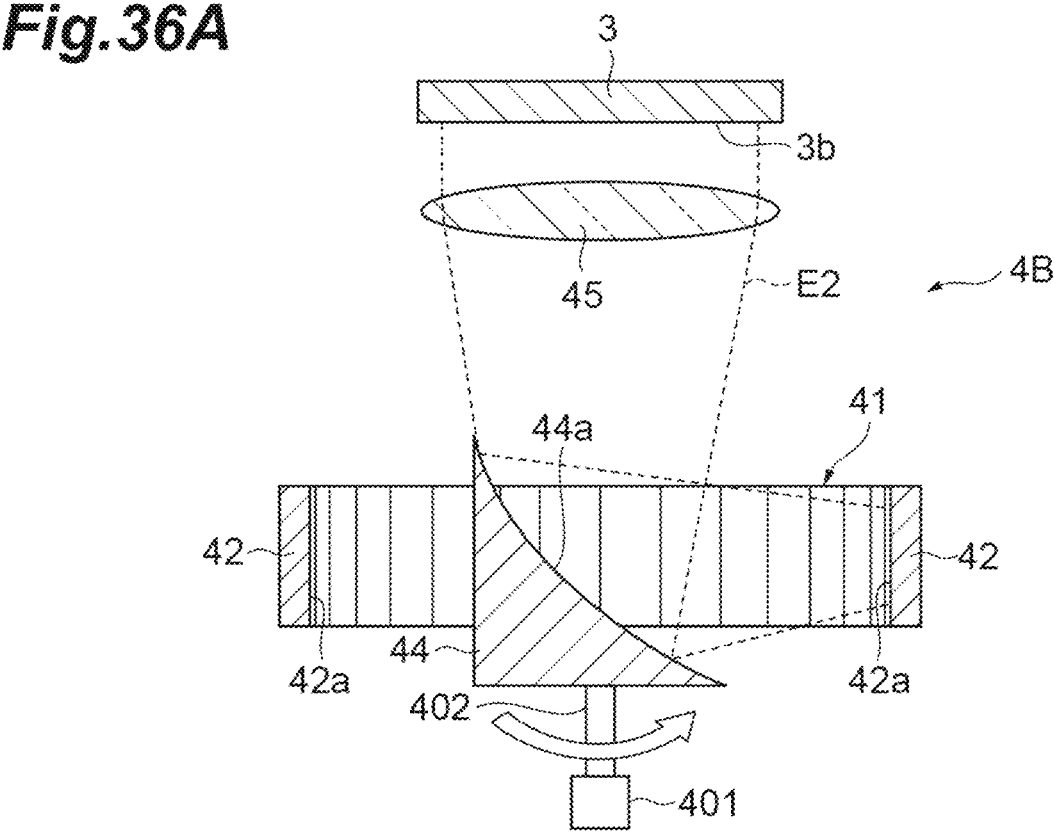
FIG. 36A is a sectional side view illustrating a configuration of an address light irradiation unit as a second modification.
Figure 36B:
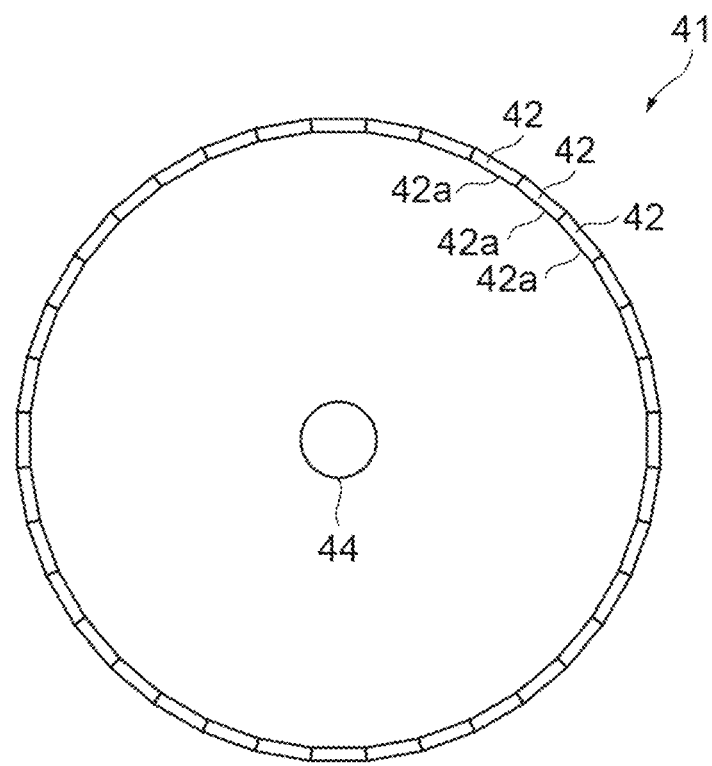
FIG. 36B is a plan view of a light emitting device and an optical member included in an address light irradiation unit.

FIG. 36A is a sectional side view illustrating a configuration of an address light irradiation unit 4B as a second modification of the embodiment, and illustrates a cross section including a normal line of a back surface 3b of a spatial light modulator 3. FIG. 36B is a plan view of a light emitting device 41 and an optical member 44 included in the address light irradiation unit 4B, and illustrates configurations of the light emitting device 41 and the optical member 44 as viewed from a normal direction of the back surface 3b of the spatial light modulator 3.

The address light irradiation unit 4B irradiates the back surface 3b of the spatial light modulator 3 with address light E2 including a diffraction grating pattern. The address light irradiation unit 4B has the light emitting device 41 similar to that of the above embodiment, and has an optical system including the optical member 44 and an imaging lens 45 instead of the optical system 43 (see FIG. 2) of the above embodiment. The optical member 44 includes a concave mirror 44a arranged at the center of the light emitting device 41 of an annular ring shape. The imaging lens 45 is arranged between the optical member 44 and the back surface 3b of the spatial light modulator 3. The concave mirror 44a and the imaging lens 45 optically couple a plurality of light emitting units 42 of the light emitting device 41 and the back surface 3b of the spatial light modulator 3. Specifically, the concave mirror 44a reflects the address light E2 emitted from the light emitting unit 42 toward the back surface 3b of the spatial light modulator 3. The concave mirror 44a and the imaging lens 45 cooperate to form an image of the diffraction grating pattern included in the address light E2 on the back surface 3b. In addition, the concave mirror 44a has a curvature to selectively enlarge the light emitting unit 42 only in a longitudinal direction. As a result, the length of the light emitting unit 42 in the longitudinal direction can be decreased. Note that a cylindrical lens (not illustrated) may be arranged on a light emitting surface 42a of each light emitting unit 42 in order to selectively enlarge the light emitting unit 42 only in the longitudinal direction. The cylindrical lens may be achieved by using a meta-lens including a sub-wavelength element.

A rotation driving unit 401 is attached to the optical member 44 via a rotating shaft 402. The rotating shaft 402 extends in the normal direction of the back surface 3b, and rotates around an axis along the normal direction of the back surface 3b by driving force from the rotation driving unit 401. As a result, a direction of the concave mirror 44a dynamically changes, and the address light E2 from some light emitting units 42 selected from the plurality of light emitting units 42 and corresponding to a desired direction of the diffraction grating pattern is inputted to the back surface 3b of the spatial light modulator 3. Therefore, the direction of the diffraction grating pattern on the back surface 3b can be dynamically changed. In one example, the rotating shaft 402 rotates in one direction by driving force from the rotation driving unit 401. In that case, the diffraction grating pattern rotates in one direction on the back surface 3b.

Even in a case where the image output device 1A of the above embodiment includes the address light irradiation unit 4B of the present modification, the same effects as those of the above embodiment can be obtained. Note that in the above embodiment, some light emitting units 42 selected from the plurality of light emitting units 42 and corresponding to the desired direction of the diffraction grating pattern output the address light E2, but in the present modification, the same as in the above embodiment may be applied, or all of the plurality of light emitting units 42 may always output the address light E2.

Third Modification

Figure 37A:
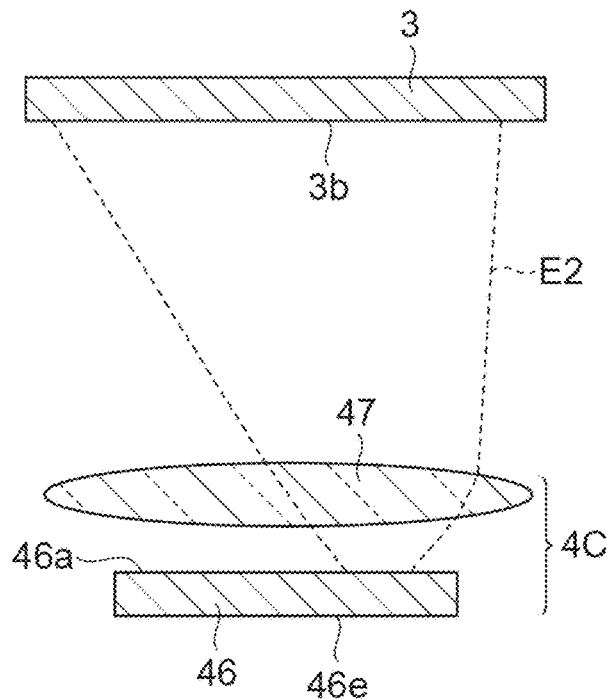
FIG. 37A is a sectional side view illustrating a configuration of an address light irradiation unit as a third modification.
Figure 37B:
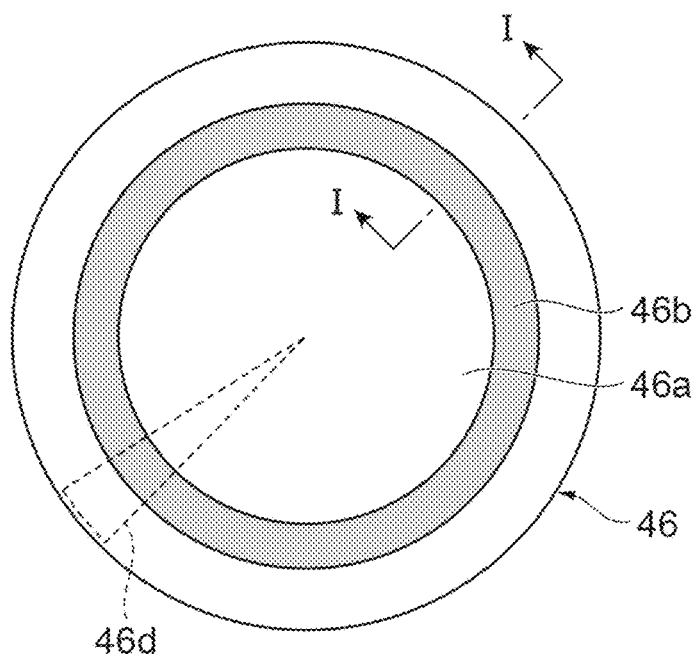
FIG. 37B is a plan view of a light emitting device included in the address light irradiation unit.
Figure 37C:
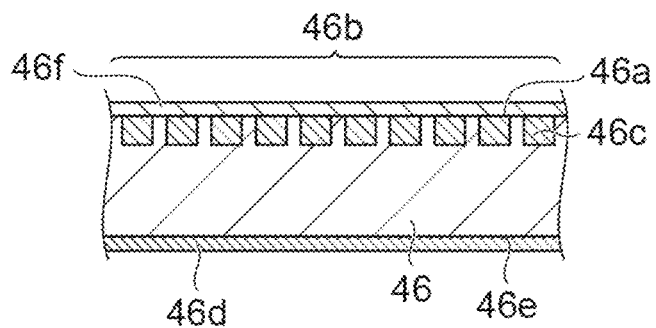
FIG. 37C is a view illustrating a cross section of the light emitting device taken along line I-I in FIG. 37B.

FIG. 37A is a sectional side view illustrating a configuration of an address light irradiation unit 4C as a third modification of the embodiment, and illustrates a cross section along a normal direction of a back surface 3b of a spatial light modulator 3. FIG. 37B is a plan view of a light emitting device 46 included in the address light irradiation unit 4C, and illustrates a configuration of the light emitting device 46 as viewed from the normal direction of the back surface 3b of the spatial light modulator 3. FIG. 37C is a diagram illustrating a cross section of the light emitting device 46 taken along line I-I in FIG. 37B.

The address light irradiation unit 4C irradiates the back surface 3b of the spatial light modulator 3 with address light E2 including a diffraction grating pattern. The address light irradiation unit 4C of the present modification includes the light emitting device 46 and an optical system 47. The light emitting device 46 has a disk shape, and has a main surface 46a and a back surface 46e opposite to the main surface 46a. In addition, the light emitting device 46 includes a light emitting unit 46b provided on the main surface 46a. The planar shape of the light emitting unit 46b is an annular ring shape provided along a circumference. The central axis of the annular ring coincides with the central axis of a pixel group of the spatial light modulator 3. As illustrated in FIG. 37C, the light emitting unit 46b includes a plurality of light emitting regions 46c arranged concentrically. By having such a plurality of light emitting regions 46c of a concentric shape, the light emitting unit 46b can output the address light E2 including the diffraction grating pattern having a radial direction of the circumference as a periodic direction. The plurality of light emitting regions 46c can be suitably configured by, for example, a surface emitting type semiconductor light emitting element such as a light emitting diode and a surface emitting laser. The surface emitting laser may be a VCSEL, a PCSEL, or an S-iPM laser (to be described later).

Figure 38A:
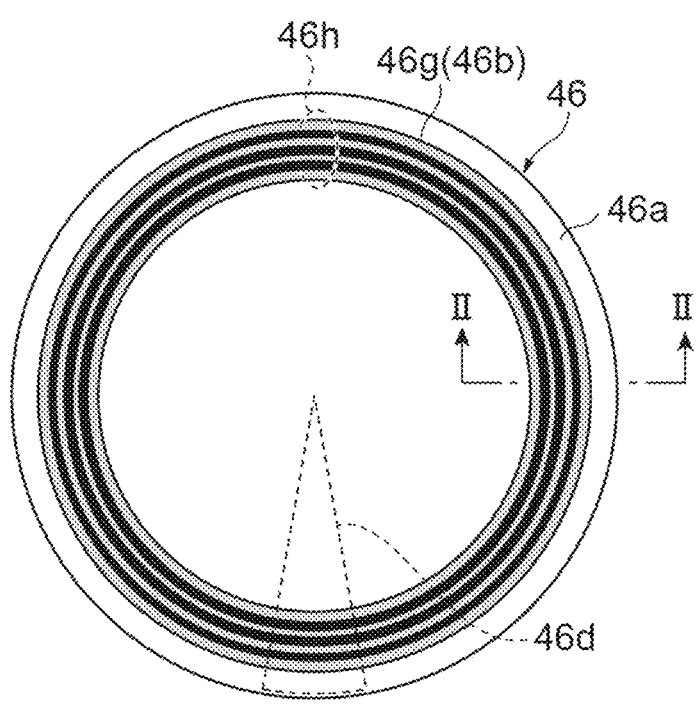
FIG. 38A is a plan view illustrating another configuration of the light emitting device 46 as the third modification.
Figure 38B:
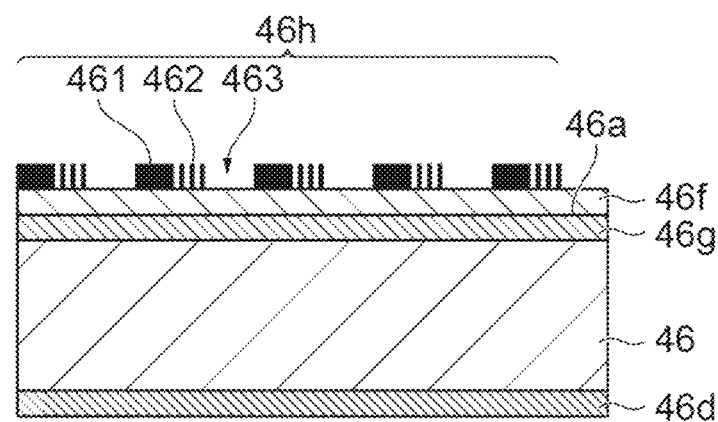
FIG. 38B is a cross-sectional view taken along line II-II of FIG. 38A.

In addition, as illustrated in FIG. 38A, the light emitting unit 46b may have a light emitting region 46g of a single annular ring shape instead of the plurality of light emitting regions 46c arranged concentrically. In that case, the light emitting device 46 preferably have a periodic structure 46h constituted by light shielding films on the main surface 46a. Note that FIG. 38B is a cross-sectional view taken along line II-II of FIG. 38A. The periodic structure 46h is provided on a light emitting surface of the light emitting region 46g, and an opening and a light shielding portion are periodically provided according to the diffraction grating pattern. Note that in examples illustrated in FIGS. 38A and 38B, light shielding portion 461 and 462 corresponding to the region E2a and the region E2b illustrated in FIGS. 9 to 12, respectively, and an opening 463 corresponding to the region E2c are periodically provided. The light emitting region 46g can be suitably configured by, for example, a surface emitting type semiconductor light emitting element such as a light emitting diode and a surface emitting laser. The surface emitting laser may be a VCSEL, a PCSEL, or an S-iPM laser (to be described later).

In addition, the light emitting unit 46b includes a plurality of element electrodes 46d and a conductive film 46f formed on the main surface 46a. In one example, the conductive film 46f is a transparent conductive film, and has a light transmissive property with respect to the wavelength of the address light E2. Note that in FIGS. 37B and 38A, only one element electrode 46d is representatively illustrated. The plurality of element electrodes 46d is provided on the back surface 46e of the light emitting device 46 and arranged side by side in a circumferential direction of the circumference. In one example, the planar shape of each element electrode 46d is a fan shape having the center of the annular ring of the light emitting unit 46b as a center point. These element electrodes 46d selectively emit the address light E2 by supplying a drive current between the element electrodes 46d and the conductive film 46f in a portion of the light emitting unit 46b corresponding to a desired direction of the diffraction grating pattern on the back surface 3b of the spatial light modulator 3. As a result, it is possible to dynamically change the direction of the diffraction grating pattern on the back surface 3b. In one example, each element electrode 46d causes the light emitting unit 46b to emit light in order in the circumferential direction. In that case, the diffraction grating pattern rotates in one direction on the back surface 3b.

The optical system 47 is arranged between the light emitting device 46 and the spatial light modulator 3, and optically couples the light emitting unit 46b and the back surface 3b of the spatial light modulator 3. An optical axis of the optical system 47 coincides with a central axis of the annular ring of the light emitting unit 46b, and the shape of the optical system 47 in a cross section including the central axis of the annular ring includes, for example, a convex lens. Alternatively, the shape of optical system 47 in the cross section including the center axis of the annular ring may include a meta-lens. In a case where the optical system 47 includes the meta-lens, the thickness of the optical system 47 in the optical axis direction can be reduced. Note that the shape of the optical system 47 is not limited thereto, and various other shapes can be adopted as long as the shape enables an image of the address light E2 to be formed on the back surface 3b.

The address light irradiation unit 4A of the above embodiment may be replaced with the address light irradiation unit 4C of the present modification. According to the configuration of the present modification, unlike the address light irradiation unit 4A, the address light irradiation unit 4C that dynamically changes the direction of the diffraction grating pattern on the back surface 3b can be suitably achieved by process processing on a plane without requiring assembly along the circumference. In the above example, the plurality of element electrodes 46d is provided on the back surface 46e of the light emitting device 46, but the conductive film 46f on a side of the main surface 46a may be divided into a plurality of element electrodes, and a single electrode may be provided on a side of the back surface 46e.

Fourth Modification

Figure 39:
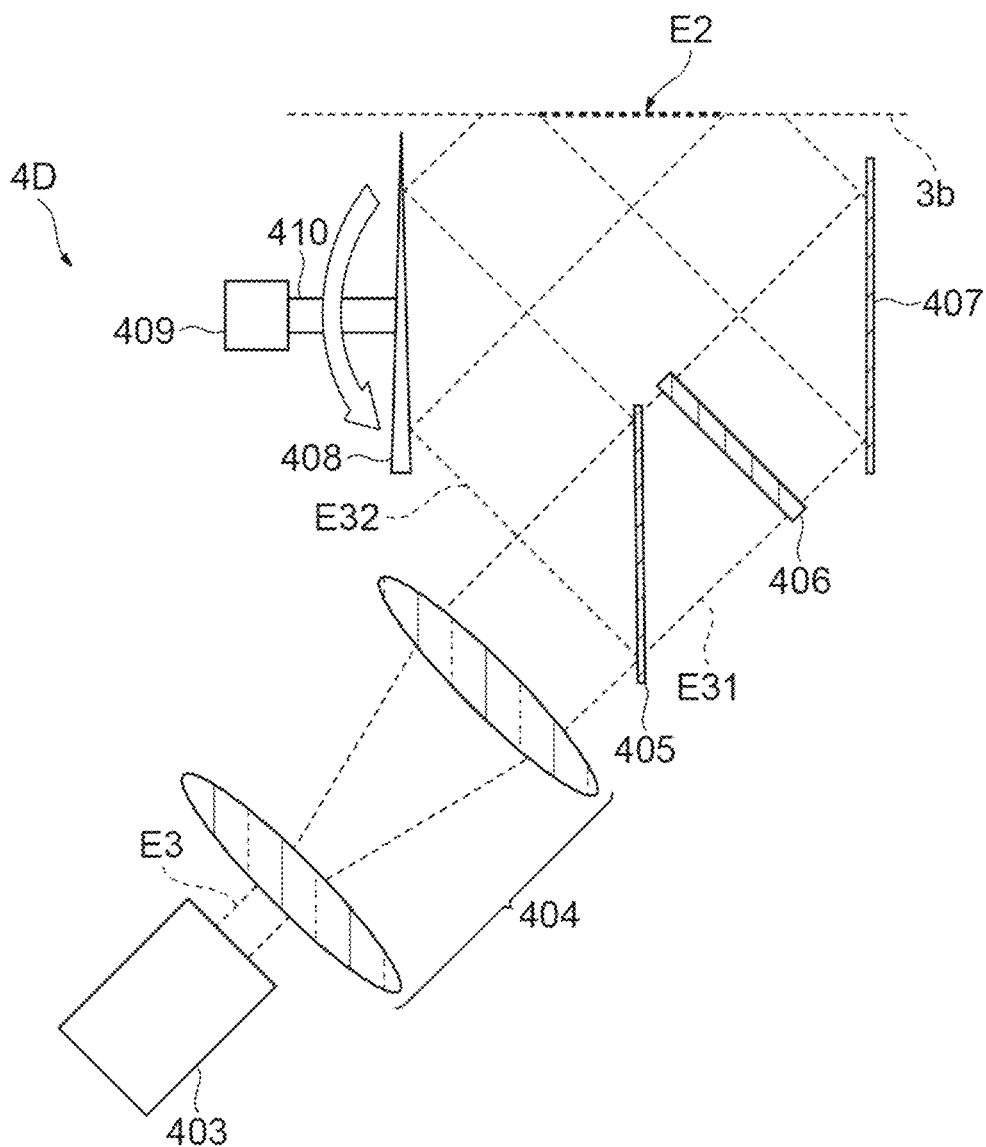
FIG. 39 is a diagram schematically illustrating a configuration of an address light irradiation unit as a fourth modification.

FIG. 39 is a diagram schematically illustrating a configuration of an address light irradiation unit 4D as a fourth modification of the above embodiment. The address light irradiation unit 4D irradiates a back surface 3b of a spatial light modulator 3 with address light E2 including a diffraction grating pattern. The address light irradiation unit 4D of the present modification includes a laser light source 403, a beam expander 404, a polarization beam splitter 405, a half-wave plate (2l2 plate) 406, a reflecting mirror 407, an inclined mirror 408, and a rotation driving unit 409.

The laser light source 403 outputs a laser beam E3 having the same wavelength as the wavelength of the address light E2. The beam expander 404 is optically coupled to the laser light source 403, expands the light diameter of the laser beam E3 outputted from the laser light source 403, collimates the laser beam E3, and outputs the collimated laser beam E3.

The polarization beam splitter 405 is an example of a branching unit in the present modification, and splits the laser beam E3 outputted from the laser light source 403 into two laser beams E31 and E32. Specifically, the polarization beam splitter 405 is optically coupled to the laser light source 403 via the beam expander 404, and splits the laser beam E3 received from the laser light source 403 into the two laser beams E31 and E32 according to a polarization direction. The polarization direction of the laser beam E3 is inclined at an angle larger than 0° and smaller than 90° (for example, 45°) with respect to a polarization direction in which the polarization beam splitter 405 has a transmission characteristic. Therefore, a polarization component of the laser beam E3 parallel to the polarization direction in which the polarization beam splitter 405 has a transmission characteristic is transmitted through the polarization beam splitter 405 to become the laser beam E31. A polarization component of the laser beam E3 orthogonal to the polarization direction in which the polarization beam splitter 405 has a transmission characteristic is reflected by the polarization beam splitter 405 to become the laser beam E32.

A half-wave plate 406 is optically coupled to the laser light source 403 via the polarization beam splitter 405 and the beam expander 404, receives the laser beam E31 outputted from the polarization beam splitter 405, and rotates the polarization direction of the laser beam E31 by 90° by changing a phase by 180°. As a result, the polarization direction of the laser beam E31 after passing through the half-wave plate 406 coincides with the polarization direction of the laser beam E32.

The reflecting mirror 407 and the inclined mirror 408 constitute an interference optical system in the present modification. The reflecting mirror 407 is optically coupled to the laser light source 403 via the half-wave plate 406 and the polarization beam splitter 405 and reflects the laser beam E31 transmitted through the polarization beam splitter 405 and the half-wave plate 406 toward the back surface 3b of the spatial light modulator 3. The inclined mirror 408 is optically coupled to the laser light source 403 via the polarization beam splitter 405 and reflects the laser beam E32 branched by the polarization beam splitter 405 toward the back surface 3b of the spatial light modulator 3. The reflecting mirror 407 and the inclined mirror 408 are arranged to face each other, and the laser beams E31 and E32 are directed to the back surface 3b from a direction opposite to each other when viewed from a normal direction of the back surface 3b. The reflecting mirror 407 and the inclined mirror 408 cause the laser beams E31 and E32 branched by the polarization beam splitter 405 to interfere with each other to generate an interference fringe on the back surface 3b of the spatial light modulator 3. The interference fringe is used as a diffraction grating pattern of the address light E2 on the back surface 3b.

The rotation driving unit 409 and the inclined mirror 408 constitute a position changing unit in the present modification, and dynamically change a relative positional relationship at the time of interference between the laser beams E31 and E32. Specifically, the inclined mirror 408 is connected to the rotation driving unit 409 via a rotating shaft 410, and receives driving force of the rotation driving unit 409 to rotate around a predetermined axis. In addition, a normal direction of the light reflecting surface of the inclined mirror 408 is slightly inclined with respect to the predetermined axis, and when the inclined mirror 408 rotates about the predetermined axis, the optical axis of the laser beam E32 also rotates with a minute radius. As a result, a relative position of an irradiation spot of the laser beam E31 with respect to an irradiation spot of the laser beam E32 moves along a certain circle on the back surface 3b of the spatial light modulator 3. Therefore, the diffraction grating pattern of the address light E2, which is the interference fringe of the laser beams E31 and E32, rotates in one direction on the back surface 3b.

As in the present modification, the interference fringe may be used as the diffraction grating pattern. In that case, as in the present modification, by dynamically changing the relative positional relationship at the time of interference between one laser beam E31 and the other laser beam E32 constituting the interference fringe, a direction of the interference fringe, that is, a direction of the diffraction grating pattern can be dynamically changed. Note that the dynamic change in the direction of the diffraction grating pattern is not limited to the rotation of the diffraction grating pattern, and may be a rotation operation in a certain limited angular range. Note that in the above example, the polarization beam splitter 405 and the half-wave plate 406 are used, but the laser beam E3 may be branched using a half mirror or the like instead of the polarization beam splitter. In this case, the half-wave plate 406 is unnecessary.

Fifth Modification

Figure 40A:
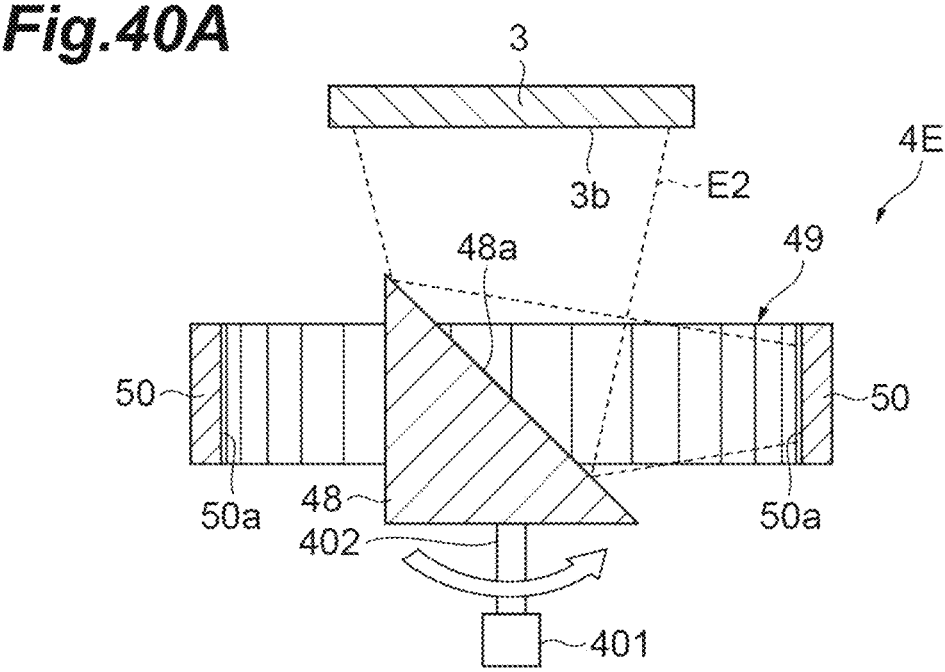
FIG. 40A is a view schematically illustrating a configuration of an address light irradiation unit as a fifth modification.
Figure 40B:
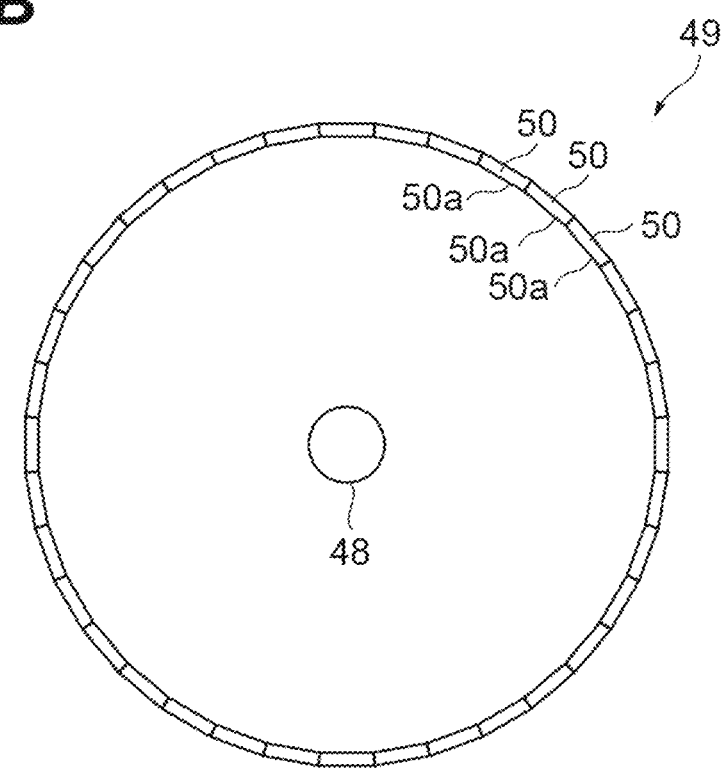
FIG. 40B is a plan view of a light emitting device as viewed from the axial direction of an annular ring.

FIG. 40A is a diagram schematically illustrating a configuration of an address light irradiation unit 4E as a fifth modification of the above embodiment. The address light irradiation unit 4E irradiates a back surface 3b of a spatial light modulator 3 with address light E2 including a diffraction grating pattern. The address light irradiation unit 4E of the present modification includes a light emitting device 49 of an annular ring shape and an optical system including an optical member 48 arranged inside the light emitting device 49. FIG. 40B is a plan view of the light emitting device 49 as viewed from the axial direction of an annular ring. As illustrated in FIGS. 40A and 40B, the light emitting device 49 includes a plurality of surface emitting laser element arrays 50. Each surface emitting laser element array 50 is an example of a light emitting unit in the present modification. The plurality of surface emitting laser element arrays 50 is arranged side by side along a circumference with a light emitting surface 50a facing inward. The surface emitting laser element array 50 of the present modification is formed by arranging a plurality of surface emitting laser elements 52 one-dimensionally or two-dimensionally. Each surface emitting laser element 52 outputs any optical image by controlling a phase spectrum and an intensity spectrum of light emitted from a plurality of light emitting points arranged two-dimensionally. Such a surface emitting laser element 52 is called a static-integrable phase modulating (S-iPM) laser, and can output a optical image of a two-dimensional any shape including a direction perpendicular to a main surface of a semiconductor substrate and a direction inclined with respect to the direction. Therefore, the surface emitting laser element array 50 can form an image of the address light E2 on the back surface 3b by appropriately designing the phase spectrum and the intensity spectrum of the output light in advance. The address light E2 includes the diffraction grating pattern (for example, a pattern in which three regions E2a to E2c having different light intensities as illustrated in FIGS. 9 to 12 are repeated in order) in a far-field image.

The optical member 48 includes a flat reflecting mirror 48a arranged at the center of the light emitting device 49 of an annular ring shape. The reflecting mirror 48a optically couples the plurality of surface emitting laser element arrays 50 of the light emitting device 49 and the back surface 3b of the spatial light modulator 3. That is, the reflecting mirror 48a reflects the address light E2 emitted from the surface emitting laser element array 50 toward the back surface 3b of the spatial light modulator 3.

A rotation driving unit 401 is attached to the optical member 48 via a rotating shaft 402. The rotating shaft 402 extends in the normal direction of the back surface 3b, and rotates around an axis along the normal direction of the back surface 3*b* by driving force from the rotation driving unit 401. As a result, a direction of the reflecting mirror 48*a* dynamically changes, and the address light E2 from some surface emitting laser element arrays 50 selected from the plurality of surface emitting laser element arrays 50 and corresponding to a desired direction of the diffraction grating pattern can be inputted to the back surface 3*b* of the spatial light modulator 3. Therefore, the direction of the diffraction grating pattern on the back surface 3*b* can be dynamically changed. In one example, the rotating shaft 402 rotates in one direction by driving force from the rotation driving unit 401. In that case, the diffraction grating pattern rotates in one direction on the back surface 3*b*.

Figure 41A:
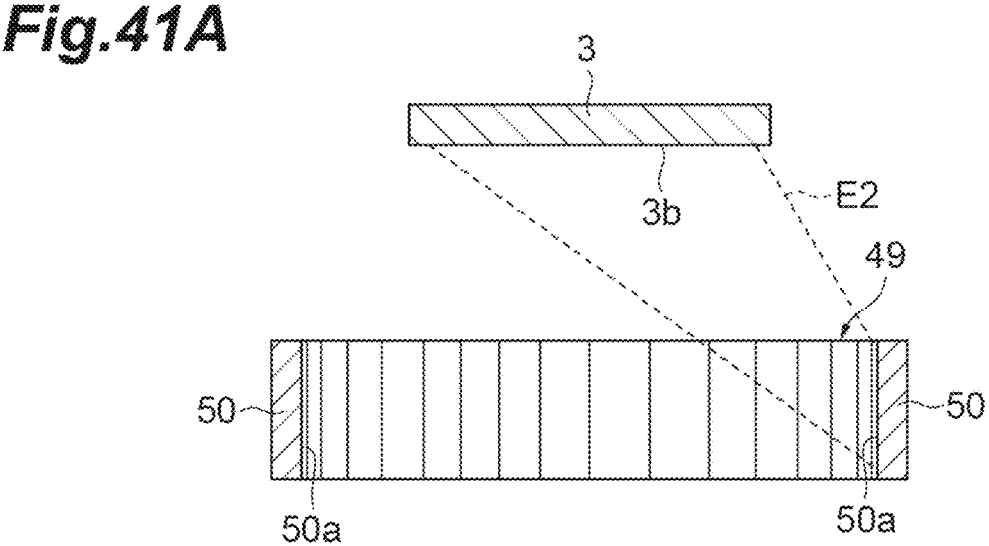
FIGS. 41A to 41C are diagrams schematically illustrating another configuration of the fifth modification.
Figure 41B:
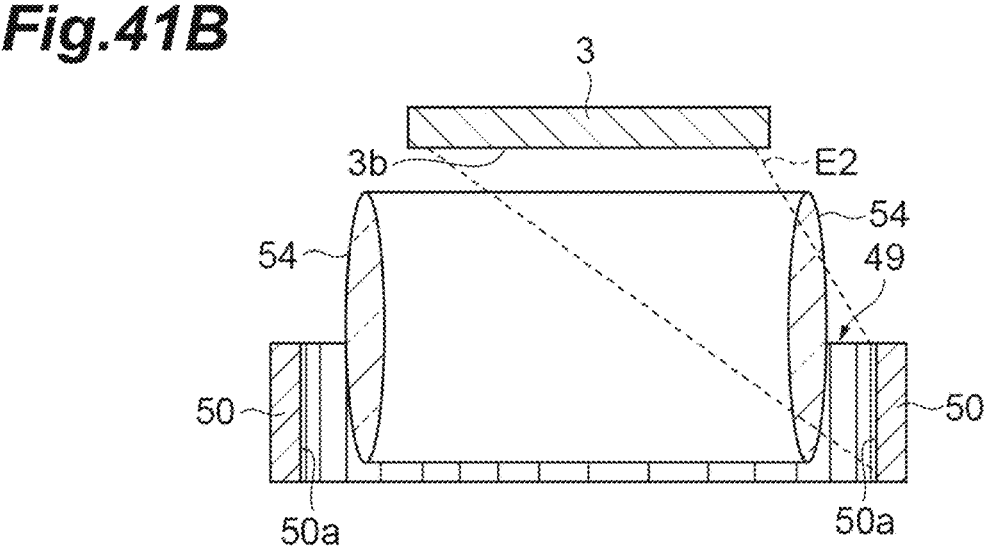
Figure 41C:
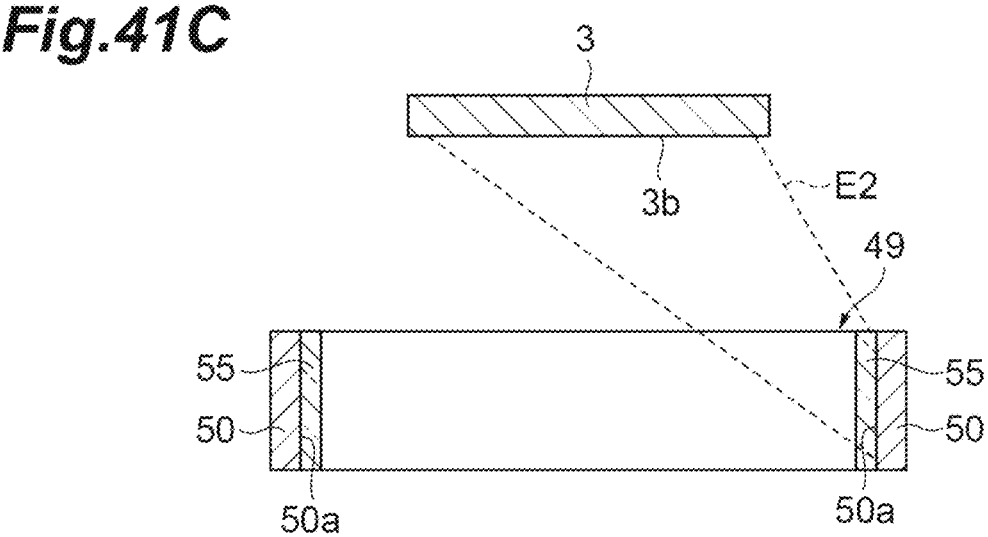

Note that as illustrated in FIG. 41A, the back surface 3*b* may be directly irradiated with the address light E2 from the surface emitting laser element array 50 without the address light E2 passing through the optical member 48, or as illustrated in FIG. 41B, the back surface 3*b* may be irradiated with the address light E2 from the surface emitting laser element array 50 via a lens 54. In addition, as illustrated in FIG. 41C, a meta-lens 55 may be formed on the light emitting surface 50*a* and integrated with the surface emitting laser element array 50. According to a configuration illustrated in FIGS. 41A to 41C, since the optical member 48 is not required, electrical switching can be performed without requiring a mechanical rotation mechanism. Therefore, the configuration is suitable for increasing in size and speed.

Figure 42:
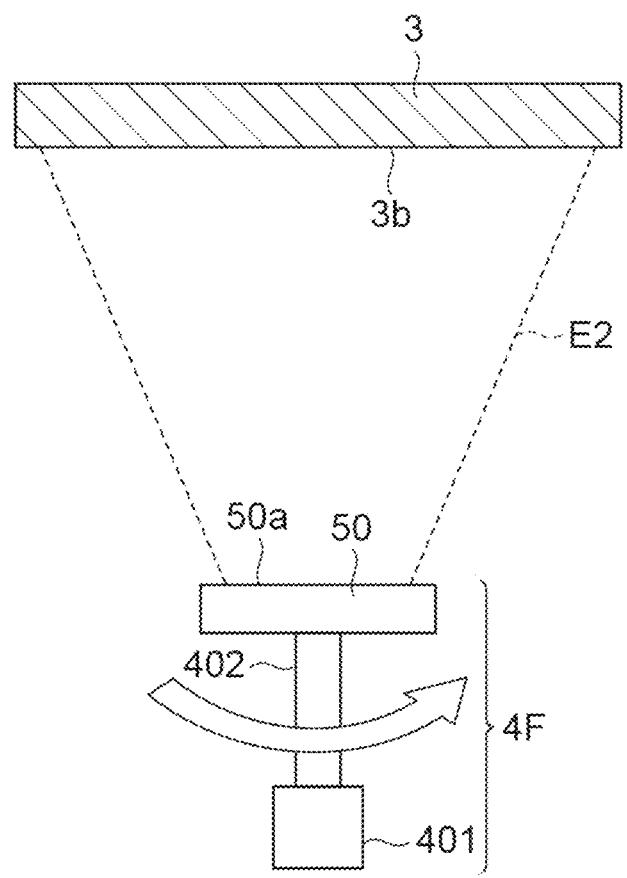
FIG. 42 is a diagram schematically illustrating a configuration of an address light irradiation unit as another configuration of the fifth modification.

FIG. 42 is a diagram schematically illustrating a configuration of an address light irradiation unit 4F as another configuration of the present modification. The address light irradiation unit 4F also irradiates a back surface 3*b* of a spatial light modulator 3 with address light E2 including a diffraction grating pattern. The address light irradiation unit 4F includes a surface emitting laser element array 50 and a rotation driving unit 401. The surface emitting laser element array 50 is arranged below the spatial light modulator 3 so that the light emitting surface 50*a* of the surface emitting laser element array 50 faces the back surface 3*b* of the spatial light modulator 3. A rotation driving unit 401 is attached to the surface emitting laser element array 50 via a rotating shaft 402. The rotating shaft 402 extends in the normal direction of the back surface 3*b*, and dynamically changes an attitude angle around an axis along the normal direction of the back surface 3*b* by driving force from the rotation driving unit 401. As a result, the direction of the diffraction grating pattern on the back surface 3*b* dynamically changes. In one example, the rotating shaft 402 rotates in one direction by driving force from the rotation driving unit 401. In that case, the diffraction grating pattern rotates in one direction on the back surface 3*b*. In this way, the address light irradiation unit 4F may include a light emitting unit (surface emitting laser element array 50) that outputs the address light E2 including the diffraction grating pattern, and a driving unit (rotation driving unit 401) that dynamically changes an attitude angle of the light emitting unit around an optical axis. In this case, the address light irradiation unit 4F that dynamically changes the direction of the diffraction grating pattern on the back surface 3*b* can be suitably achieved. Note that in the present modification, an attitude angle of the surface emitting laser element array 50 is dynamically changed, but an attitude angle of the light emitting unit 42 illustrated in FIG. 8 may be dynamically changed by a configuration similar to that of the present modification.

Figure 43A:
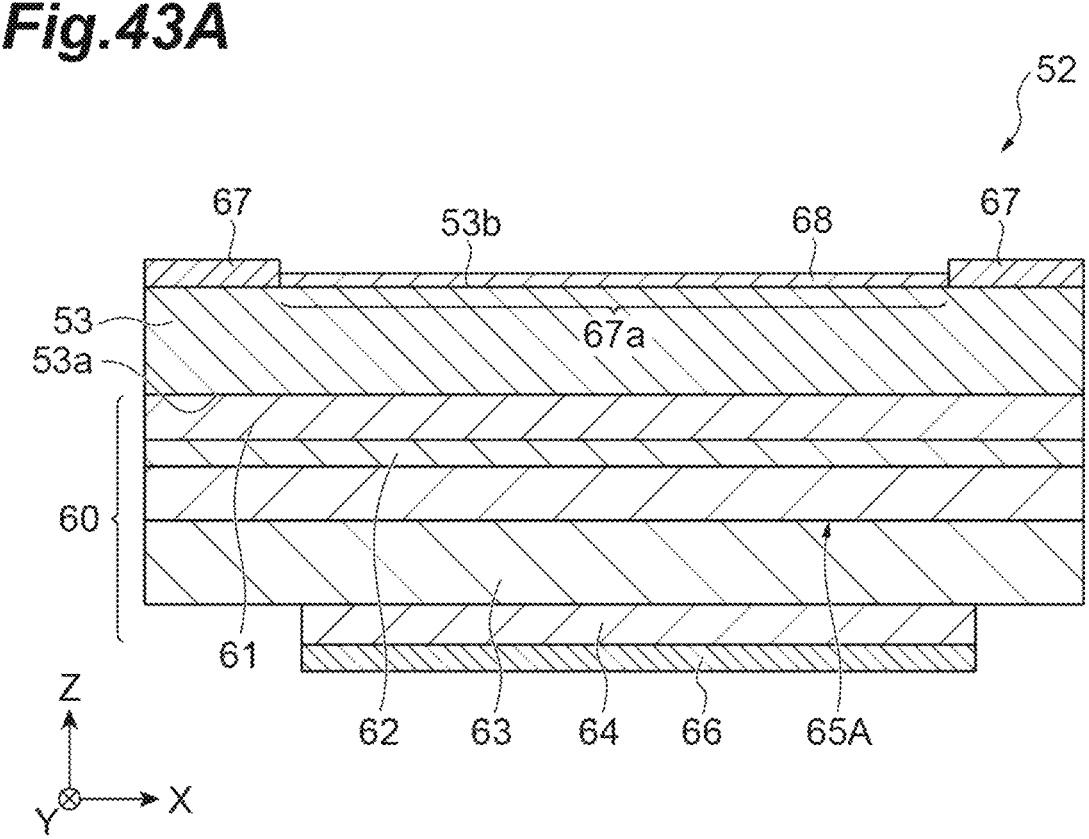
FIG. 43A is a cross-sectional view illustrating a configuration of a surface emitting laser element array.

Here, a surface emitting laser element 52 constituting the surface emitting laser element array 50 will be described in detail. FIG. 43A is a cross-sectional view illustrating a configuration of the surface emitting laser element 52. An XYZ orthogonal coordinate system is defined. In the XYZ orthogonal coordinate system, axis passing through the center of the surface emitting laser element 52 and extending in the thickness direction of the surface emitting laser element 52 is a Z-axis. The surface emitting laser element 52 forms a standing wave in the in-plane direction of an X-Y plane, and outputs the address light E2 in a direction (Z direction) perpendicular to a main surface 53*a* of a semiconductor substrate 53.

The surface emitting laser element 52 includes the semiconductor substrate 53 and a semiconductor stack 60 provided on the main surface 53*a* of the semiconductor substrate 53. The semiconductor stack 60 includes a cladding layer 61 provided on the main surface 53*a*, an active layer 62 provided on the cladding layer 61, a cladding layer 63 provided on the active layer 62, and a contact layer 64 provided on the cladding layer 63. Furthermore, the semiconductor stack 60 includes a phase modulation layer 65A. In an example illustrated in FIG. 43A, the phase modulation layer 65A is provided between the active layer 62 and the cladding layer 63, but the phase modulation layer 65A may be provided between the cladding layer 61 and the active layer 62. The address light E2 is outputted from a back surface 53*b* of the semiconductor substrate 53 and provided to the spatial light modulator 3. That is, the back surface 53*b* of the semiconductor substrate 53 corresponds to the light emitting surface 50*a* in FIGS. 40A, 40B, and 42.

The energy band gaps of the cladding layer 61 and the cladding layer 63 are wider than the energy band gap of the active layer 62. The thickness directions of the semiconductor substrate 53, the cladding layers 61 and 63, the active layer 62, the contact layer 64, and the phase modulation layer 65A coincide with a Z-axis direction.

Figure 43B:
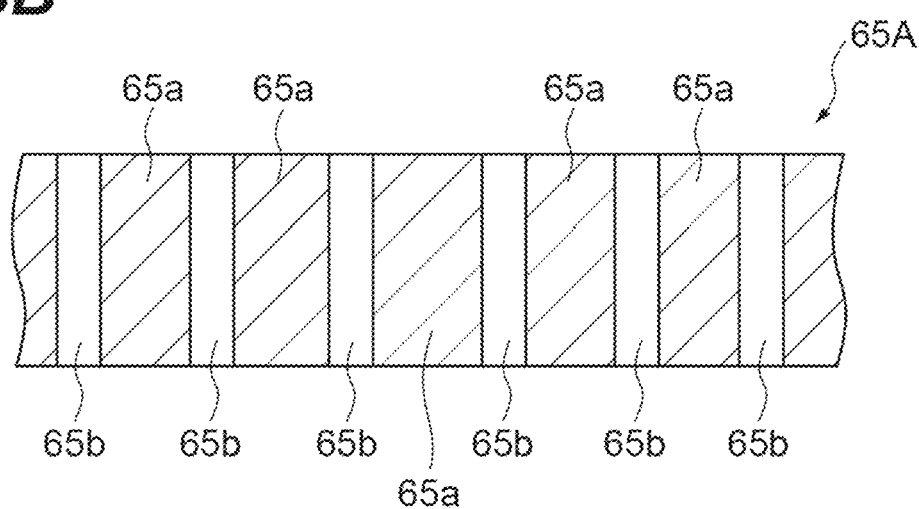
FIG. 43B is an enlarged cross-sectional view illustrating a phase modulation layer.

The phase modulation layer 65A is a layer that forms a resonance mode. FIG. 43B is an enlarged cross-sectional view illustrating the phase modulation layer 65A. The phase modulation layer 65A includes a base layer 65*a* and a plurality of modified refractive index regions 65*b*. The base layer 65*a* is a semiconductor layer including a first refractive index medium. The plurality of modified refractive index regions 65*b* includes a second refractive index medium having a refractive index different from a refractive index of the first refractive index medium, and exists in the base layer 65*a*. The modified refractive index region 65*b* may be a hole or may be configured by embedding a compound semiconductor in the hole. The plurality of modified refractive index regions 65*b* is two-dimensionally arranged in a plane (on an X-Y plane) perpendicular to the thickness direction of the phase modulation layer 65A.

Figure 44:
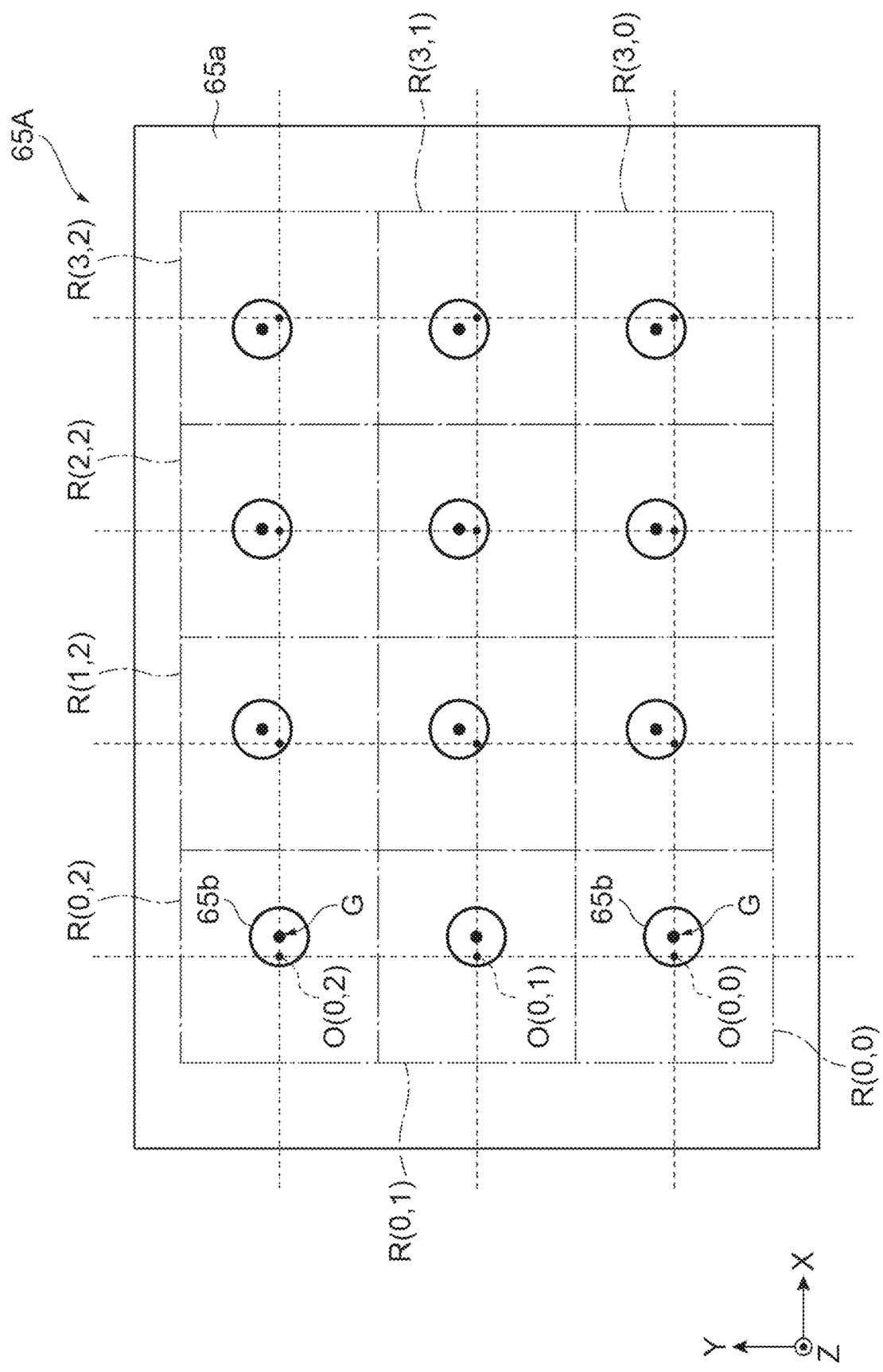
FIG. 44 is a plan view of the phase modulation layer.

FIG. 44 is a plan view of the phase modulation layer 65A. Here, a virtual square lattice is set on a surface parallel to the X-Y plane of the phase modulation layer 65A. A side of the square lattice is parallel to an X-axis, and the other side is parallel to a Y-axis. At this time, a square unit constituent region R(x, y) centered on a lattice point O(x, y) of the square lattice can be set two-dimensionally over a plurality of columns (x=0 to 3) along the X-axis and a plurality of rows (y=0 to 2) along the Y-axis. The plurality of modified refractive index regions 65*b* is provided one by one in each unit constituent region R(x, y). The planar shape of the modified refractive index region 65*b* is, for example, a circular shape, but is not limited thereto, and may be various shapes such as a polygonal shape, a closed curve, or a shape including two or more closed curves. In the unit constituent region R(x, y), a center of gravity G of the modified refractive index region 65b is arranged away from the lattice point O(x, y) closest thereto.

Figure 45:
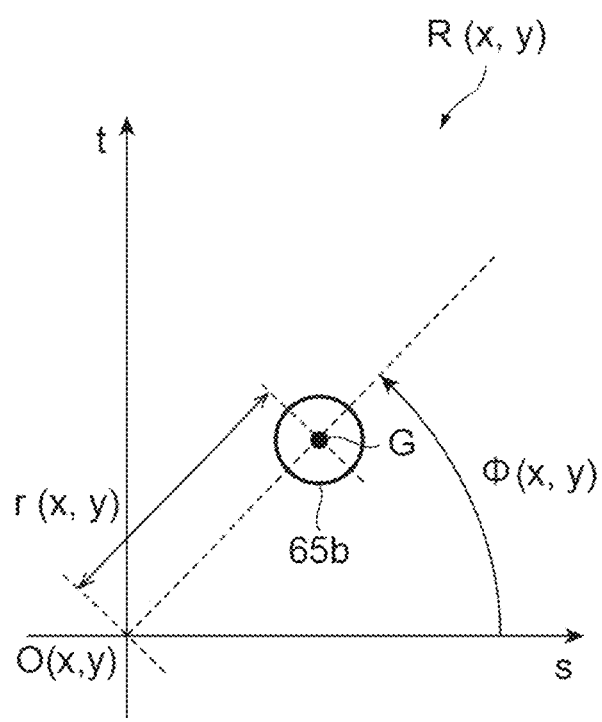
FIG. 45 is a diagram illustrating the position of a center of gravity G of a modified refractive index region on an X-Y plane.

As illustrated in FIG. 45, a position in the unit constituent region R(x, y) is given by an orthogonal coordinate system (coordinate system defined by an s-axis parallel to the X-axis and a t-axis parallel to the Y-axis) with the lattice point O(x, y) as the origin. An angle formed by a direction from the lattice point O(x, y) toward the center of gravity G and the s-axis is φ(x, y). Note that a component x indicates the position of the x-th lattice point O(x, y) on the X-axis, and a component y indicates the position of the y-th lattice point O(x, y) on the Y-axis. In a case where a rotation angle φ is 0°, the length of a vector connecting the lattice point O(x, y) and the center of gravity G coincides with the positive direction of the s-axis. In addition, the length of the vector connecting the lattice point O(x, y) and the center of gravity G is a distance r(x, y). In one example, the distance r(x, y) is constant regardless of x and y (over the entire phase modulation layer 65A). Note that when the distance r(x, y)=0, the center of gravity G of the modified refractive index region 65b coincides with the lattice point O(x, y), and the surface emitting laser element 52 becomes a PCSEL.

Note that as illustrated in FIG. 44, in the phase modulation layer 65A, the rotation angle φ around the lattice point O of the center of gravity G of the modified refractive index region 65b is independently and individually set for each unit constituent region R(x, y) according to a desired optical image. In the unit constituent region R(x, y), a rotation angle distribution φ(x, y) has a specific value for each position determined by the values of x and y, but is not necessarily represented by a specific function. That is, the rotation angle distribution φ(x, y) is determined from a phase distribution extracted from a complex amplitude distribution obtained by performing an inverse Fourier transform on the desired optical image. Note that when the complex amplitude distribution is obtained from the desired optical image, reproducibility of a beam pattern is improved by applying an iterative algorithm such as the Gerchberg-Saxton (GS) method generally used at the time of calculation of hologram generation.

Figure 46:
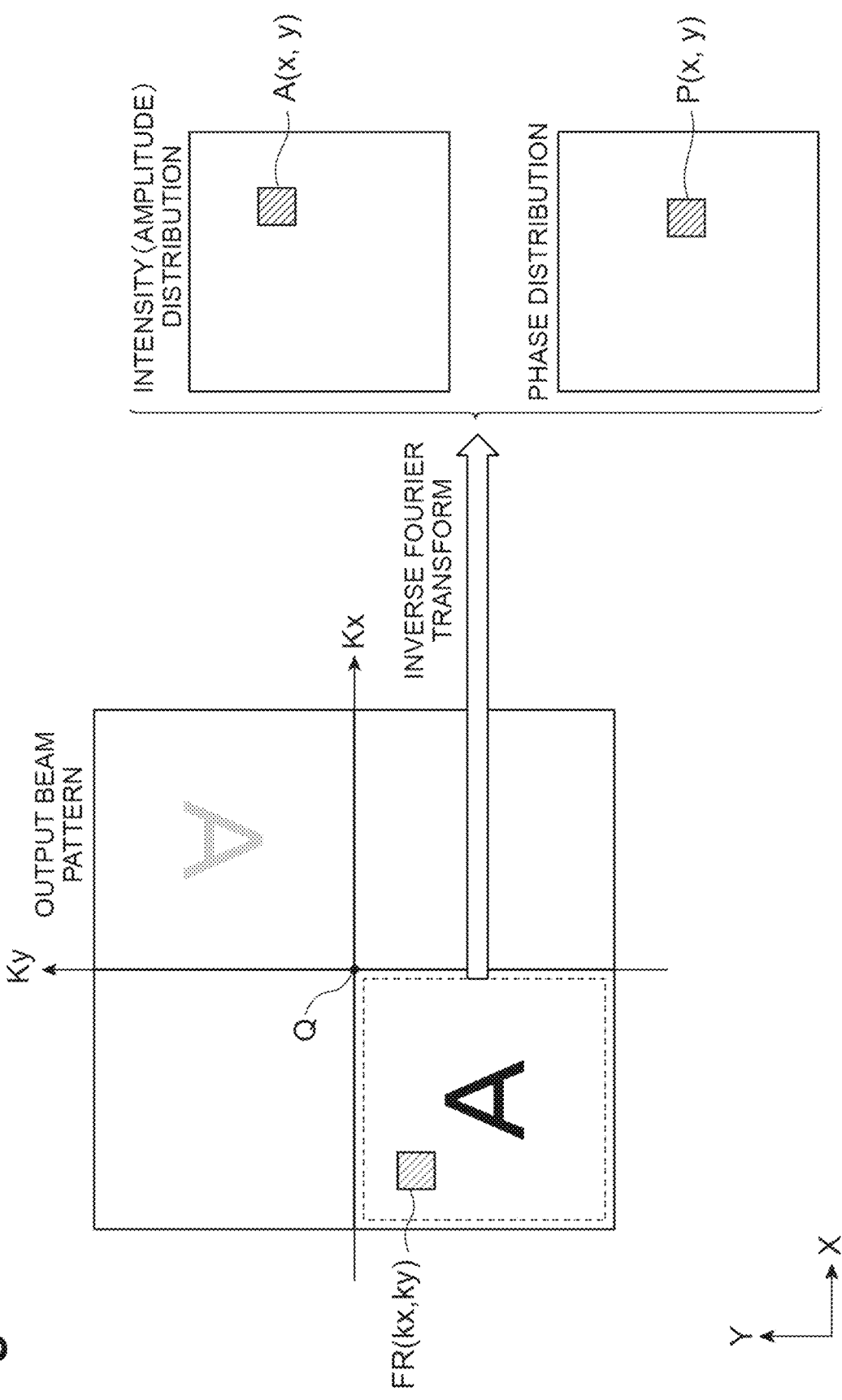
FIG. 46 is a diagram for describing a relationship between a optical image obtained by forming an image of an output beam pattern of the surface emitting laser element array and a rotation angle distribution φ(x, y) in the phase modulation layer.

FIG. 46 is a diagram for describing a relationship between a optical image obtained by forming an image of an output beam pattern of the surface emitting laser element 52 and the rotation angle distribution φ(x, y) in the phase modulation layer 65A. Note that a center Q of the output beam pattern is not necessarily located on an axis line perpendicular to the main surface 53a of the semiconductor substrate 53, but can be arranged on a vertical axis line. Here, for the sake of description, the center Q is assumed to be on the axis line perpendicular to the main surface 53a. FIG. 46 illustrates four quadrants with the center Q as the origin. FIG. 46 illustrates, as one example, a case where optical images are obtained in a first quadrant and a third quadrant, but it is also possible to obtain images in a second quadrant and a fourth quadrant or all the quadrants. In the present modification, as illustrated in FIG. 46, a point-symmetric optical image with respect to the origin is obtained. FIG. 46 illustrates, as one example, a case where a character "A" is obtained in the third quadrant and a pattern in which a pattern obtained by rotating the character "A" by 180 degrees is obtained in the first quadrant. Note that in a case where the optical images are rotationally symmetric, the optical images are superimposed and observed as one optical image.

The optical image of the output beam pattern of the surface emitting laser element 52 of the present modification includes a diffraction grating pattern. Here, in order to obtain a desired optical image including a diffraction grating pattern, the rotation angle distribution φ(x, y) of the modified refractive index region 65b of the phase modulation layer 65A is determined by the following procedure.

First, as a first precondition, a virtual square lattice including M1 (an integer of 1 or more)×N1 (an integer of 1 or more) unit constituent regions R (x,y) each having a square shape is set on an X-Y plane in an XYZ orthogonal coordinate system. The XYZ orthogonal coordinate system is defined by a Z-axis coincident with a normal direction and the X-Y plane including X- and Y-axes orthogonal to each other and coincident with one surface of the phase modulation layer 65A including the plurality of modified refractive index regions 65b.

Figure 47:
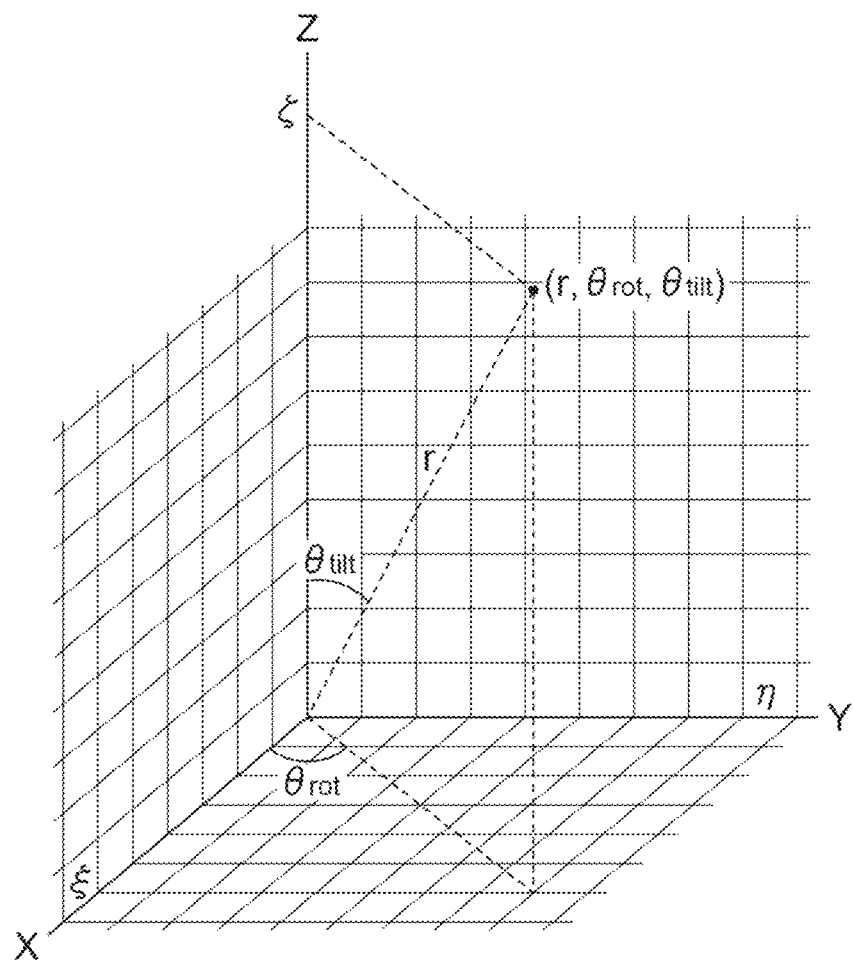
FIG. 47 is a diagram for describing a coordinate transformation from spherical coordinates (r, $\theta_{rot}$, $\theta_{tilt}$) to coordinates (ξ, η, ζ) in an XYZ orthogonal coordinate system.

As a second precondition, it is assumed that coordinates (ξ, η, ζ) on the XYZ orthogonal coordinate system satisfy relationships expressed by the following Formulae (6) to (8) with respect to spherical coordinates (r, $\theta_{rot}$, $\theta_{tilt}$) defined by a length r of a radius vector, an inclination angle $\theta_{tilt}$ from the Z-axis, and a rotation angle $\theta_{rot}$ from the X-axis specified on the X-Y plane as illustrated in FIG. 47. Note that FIG. 47 is a diagram for describing a coordinate transformation from spherical coordinates (r, $\theta_{rot}$, $\theta_{tilt}$) to coordinates (ξ, η, ζ) in the XYZ orthogonal coordinate system, and a designed optical image on a predetermined plane set in the XYZ orthogonal coordinate system, which is a real space, is expressed by the coordinates (ξ, η, ζ). When the beam pattern corresponding to the optical image outputted from the surface emitting laser element 52 is a set of bright spots oriented in a direction defined by angles $\theta_{tilt}$ and $\theta_{rot}$, the angles $\theta_{tilt}$ and $\theta_{rot}$ can be converted into a coordinate value $k_x$ and a coordinate value $k_y$. The coordinate value $k_x$ is a normalized wave number defined by the following Formula (9) and is on a Kx-axis corresponding to the X-axis. The coordinate value ky is a normalized wave number defined by the following Formula (10) and is on a Ky-axis corresponding to the Y-axis and orthogonal to the Kx-axis. The normalized wave number means a wave number normalized with a wave number 2π/a corresponding to a lattice interval of the virtual square lattice as 1.0. At this time, in a wave number space defined by the Kx-axis and the Ky-axis, a specific wave number range including the beam pattern corresponding to the optical image is constituted by M2 (an integer of 1 or more)×N2 (an integer of 1 or more) image regions FR($k_x$, $k_y$) each having a square shape. Note that the integer M2 does not need to coincide with the integer M1. Similarly, the integer N2 does not need to coincide with the integer N1. In addition, Formulae (9) and (10) are disclosed, for example, in the above Non-Patent Document 4.

$$\xi = r\sin\theta_{tilt}\cos\theta_{rot} \quad (6)$$

$$\eta = r\sin\theta_{tilt}\sin\theta_{rot} \quad (7)$$

$$\zeta = r\cos\theta_{tilt} \quad (8)$$

$$k_x = \frac{a}{\lambda}\sin\theta_{tilt}\cos\theta_{rot} \quad (9)$$

$$k_y = \frac{a}{\lambda}\sin\theta_{tilt}\sin\theta_{rot} \quad (10)$$

a: a lattice constant of the virtual square lattice
λ: an oscillation wavelength of the surface emitting laser element 52

As a third precondition, a complex amplitude F(x, y) is given by the following Formula (11) with j as an imaginary unit. The complex amplitude F(x, y) is obtained by performing a two-dimensional inverse discrete Fourier transform on each image regions FR($k_x$, $k_y$) into the unit constituent region R(x, y) on the X-Y plane in the wave number space. The image region FR($k_x$, $k_y$) is specified by a coordinate component $k_x$ (an integer of 0 or more and M2−1 or less) in a Kx-axis direction and a coordinate component $k_y$ (an integer of 0 or more and N2−1 or less) in a Ky-axis direction. The unit constituent region R(x, y) is specified by a coordinate component x (an integer of 0 or more and M1−1 or less) in an X-axis direction and a coordinate component y (an integer of 0 or more and N1−1 or less) in a Y-axis direction. In addition, the complex amplitude F(x, y) is defined by the following Formula (12) when an amplitude term is A(x, y) and a phase term is P(x, y). Furthermore, as a fourth precondition, the unit constituent region R(x, y) is defined by the s-axis and the t-axis. The s-axis and the t-axis are parallel to the X-axis and the Y-axis, respectively, and are orthogonal to each other at the lattice point O(x, y) that is the center of the unit constituent region R(x, y).

$$F(x, y) = \sum_{k_x=0}^{M2-1} \sum_{k_y=0}^{N2-1} FR(k_x, k_y)\exp\left[j2\pi\left(\frac{k_x}{M2}x + \frac{k_y}{N2}y\right)\right] \quad (11)$$

$$F(x, y) = A(x, y) \times \exp[jP(x, y)] \quad (12)$$

Under the above first to fourth preconditions, the phase modulation layer 65A is configured to satisfy the following first and second conditions. That is, the first condition is that the center of gravity G is arranged while being separated from the lattice point O(x, y) in the unit constituent region R(x, y). In addition, the second condition is that the corresponding modified refractive index region 65b is arranged in the unit constituent region R(x, y) so as to satisfy the following relationship in a state in which a line segment length $r_2$(x, y) from the lattice point O(x, y) to the corresponding center of gravity G is set to a common value in respective M1×N1 unit constituent regions R(x, y): an angle φ(x, y) formed by a line segment connecting the lattice point O(x, y) and the corresponding center of gravity G and the s-axis satisfies:

φ(x,y)=C×P(x,y)+B

C: a proportional constant, for example, 180°/π
B: any constant, for example, 0

As a method for obtaining an intensity distribution and the phase distribution from the complex amplitude distribution obtained by a Fourier transform, for example, an intensity distribution I(x, y) can be calculated by using the abs function of numerical analysis software "MATLAB" of The MathWorks, Inc., and a phase distribution P(x, y) can be calculated by using the angle function of MATLAB.

Here, description will be given on points to be noted in a case where calculation is performed using a general discrete Fourier transform (or fast Fourier transform) when the rotation angle distribution φ(x, y) is obtained from a Fourier transform result of the optical image and the arrangement of each modified refractive index region 65b is determined. When the optical image before the Fourier transform is divided into four quadrants A1, A2, A3, and A4 as illustrated in FIG. 48A, an obtained beam pattern is as illustrated in FIG. 48B. That is, in the first quadrant of the beam pattern in FIG. 48B, a superimposed pattern of a pattern obtained by rotating the first quadrant of FIG. 48A by 180 degrees and a pattern of the third quadrant of FIG. 48A appears. In the second quadrant of the beam pattern, a superimposed pattern of a pattern obtained by rotating the second quadrant of FIG. 48A by 180 degrees and a pattern of the fourth quadrant of FIG. 48A appears. In the third quadrant of the beam pattern, a superimposed pattern of a pattern obtained by rotating the third quadrant of FIG. 48A by 180 degrees and a pattern of the first quadrant of FIG. 48A appears. In the fourth quadrant of the beam pattern, a superimposed pattern of a pattern obtained by rotating the fourth quadrant of FIG. 48A by 180 degrees and a pattern of the second quadrant of FIG. 48A appears.

Therefore, in a case where a optical image having a value only in the first quadrant is used as the optical image (original optical image) before the Fourier transform, the first quadrant of the original optical image appears in the third quadrant of the obtained beam pattern, and a pattern obtained by rotating the first quadrant of the original optical image by 180 degrees appears in the first quadrant of the obtained beam pattern.

In this way, in the surface emitting laser element 52, a desired beam pattern is obtained by phase-modulating a wavefront. The beam pattern is not only a pair of unimodal beams (spots) but also can be diffraction grating patterns, for example, as illustrated in FIGS. 9 to 12.

In the present modification, laser light outputted from the active layer 62 enters the inside of the phase modulation layer 65A while being confined between the cladding layer 61 and the cladding layer 63, and forms a predetermined mode corresponding to a lattice structure inside the phase modulation layer 65A. The laser beam scattered and emitted in the phase modulation layer 65A is outputted from the back surface 53b of the semiconductor substrate 53 to the outside. At this time, zero-order light is emitted in a direction perpendicular to the main surface 53a. Meanwhile, +1st-order light and −1st-order light are emitted in any two-dimensional direction including the direction perpendicular to the main surface 53a and a direction inclined with respect to the direction perpendicular to the main surface 53a.

Figure 49:
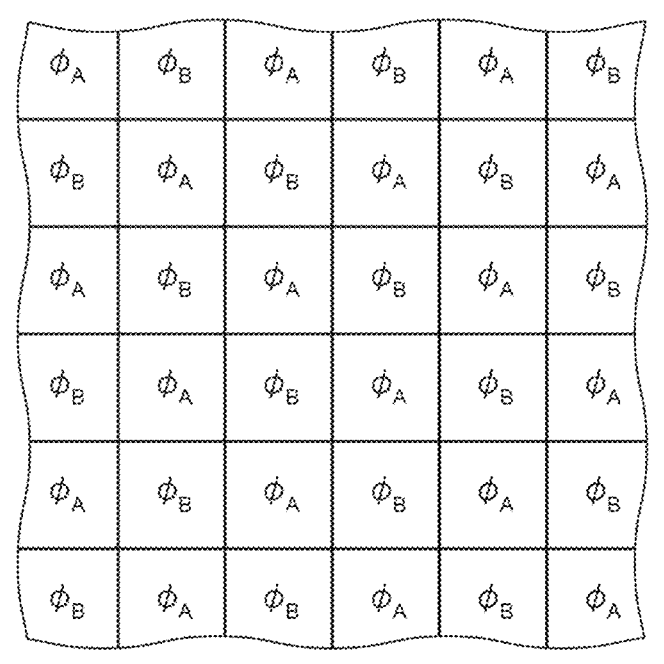

In the above description of the present modification, $\lambda_0$=a×n (a is the lattice interval) with respect to a wavelength $\lambda_0$, and a band end called a $\Gamma_2$ point of the square lattice is used. Meanwhile, the lattice interval a may be set so that $\lambda_0$=(√2) a×n holds. This corresponds to a band end referred to as an M point of the square lattice. In this case, a phase angle distribution φ(x, y)=$φ_0$(x, y)+$φ_1$(±πx/a, ±πy/a) holds. The phase angle distribution φ(x, y)=$φ_0$(x, y)+$φ_1$(±πx/a, ±πy/a) is obtained by superimposing the phase of an additional phase angle distribution $φ_1$(x, y)=(x, y) on a phase angle distribution $φ_0$(x, y) corresponding to a design beam pattern. FIG. 49 is a diagram conceptually illustrating one example of a rotation angle distribution $φ_1$(x, y). As illustrated in FIG. 49, in this example, a first phase value $φ_A$ and a second phase value $φ_B$ having a value different from a value of the first phase value $φ_A$ are arranged in a checkered pattern. In one embodiment, the phase value $φ_A$ is 0(rad), and the phase value cps is π(rad). That is, the first phase value $φ_A$ and the second phase value cps change in increments of π. In this case, the design beam pattern can be taken out in a direction perpendicular to a plane, the zero-order light does not appear in the direction perpendicular to a plane, and only the design beam pattern including ±1st-order light can be emitted. The zero-order light has a wavefront that is not phase-modulated, whereas the ±1st-order light has a phase-modulated wavefront. Therefore, the spatial phase distribution of the address light E2 incident on the spatial light modulator 3 can be efficiently controlled.

As in the present modification, the light emitting unit that outputs the diffraction grating pattern of the address light E2 may be configured by an S-iPM laser. Even in this case, the same effects as those of the above embodiment can be obtained. In addition, in the present modification, resolution can be easily improved by simultaneously using a plurality of S-iPM lasers arranged side by side. That is, in order to improve the resolution of the S-iPM laser alone, it is necessary to increase the oscillation region size of the phase modulation layer 65A, but if the oscillation region size is increased, it may be difficult to maintain uniform and stable oscillation as a whole. In the present modification, since the phase control of the spatial light modulator 3 is performed using only the intensity information of the beam pattern outputted from the S-iPM laser, it is only necessary to simply arrange a plurality of S-iPM lasers whose phases are not matched with each other.

As a specific numerical example, for example, an S-iPM laser described in Non-Patent Document 5 outputs a two-dimensional beam pattern having a resolution of 1400 rows and 1400 columns from a square oscillation region having a side of 400 µm. In a case where the light modulation region of the spatial light modulator 3 is a square having a side of 50 cm, when pixels are arranged at a pitch of 1 µm, the number of pixels is 500000 in both a row direction and a column direction, and 357 S-iPM lasers having the above resolution need to be arranged in each of the row direction and the column direction. In a case where the S-iPM lasers are ideally densely laid, an S-iPM laser array is a square having a side of 14.3 cm. That is, only by rotating the S-iPM laser array having a side of 14.3 cm, a function equivalent to that of rotating a holographic plate having a side of 50 cm can be achieved, and a size of the beam pattern can be increased. In other words, only by rotating the S-iPM laser array having a side of 30 cm, it is possible to achieve a function equivalent to that of rotating the holographic plate having a side of 105 cm, and it is possible to increase the size of the stereoscopic image to more than 1 in.

Note that since the diffraction grating pattern is a repetition of a simple stripe pattern, it is not always necessary to arrange the above number of S-iPM lasers, and for example, branching and shifting of an output pattern from a small number of S-iPM lasers may be performed using an optical system including a beam splitter. In this case, the number of S-iPM lasers can be reduced by the number of branches.

In addition, in the example illustrated in FIG. 42, instead of the surface emitting laser element array 50 that mechanically rotates, a plurality of surface emitting laser element arrays 50 corresponding to a plurality of rotation phases may be switched and used. Alternatively, instead of the S-iPM laser, a dynamic-integrable phase modulating (D-iPM) laser capable of dynamically changing the beam pattern may be used. In these cases, a mechanical driving unit can be eliminated, leading to improvement of reliability. Note that even in the case of using the D-iPM laser, since the phase control of the spatial light modulator 3 is performed using only the intensity information of the beam pattern, a plurality of D-iPM lasers whose phases are not matched with each other may be simply arranged.

In addition, in the present modification, the back surface 3b of the spatial light modulator 3 is directly irradiated with the address light E2 from the surface emitting laser element array 50 without the address light E2 passing through a lens optical system. In order to form a finer diffraction grating pattern, a zoom lens optical system including a plurality of lenses may be interposed between the surface emitting laser element array 50 and the back surface 3b.

Sixth Modification

Figure 50:
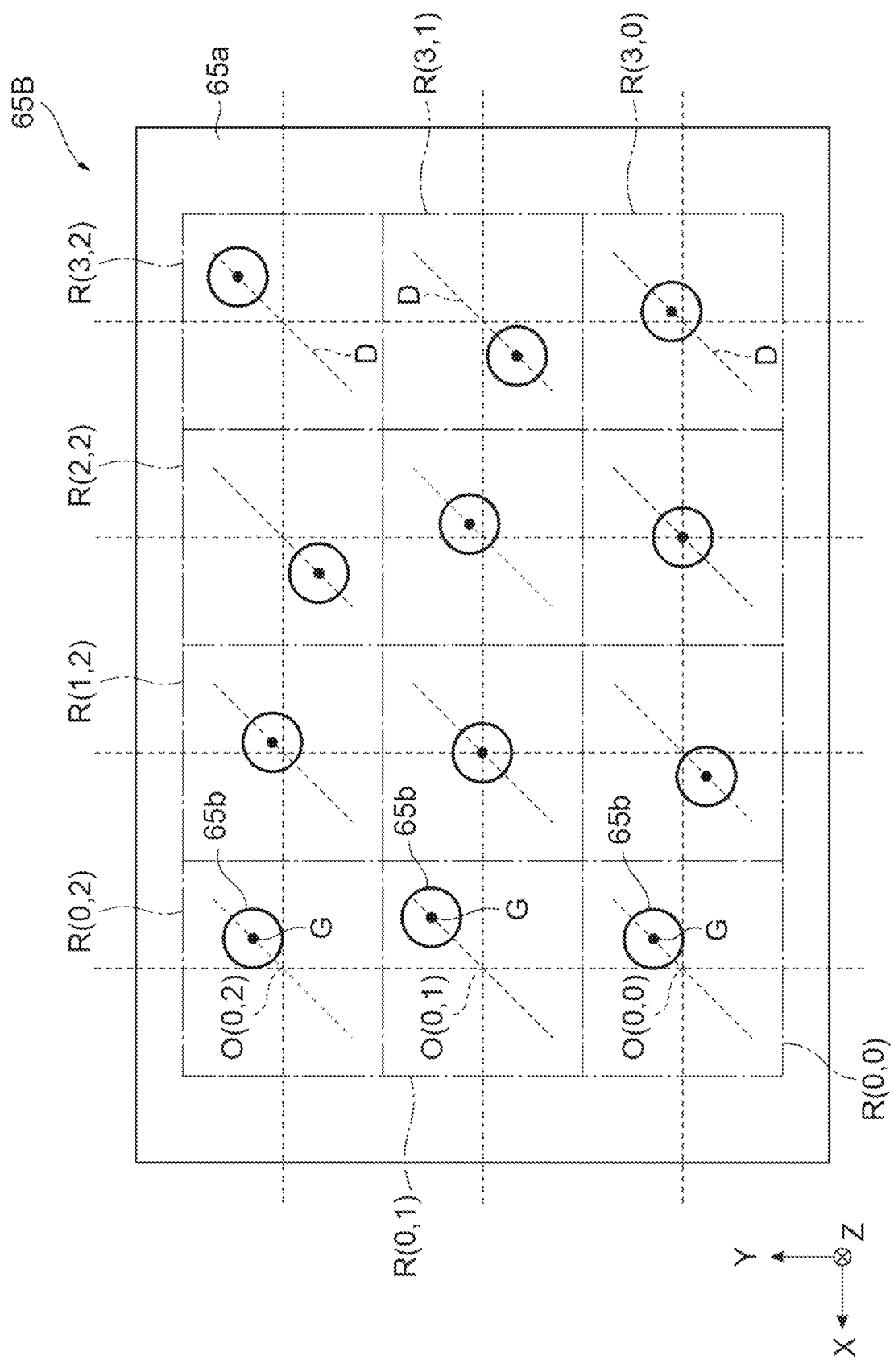
FIG. 50 is a plan view illustrating another configuration example of the phase modulation layer included in an S-iPM laser.
Figure 51:
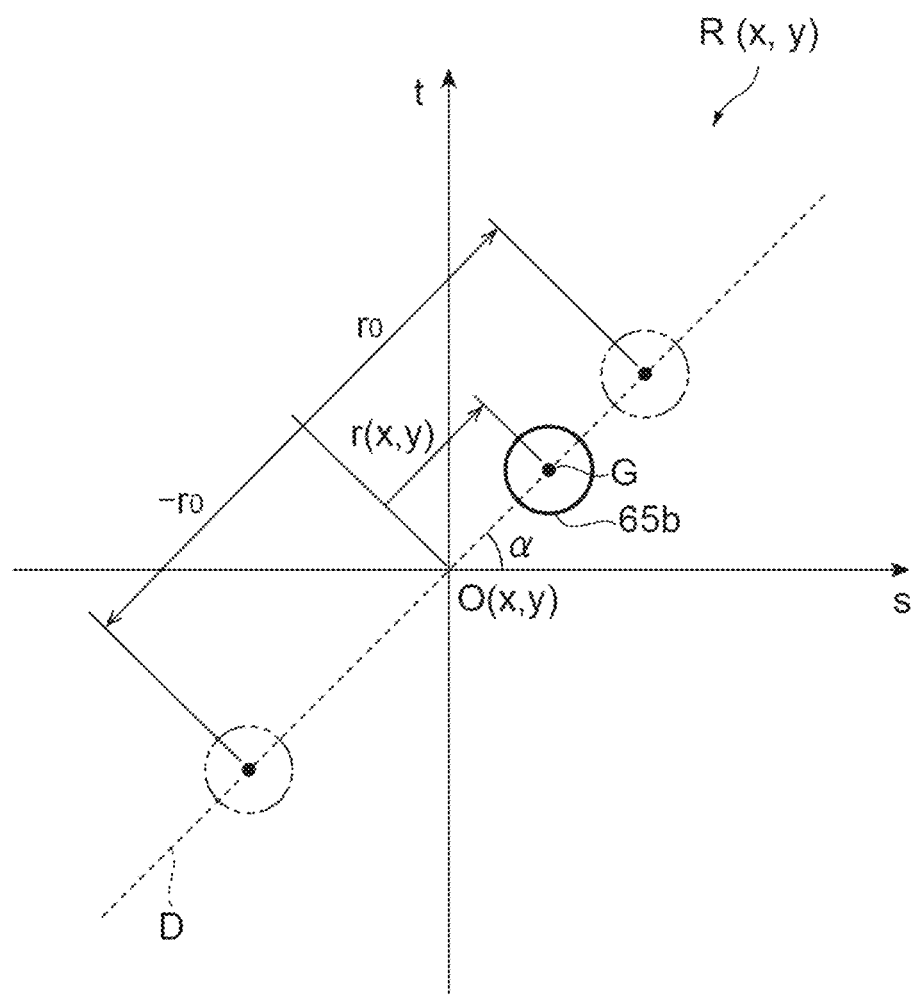
FIG. 51 is a diagram illustrating a positional relationship of a modified refractive index region in a phase modulation layer.

The S-iPM laser is not limited to a configuration of the fifth modification described above. For example, even with a configuration of a phase modulation layer 65B of the present modification, an S-iPM laser can be suitably achieved. FIG. 50 is a plan view of a phase modulation layer 65B included in the S-iPM laser. In addition, FIG. 51 is a diagram illustrating a positional relationship of a modified refractive index region 65b in the phase modulation layer 65B. The phase modulation layer 65B is a resonance mode formation layer in the present modification. As illustrated in FIGS. 50 and 51, in a unit constituent region R(x, y) of the phase modulation layer 65B, a center of gravity G of each modified refractive index regions 65b is arranged on a straight line D. The straight line D is a straight line that passes through a lattice point O(x, y) of the unit constituent region R(x, y) and is inclined with respect to each side of a square lattice. In other words, the straight line D is a straight line inclined with respect to both an X-axis and a Y-axis. An inclination angle of the straight line D with respect to a side (X-axis) of the square lattice is $\alpha$. The inclination angle $\alpha$ is constant in the phase modulation layer 65B. The inclination angle $\alpha$ satisfies $0°<\alpha<90°$, and in one example, $\alpha=45°$. Alternatively, the inclination angle $\alpha$ satisfies $180°<\alpha<270°$, and in one example, $\alpha=225°$. In a case where the inclination angle $\alpha$ satisfies $0°<\alpha<90°$ or $180°<\alpha<270°$, the straight line D extends from a first quadrant to a third quadrant of a coordinate plane defined by the X-axis and the Y-axis. Alternatively, the inclination angle $\alpha$ satisfies $90°<\alpha<180°$, and in one example, $\alpha=135°$. Alternatively, the inclination angle $\alpha$ satisfies $270°<\alpha<360°$, and in one example, $\alpha=315°$. In a case where the inclination angle $\alpha$ satisfies $90°<\alpha<180°$ or $270°<\alpha<360°$, the straight line D extends from a second quadrant to a fourth quadrant of the coordinate plane defined by the X-axis and the Y-axis. In this way, the inclination angle $\alpha$ is an angle excluding $0°$, $90°$, $180°$, and $270°$. By setting the inclination angle $\alpha$ as described above, it is possible to make both a light wave traveling in an X-axis direction and a light wave traveling in a Y-axis direction contribute a light output beam. Here, a distance between the lattice point O(x, y) and the center of gravity G is a distance r(x, y). A component x indicates the position of the x-th lattice point O(x, y) on the X-axis, and a component y indicates the position of the y-th lattice point O(x, y) on the Y-axis. In a case where a distance r(x, y) is a positive value, the center of gravity G is located in the first quadrant (or the second quadrant). In a case where the distance r(x, y) is a negative value, the center of gravity G is located in the third quadrant (or the fourth quadrant). In a case where the distance r(x, y) is 0, the lattice point O(x, y) and the center of gravity G coincide with each other.

A position in the unit constituent region R(x, y) is given by an orthogonal coordinate system (coordinate system defined by an s-axis parallel to the X-axis and a t-axis parallel to the Y-axis) with the lattice point O(x, y) as the origin. The distance r(x, y) between the center of gravity G of each modified refractive index region 65b and the lattice point O(x, y) of the unit constituent region R(x, y) illustrated in FIG. 51 is individually set for each modified refractive index region 65b according to a desired optical image. The distribution of the distance r(x, y) has a specific value for each position determined by the values of x and y, but is not necessarily represented by a specific function. The distribution of the distance r(x, y) is determined from a phase distribution extracted from a complex amplitude distribution obtained by performing an inverse Fourier transform on the desired optical image. That is, in a case where a phase P(x, y) at certain coordinates (x, y) illustrated in FIG. 51 is $P_0$, the distance r(x, y) is set to 0. In a case where the phase P(x, y) is $\pi+P_0$, the distance r(x, y) is set to the maximum value $r_0$. In a case where the phase P(x, y) is $-\pi+P_0$, the distance r(x, y) is set to the minimum value $-r_0$. Then, for an intermediate phase P(x, y) between the above cases, the distance r(x, y) is set so that r(x, y)={P(x, y)−$P_0$}×$r_0$/π holds. Here, an initial phase $P_0$ can be optionally set. When a lattice interval of the square lattice is a, the maximum value $r_0$ of the distance r(x, y) is within the range indicated, for example, by the following Formula (13):

$$0 \le r_0 \le \frac{a}{\sqrt{2}}. \tag{13}$$

As in the present modification, a surface emitting laser element array 50 may have the phase modulation layer 65B as the resonance mode forming layer. In this case, part of laser beam generated in the phase modulation layer 65B (part of +1st-order light and −1st-order light, and zero-order light) is diffracted in a direction not parallel to a main surface 53*a* of a semiconductor substrate 53. Then, the laser light reaches a back surface 53*b* of the semiconductor substrate 53 after being reflected by a metal electrode film 66 (or directly), and the laser light is emitted from the back surface 53*b* toward a spatial light modulator 3 as address light E2. Also in the present modification, the surface emitting laser element array 50 can form an image of the address light E2 including a diffraction grating pattern on the back surface 3*b* of the spatial light modulator 3. Therefore, the same effects as those of the above embodiment can be obtained.

Seventh Modification

Figure 52:
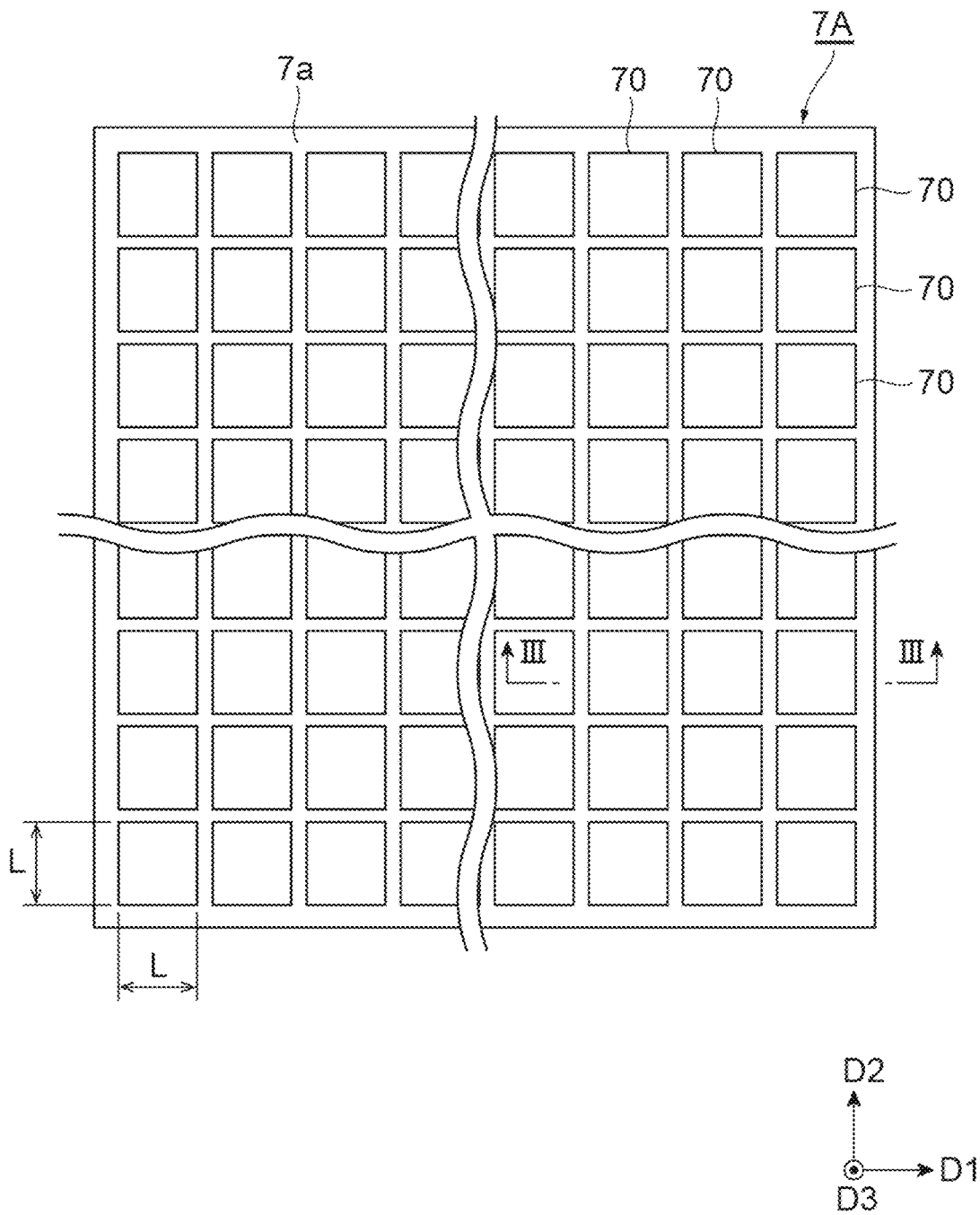
FIG. 52 is a plan view illustrating a configuration of a reflective dynamic meta-surface (hereinafter, simply referred to as a meta-surface) as another example of the spatial light modulator.

In the above embodiment, the liquid crystal type is exemplified as the spatial light modulator 3, but the configuration of the spatial light modulator 3 is not limited to the liquid crystal type. FIG. 52 is a plan view illustrating a configuration of a reflective dynamic meta-surface (hereinafter, simply referred to as meta-surface) 7A as another example of the spatial light modulator 3. The "meta-surface" changes the phase of incident light for each unit structure by forming a plurality of unit structures sufficiently smaller than the wavelength of light E1 side by side on a flat surface. Although there are various structures of the meta-surface, the meta-surface 7A of the present embodiment has a structure called a gap plasmon type among the structures. A meta-surface 7A is a flat plate-like device extending along a first direction D1 and a second direction D2 intersecting (for example, orthogonal to) each other, and a third direction D3 intersecting (for example, orthogonal to) both the first direction D1 and the second direction D2 is set as a thickness direction. A plurality of pixels 70 is formed on the main surface 7*a* of the meta-surface 7A. The plurality of pixels 70 is arranged two-dimensionally with the first direction D1 as a row direction and the second direction D2 as a column direction. A planar shape of each pixel 70 is a rectangular shape (for example, a square shape). A length L of a side of each pixel 70 is, for example, in the range of 200 nm to 400 nm. The meta-surface 7A serves as a diffraction grating by individually modulating the phase of the light E1 inputted to the main surface 7*a* for each pixel 70.

Figure 53:
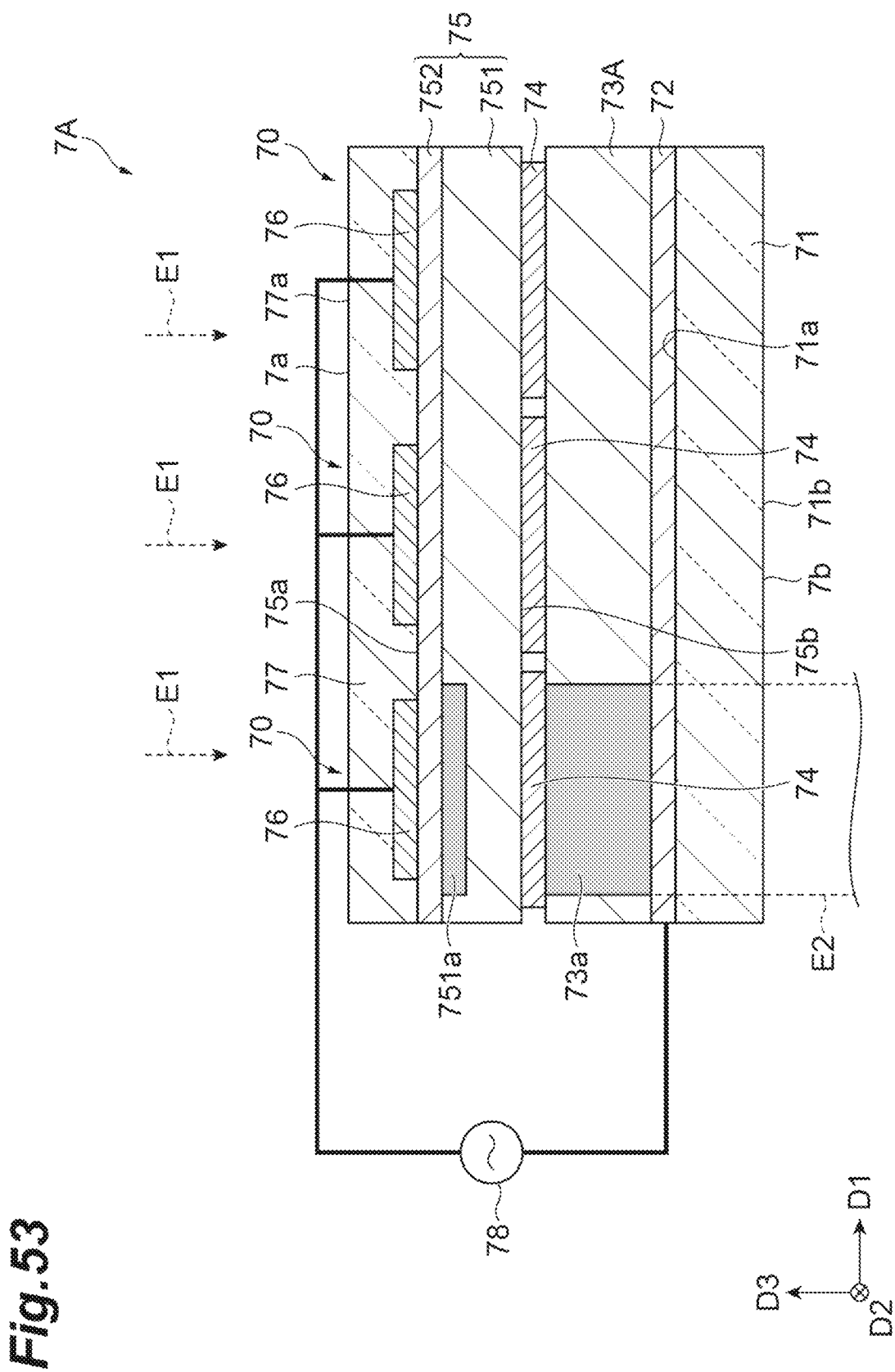
FIG. 53 is a cross-sectional view taken along line of FIG. 52, and illustrates a cross-sectional structure of the meta-surface.

FIG. 53 is a cross-sectional view taken along line III-III of FIG. 52, and illustrates a cross-sectional structure of the meta-surface 7A. The meta-surface 7A reflects the light E1 including a two-dimensional optical image with which the main surface 7*a* is irradiated, and modulates the phase of the light E1 for each of the plurality of pixels 70 arranged two-dimensionally. Each pixel 70 of the meta-surface 7A has a configuration to change a phase modulation amount according to the intensity of each pixel 70 of address light E2 emitted from a side of a back surface 7*b*. As illustrated in FIG. 53, the meta-surface 7A includes a transparent substrate 71, a transparent electrode layer 72, an impedance changing layer 73A, a metal film 74, a laminate structure body 75, a metal film 76, and a transparent substrate 77.

The transparent substrate 71 is a plate-like member having a light transmissive property. The light transmissive property mentioned herein refers to a property of transmitting the address light E2. In one example, the transparent substrate 71 is a glass substrate. The transparent substrate 71 includes a main surface 71*a* and a back surface 71*b* that are parallel to each other and face in opposite directions to each other. The main surface 71*a* and the back surface 71*b* are flat and smooth surfaces. The back surface 71*b* coincides with the back surface 7*b* of the meta-surface 7A. The thickness of the transparent substrate 71 is, for example, 20 μm or more and 1 mm or less.

The transparent electrode layer 72 is located between the impedance changing layer 73A and the transparent substrate 71. In an example illustrated in FIG. 53, the transparent electrode layer 72 is in contact with the main surface 71*a* of the transparent substrate 71. The transparent electrode layer 72 has a light transmissive property similarly to the transparent substrate 71. That is, the transparent electrode layer 72 transmits the address light E2. A constituent material of the transparent electrode layer 72 includes, for example, at least one of ITO and zinc oxide-based conductive materials (AZO and GZO). The thickness of the transparent electrode layer 72 is, for example, 1 nm or more and 1 μm or less. The transparent electrode layer 72 is not divided for each pixel, and is integrally provided over the entire surface on the main surface 71*a*.

The impedance changing layer 73A is a semiconductor layer located between the metal film 74 and the transparent electrode layer 72. The impedance changing layer 73A expresses an impedance distribution according to an intensity distribution of the address light E2. Specifically, when receiving light, the impedance of a material constituting the impedance changing layer 73A changes monotonously according to the light intensity of the light. Examples of such a material include hydrogenated amorphous silicon, a GaN-based compound, an InP-based compound, and a GaAs-based compound. Therefore, the impedance changing layer 73A of the present modification can include at least one of hydrogenated amorphous silicon, a GaN-based compound (for example, i-type GaN), an InP-based compound (for example, i-type InP), and a GaAs-based compound (for example, i-type GaAs). The thickness of the impedance changing layer 73A is, for example, 10 nm or more and 20 μm or less. In addition, the impedance changing layer 73A is also not divided for each pixel 70, and is integrally provided over the entire surface on the main surface 71*a*.

The laminate structure body 75 is a flat film and extends over the plurality of pixels 70 along the first direction D1 and the second direction D2. The laminate structure body 75 has a main surface 75*a* and a back surface 75*b*. The light E1 is inputted to the main surface 75*a*. The main surface 75*a* and the back surface 75*b* face each other in the third direction D3. An interval between the main surface 75a and the back surface 75b (that is, the thickness of the laminate structure body 75 in the third direction D3) is set to be sufficiently smaller than a wavelength λ of the light E1. The thickness of the laminate structure body 75 is, for example, in the range of 10 nm to 100 nm. The laminate structure body 75 includes a transparent conductive layer 751 and a dielectric layer 752 layered with the third direction D3 as a layered direction.

The transparent conductive layer 751 is an inorganic film having a light transmissive property and a conductive property. The light transmissive property mentioned herein refers to a property of transmitting the light E1. In addition, the conductive property refers to a property of extremely low electrical resistivity (for example, resistivity of $10^{-6}$ Ω·m or less). The transparent conductive layer 751 of the present modification includes, for example, at least one of ITO and zinc oxide-based conductive materials (AZO and GZO). The thickness of the transparent conductive layer 751 is, for example, in the range of 3 nm to 50 nm, and in one example, is 20 nm.

The dielectric layer 752 is an inorganic film having a light transmissive property and an insulation property. The insulation property refers to a property of extremely high electrical resistivity (for example, resistivity of $10^6$ Ω·or more). The dielectric layer 752 includes, for example, at least one of aluminum oxide ($Al_2O_3$), silicon oxide ($SiO_2$), and magnesium fluoride ($MgF_2$). The thickness of the dielectric layer 752 is, for example, in the range of 1 nm to 20 nm, and in one example, is 5 nm. Note that in the example shown in FIG. 53, the transparent conductive layer 751 is provided on a side of the back surface 7b, and the dielectric layer 752 is provided on a side of the main surface 7a. However, the transparent conductive layer 751 may be provided on the side of the main surface 7a, and the dielectric layer 752 may be provided on the side of the back surface 7b.

The metal film 76 has a function as a nano antenna in a meta-surface structure. The metal film 76 is provided on the main surface 75a of the laminate structure body 75. The metal film 76 is a film including metal, for example, gold (Au). The thickness of the metal film 76 is, for example, in the range of 30 nm to 100 nm, and in one example, is 50 nm. The metal film 76 is divided for each pixel 70. The width of the metal film 76 of each pixel 70 in the first direction D1 is set to be smaller than the length (pixel pitch) of the pixel 70 in the same direction, and is set to be sufficiently smaller than the wavelength λ of the light E1. In one example, the width of the metal film 76 of each pixel 70 is in the range of 40 nm to 360 nm, and in one example, is 250 nm. In addition, an interval between adjacent metal films 76 is in the range of 40 nm to 360 nm, and in one example, is 150 nm. The ratio (W1/λ) of a width W1 of the metal film 76 to the wavelength λ of the light E1 is in the range of 0.02 to 1. Furthermore, the ratio (W1/L) of the width W1 of the metal film 76 to the length L of a side of the pixel 70 is in the range of 0.1 to 0.9.

The metal film 74 is provided on the back surface 75b of the laminate structure body 75 and is located between the laminate structure body 75 and the impedance changing layer 73A. In one example, the metal film 74 is in contact with the back surface 75b. The metal film 74 reflects the light E1 inputted to the laminate structure body 75 toward the main surface 7a. The metal film 74 includes metal, for example, gold (Au). The thickness of the metal film 74 is, for example, in the range of 100 nm to 200 nm, and in one example, is 150 nm. The metal film 74 is divided for each pixel 70. In one example, the width of the metal film 74 of each pixel 70 is in the range of 40 nm to 360 nm. Furthermore, the ratio (W2/L) of a width W2 of the metal film 74 of each pixel 70 to the length L of a side of the pixel 70 is in the range of 0.1 to 0.9.

The transparent substrate 77 is provided on the main surface 75a of the laminate structure body 75 so as to cover the metal film 76. In other words, the metal film 76 is provided between the laminate structure body 75 and the transparent substrate 77. The transparent substrate 77 is a plate-like member having a light transmissive property. The light transmissive property mentioned herein refers to a property of transmitting the light E1. In one example, the transparent substrate 77 is a glass substrate. The transparent substrate 77 includes a surface 77a opposite to the laminate structure body 75. The surface 77a is a flat and smooth surface, and coincides with the main surface 7a of the meta-surface 7A. The thickness of the transparent substrate 77 is, for example, 20 μm or more and 1 mm or less.

Effects obtained by the meta-surface 7A having the above configuration will be described. The meta-surface 7A has a metal-insulator-metal (MIM) structure in which the metal film 74 as a light reflecting film, the laminate structure body 75 including the transparent conductive layer 751 and the dielectric layer 752, and the metal film 76 as the nano antenna are layered in this order. In this case, the light E1 that has been incident on the main surface 7a of the meta-surface 7A is incident on the exposed portion of the laminate structure body 75 on one side of the metal film 76. The wave of the light E1 is guided between the metal film 74 and the metal film 76, and is outputted from the exposed portion of the laminate structure body 75 on the other side of the metal film 76 to the outside of the meta-surface 7A via the main surface 7a. At this time, when a drive voltage is applied between the metal film 76 and the metal film 74, induced currents in directions opposite to each other, which are called gap surface plasmon modes, are generated in both the metal film 76 and the metal film 74, and strong magnetic resonance (plasmon resonance) is generated in the laminate structure body 75. By using the magnetic resonance, it is possible to modulate the phase of the light E1 passing between the metal film 76 and the metal film 74.

Here, the following Formula (14) represents a relationship between a phase modulation amount φ of the light E1 due to magnetic resonance, the width w (=W1) of the metal film 76, the wavelength λ of the light E1, and an effective refractive index $N_{gsp}$ of the laminate structure body 75. Note that in is an integer.

$$w \frac{2\pi}{\lambda} N_{gsp} = m\pi - \varphi \quad (14)$$

As is clear from the above Formula (14), the phase modulation amount φ depends on the effective refractive index $N_{gsp}$ of the laminate structure body 75. Then, the effective refractive index $N_{gsp}$ can be controlled by changing the drive voltage applied between the metal film 76 and the metal film 74. The reasons for that are as follows. When a drive voltage is applied between the metal film 76 and the metal film 74, an electron density in the vicinity of an interface of the transparent conductive layer 751 with the dielectric layer 752 increases due to an electric field between the metal film 76 and the metal film 74. As a result, as illustrated in FIG. 53, a portion of the transparent conductive layer 751 in the vicinity of the interface is changed to an effectively metallized layer 751a. The layer 751a greatly changes the effective refractive index $N_{gsp}$ of the laminate structure body 75 with respect to the light E1.

In the present modification, an alternating-current voltage source 78 is electrically connected between the metal film 76 and the transparent electrode layer 72, and an alternating-current drive voltage is applied between the metal film 76 and the transparent electrode layer 72. The effective voltage of the alternating-current voltage is, for example, several volts, and the frequency thereof is, for example, from DC to 1 GHz. Then, the impedance changing layer 73A is provided between the transparent electrode layer 72 and the metal film 74. When a side of the back surface 3b is irradiated with the address light E2, the address light E2 reaches the impedance changing layer 73A and imparts an impedance distribution to the impedance changing layer 73A. That is, in a pixel 70 in which the light intensity of the address light E2 is small, the impedance of the impedance changing layer 73A is kept large, and in a pixel 70 in which the light intensity of the address light E2 is large, the impedance of the impedance changing layer 73A becomes small (region 73a in FIG. 53). Therefore, the impedance distribution of the impedance changing layer 73A is a distribution corresponding to the intensity distribution of the address light E2. In the pixel 70 in which the impedance of the impedance changing layer 73A has become small, a voltage given to the transparent conductive layer 751 becomes large, and a strong electric field is applied to the transparent conductive layer 751. In addition, in a pixel in which the impedance of the impedance changing layer 73A is kept large, the impedance of the impedance changing layer 73A is about the same as the impedance of the transparent conductive layer 751. Thus, the voltage given to the transparent conductive layer 751 is small, and a weak electric field is applied to the transparent conductive layer 751 (or no electric field is applied). Therefore, a phase distribution corresponding to a light intensity distribution of the address light E2 is given with respect to the light E1. Note that the address light E2 is blocked by the metal film 74 and does not reach the laminate structure body 75.

In this way, each pixel 70 of the meta-surface 7A has a configuration to change the phase modulation amount according to the intensity of the address light E2 emitted to the side of the back surface 7b of each pixel 70. Therefore, the meta-surface 7A gives a phase pattern corresponding to the diffraction grating pattern to the light E1 incident on the main surface 7a. Therefore, when the two-dimensional optical image emitted to the main surface 7a is reflected on the meta-surface 7A, the two-dimensional optical image is deflected in a direction corresponding to a direction of the diffraction grating pattern and output. Furthermore, also in the present modification, since the direction of the diffraction grating pattern on the back surface 7b dynamically changes, the deflection direction of the two-dimensional optical image also dynamically changes, similarly to the above embodiment. When the main surface 7a is irradiated with the two-dimensional optical image corresponding to the direction of the diffraction grating pattern, a stereoscopic image can be presented to an observer. In addition, according to the image output device, since the stereoscopic image is output by dynamically changing the address light E2 including the diffraction grating pattern, it is possible to output the stereoscopic image while keeping stationary the meta-surface 7A that is a light deflecting element. Therefore, it is possible to easily increase the size of the meta-surface 7A and enlarge the stereoscopic image as compared with the device that mechanically rotates a holographic screen at a high speed and disclosed in Non-Patent Document 1. In addition, as in the present modification, by using the meta-surface 7A as the spatial light modulator, operation is performed at a higher speed as compared with a case where a liquid crystal type spatial light modulator is used.

Also in the present modification, the diffraction grating pattern may be rotated on the back surface 7b of the meta-surface 7A. In this case, it is possible to present the stereoscopic image in the entire circumferential direction of 360°. Note that the dynamic change in the direction of the diffraction grating pattern is not limited to the rotation of the diffraction grating pattern, and may be a rotation operation in a certain limited angular range.

As in the present modification, the meta-surface 7A may include the metal film 74, the transparent conductive layer 751, the metal film 76, the impedance changing layer 73A, and the transparent electrode layer 72. The metal film 74 is located between the main surface 7a and the back surface 7b. The transparent conductive layer 751 is located between the metal film 74 and the main surface 7a. The metal film 76 is a nano antenna located between the transparent conductive layer 751 and the main surface 7a. The impedance changing layer 73A is located between the metal film 74 and the back surface 7b and expresses the impedance distribution according to the intensity distribution of the address light E2. The transparent electrode layer 72 is located between the impedance changing layer 73A and the back surface 7b. As described above, for example, since the meta-surface 7A has such a configuration, in each pixel 70 of the meta-surface 7A, the phase modulation amount can be changed according to the intensity of the address light E2 emitted to the back surface 7b side of each pixel 70.

As in the present modification, the impedance changing layer 73A may include at least one of hydrogenated amorphous silicon, a GaN-based compound, an InP-based compound, and a GaAs-based compound. When receiving light, the impedance of these materials changes. Therefore, in this case, it is possible to suitably achieve the impedance changing layer 73A that expresses the impedance distribution according to the intensity distribution of the address light E2.

Figure 54:
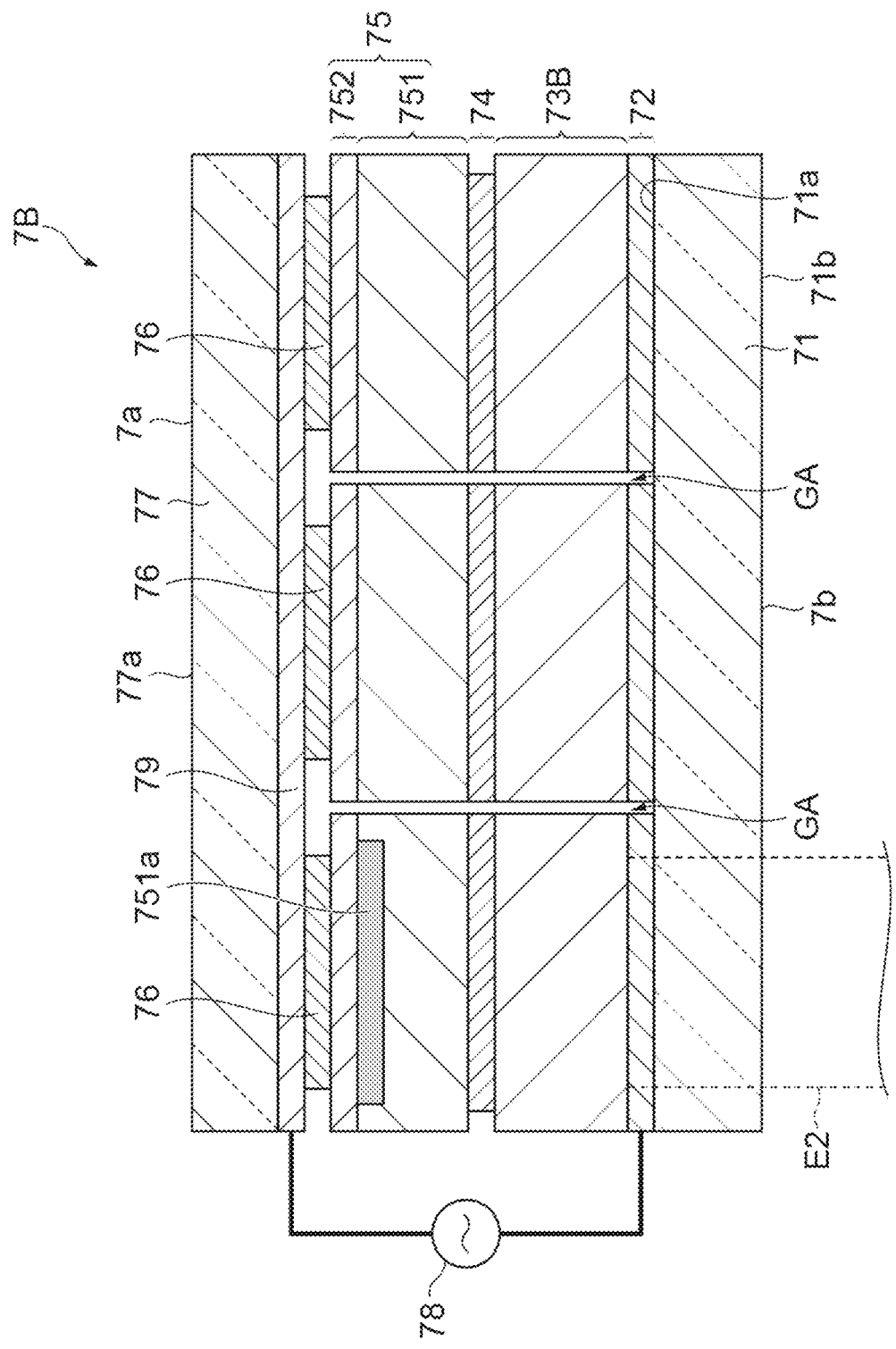
FIG. 54 is a cross-sectional view illustrating a meta-surface as another configuration of the meta-surface.

FIG. 54 is a cross-sectional view illustrating a meta-surface 7B as another configuration of the meta-surface 7A of a seventh modification. The meta-surface 7B is different from the meta-surface 7A in that the meta-surface 7B includes an impedance changing layer 73B instead of the above impedance changing layer 73A. In addition, the meta-surface 7B further includes a transparent conductive layer 79 in addition to the configuration of the meta-surface 7A.

The impedance changing layer 73B is located between a metal film 74 and a transparent electrode layer 72. The impedance changing layer 73B expresses an impedance distribution according to the intensity distribution of address light E2. Specifically, when receiving light, the impedance of a material constituting the impedance changing layer 73B changes monotonously according to the light intensity of the light. Examples of such a material include hydrogenated amorphous silicon, a GaN-based compound, an InP-based compound, and a GaAs-based compound. Therefore, the impedance changing layer 73B of the present modification can include at least one of hydrogenated amorphous silicon, a GaN-based compound (for example, i-type GaN), an InP-based compound (for example, i-type InP), and a GaAs-based compound (for example, i-type GaAs). The thickness of the impedance changing layer 73B is, for example, 10 nm or more and 20 µm or less. In addition, in order to avoid electric crosstalk due to carrier diffusion between the impedance changing layers 73B adjacent to each other, a gap GA is provided between the adjacent impedance changing layers 73B.

When a side of a back surface 3b is irradiated with address light E2, the impedance of a relevant portion locally decreases. Therefore, the impedance distribution of the impedance changing layer 73B is a distribution corresponding to the intensity distribution of the address light E2. In a pixel 70 in which the impedance of the impedance changing layer 73B has become small, a voltage given to a transparent conductive layer 751 becomes large, and a strong electric field is applied to the transparent conductive layer 751. In addition, in a pixel in which the impedance of the impedance changing layer 73B is kept large, the impedance of the impedance changing layer 73B is larger than the impedance of the transparent conductive layer 751, so that the voltage given to the transparent conductive layer 751 is small, and a weak electric field is applied to the transparent conductive layer 751 (or no electric field is applied). Note that the address light E2 is blocked by the metal film 74 and does not reach the laminate structure body 75.

The transparent conductive layer 79 has a light transmissive property and a conductive property similarly to a transparent substrate 77. The transparent conductive layer 79 transmits light E1. A constituent material of the transparent conductive layer 79 includes, for example, at least one of ITO and zinc oxide-based conductive materials (AZO and GZO). The thickness of the transparent conductive layer 79 is, for example, 1 nm or more and 1 μm or less. The transparent conductive layer 79 is not divided for each pixel, and is integrally provided over the entire surface on a main surface 71a. The transparent conductive layer 79 is interposed between a metal film 76 and the transparent substrate 77, and is electrically connected to a metal film 76. In one example, the transparent conductive layer 79 is in contact with the metal film 76. An alternating-current voltage source 78 is electrically connected between the transparent electrode layer 72 and the transparent conductive layer 79, and applies an alternating-current voltage between the transparent electrode layer 72 and the transparent conductive layer 79.

Even with the meta-surface 7B having the configuration described above, the same effects as those of the meta-surface 7A described above can be obtained. Note that as in an example illustrated in FIG. 54, the transparent electrode layer 72, the impedance changing layer 73B, and the laminate structure body 75 may be divided for each pixel 70, and divided portions may be separated from each other via the gap GA. As a result, electrical crosstalk between adjacent pixels can be reduced.

The image output device according to the present invention is not limited to the above-described embodiment, and various other modifications are possible. For example, as the spatial light modulator, the spatial light modulator 3 of a liquid crystal type is exemplified in the above embodiment, and the meta-surfaces 7A and 7B are exemplified in the seventh modification. However, the spatial light modulator applied to the present invention is not limited thereto, and spatial light modulators having various other configurations can be applied. In addition, the configurations of the address light irradiation unit and the image irradiation unit are not limited to the above embodiment and each modification, and address light irradiation units and image irradiation units having other various configurations can be applied.

From the above description of the present invention, it is apparent that the present invention can be variously modified. Such modifications cannot be regarded as departing from the spirit and scope of the present invention, and improvements obvious to all those skilled in the art are included in the following claims.

What is claimed is:

1. An image output device comprising:
   a spatial light modulator including a main surface, a back surface opposing the main surface, and a plurality of pixels arranged two-dimensionally along the main surface in a space between the main surface and the back surface, the spatial light modulator being configured to reflect light emitted to the main surface and modulate a phase of the light in each of the plurality of pixels;
   an image irradiation unit configured to emit a two-dimensional optical image toward the main surface; and
   an address light irradiation unit configured to emit address light including a diffraction grating pattern toward the back surface, wherein
   each of the plurality of pixels of the spatial light modulator is configured to change a phase modulation amount according to an intensity of the address light emitted from a side of the back surface,
   the address light irradiation unit is configured to dynamically change a direction of the diffraction grating pattern on the back surface of the spatial light modulator, which is in a stationary state, and
   the image irradiation unit is configured to irradiate the main surface with the two-dimensional optical image corresponding to the direction of the diffraction grating pattern.

2. The image output device according to claim 1, wherein the address light irradiation unit is configured to rotate the diffraction grating pattern on the back surface.

3. The image output device according to claim 1, wherein the spatial light modulator includes:
   a light reflecting layer provided between the main surface and the back surface;
   a liquid crystal layer provided between the light reflecting layer and the main surface;
   a light transmissive first electrode layer provided between the liquid crystal layer and the main surface;
   an impedance changing layer provided between the light reflecting layer and the back surface, the impedance changing layer being configured to express an impedance distribution according to an intensity distribution of the address light; and
   a light transmissive second electrode layer provided between the impedance changing layer and the back surface, and wherein
   the liquid crystal layer includes a plurality of partition walls dividing liquid crystal into sections each corresponding to any one of the plurality of pixels.

4. The image output device according to claim 3, wherein the plurality of partition walls is arranged two-dimensionally along both a first direction on the main surface and a second direction orthogonal to the first direction on the main surface, and a pitch between adjacent partition walls arranged along the second direction is larger than a pitch between adjacent partition walls arranged along the first direction.

5. The image output device according to claim 4, wherein the pitch between the adjacent partition walls arranged along the second direction is twice or more the pitch between the adjacent partition walls arranged along the first direction.

6. The image output device according to claim 3, wherein the plurality of partition walls is arranged two-dimensionally along both a first direction on the main surface and a second direction orthogonal to the first direction on the main surface; and both a pitch between adjacent partition walls arranged along the first direction and a pitch between partition walls arranged along the second direction are 5 μm or less.

7. The image output device according to claim 3, wherein the impedance changing layer includes at least one of hydrogenated amorphous silicon, a GaN-based compound, an InP-based compound, and a GaAs-based compound.

8. The image output device according to claim 1, wherein the spatial light modulator includes:
a laminate structure body having a first surface; a second surface opposing the first surface; a transparent conductive layer provided between the first surface and the second surface;
and a dielectric layer provided between the first surface and the second surface, the laminate structure body having the first surface to which the two-dimensional optical image is inputted;
a first metal film provided on the first surface of the laminate structure body;
a second metal film provided on the second surface of the laminate structure body, the second metal film being configured to reflect the two-dimensional optical image inputted to the laminate structure body toward the first surface;
an impedance changing layer provided on an opposite side of the laminate structure body with respect to the second metal film, the impedance changing layer being configured to express an impedance distribution according to an intensity distribution of the address light; and
a light transmissive electrode layer provided on an opposite side of the second metal film with respect to the impedance changing layer, and wherein
both the first metal film and the second metal film include a plurality of partial metal films each corresponding to any one of the plurality of pixels and separated from each other, and
part of the laminate structure body is exposed from between the plurality of partial metal films constituting the first metal film when viewed from a layered direction.

9. The image output device according to claim 1, wherein the address light irradiation unit includes:
a light emitting unit configured to output the address light including the diffraction grating pattern; and
a driving unit configured to dynamically change an attitude angle of the light emitting unit around an optical axis.

10. The image output device according to claim 1, wherein
the address light irradiation unit includes:
a plurality of light emitting units arranged along a circumference, the plurality of light emitting units being configured to output the address light including the diffraction grating pattern; and
an optical system configured to optically couple the plurality of light emitting units and the back surface, and wherein
the address light from some light emitting units selected from the plurality of light emitting units and corresponding to the direction of the diffraction grating pattern is inputted to the back surface.

11. The image output device according to claim 10, wherein the optical system includes a meta-lens.

12. The image output device according to claim 1, wherein
the address light irradiation unit includes a light emitting unit provided along a circumference, the light emitting unit being configured to output the address light including the diffraction grating pattern with a periodic direction as a radial direction of the circumference, and
the light emitting unit is a plurality of element electrodes arranged along a circumferential direction of the circumference, and an element electrode corresponding to a direction of the diffraction grating pattern among the plurality of element electrodes is configured to selectively emit the address light.

13. The image output device according to claim 9, wherein the light emitting unit includes a plurality of light emitting regions arranged on the basis of the diffraction grating pattern.

14. The image output device according to claim 9, wherein
the light emitting unit includes a surface emitting laser element having an active layer and a phase modulation layer,
the phase modulation layer includes a base layer and a plurality of modified refractive index regions having a refractive index different from a refractive index of the base layer, the plurality of modified refractive index regions being distributed two-dimensionally on a plane perpendicular to a thickness direction of the phase modulation layer, and
in a virtual square lattice set on the plane of the phase modulation layer, a center of gravity of each of the plurality of modified refractive index regions is set to a first state or a second state, the first state is defined by a state in which the center of gravity of each of the plurality of modified refractive index regions is arranged away from a corresponding lattice point among lattice points of the virtual square lattice and a rotation angle around the corresponding lattice point is individually set with respect to each of the plurality of modified refractive index regions, and the second state is defined by a state in which the center of gravity of each of the plurality of modified refractive index regions is arranged on a straight line that passes through the corresponding lattice point among the lattice points of the virtual square lattice and is inclined with respect to the virtual square lattice and a distance between the center of gravity of each of the plurality of modified refractive index regions and the corresponding lattice point is individually set.

15. The image output device according to claim 9, wherein
the light emitting unit includes:
a photonic crystal surface emitting laser element including an active layer and a photonic crystal layer; and
a periodic structure provided on a light emitting surface of the photonic crystal surface emitting laser element, the periodic structure having an opening and a light shielding portion periodically provided according to the diffraction grating pattern.

16. The image output device according to claim 1, wherein
the address light irradiation unit includes:
a laser light source;
a branching unit configured to branch a laser beam outputted from the laser light source; and
an interference optical system configured to cause one laser beam and the other laser beam branched by the branching unit to interfere with each other to generate an interference fringe, and wherein the interference optical system includes a position changing unit configured to dynamically change a relative positional relationship at the time of interference between the one laser beam and the other laser beam, and the interference fringe is used as the diffraction grating pattern.

17. The image output device according to claim 1, wherein the diffraction grating pattern has a configuration in which a light intensity changes periodically in a certain direction, the light intensity becomes strong or weak stepwise and monotonously within each period, and the number of regions having different light intensities within each period is three or more.

18. The image output device according to claim 1, further comprising a filter arranged between the image irradiation unit and the spatial light modulator, the filter being configured to reduce an intensity of at least some wavelength components of other wavelength components included in the two-dimensional optical image and excluding visible light.

* * * * *